(12) United States Patent
Babaei et al.

(10) Patent No.: US 11,412,568 B2
(45) Date of Patent: Aug. 9, 2022

(54) DISCONTINUOUS RECEPTION INACTIVITY TIMER AND A SEMI-PERSISTENT CHANNEL STATE INFORMATION OF AA WIRELESS DEVICE

(71) Applicant: Samsung Electronics Co., Ltd., Suwon-si (KR)

(72) Inventors: Alireza Babaei, Fairfax, VA (US); Esmael Dinan, McLean, VA (US); Ali Cirik, Herndon, VA (US); Hua Zhou, Herndon, VA (US); Hyoungsuk Jeon, Centreville, VA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/091,760

(22) Filed: Nov. 6, 2020

(65) Prior Publication Data

US 2021/0059006 A1 Feb. 25, 2021

Related U.S. Application Data

(63) Continuation of application No. 16/245,847, filed on Jan. 11, 2019, now Pat. No. 10,834,777.

(60) Provisional application No. 62/616,196, filed on Jan. 11, 2018, provisional application No. 62/616,202, filed on Jan. 11, 2018.

(51) Int. Cl.
*H04W 76/28* (2018.01)
*H04W 76/38* (2018.01)
*H04W 72/08* (2009.01)

(52) U.S. Cl.
CPC .......... *H04W 76/28* (2018.02); *H04W 76/38* (2018.02); *H04W 72/08* (2013.01)

(58) Field of Classification Search
CPC ...... H04W 76/28; H04W 76/38; H04W 72/08
See application file for complete search history.

(56) References Cited

U.S. PATENT DOCUMENTS

| 2014/0135027 | A1* | 5/2014 | Kodali | H04W 72/1278 |
|---|---|---|---|---|
| | | | | 455/452.1 |
| 2016/0294531 | A1* | 10/2016 | Loehr | H04W 72/0413 |
| 2018/0062724 | A1 | 3/2018 | Onggosanusl | |

(Continued)

OTHER PUBLICATIONS

3GPP TS 38.211 V15.0.0 (Dec. 2017); Technical Specification; 3rd Generation Partnership Project; Technical Specification Group Radio Access Network; NR; Physical channels and modulation; (Release 15).

(Continued)

*Primary Examiner* — Kiet Tang
(74) *Attorney, Agent, or Firm* — Jefferson IP Law, LLP

(57) ABSTRACT

A wireless device receives: a value for a discontinuous reception (DRX) inactivity timer; and a semi-persistent channel state information (SP-CSI) radio network temporary identifier (RNTI). receive a first downlink control information (DCI) corresponding to the SP-CSI RNTI is received. The SP-CSI RNTI indicates: activation of SP-CSI reporting; and no uplink grant for uplink packet transmission. The DRX inactivity timer is started based on the first DCI indicating the activation of the SP-CSI reporting. The DRX inactivity timer controls monitoring for DCIs of the SP-CSI RNTI. a transport block is transmitted based on receiving, while the DRX inactivity timer is running, a second DCI.

19 Claims, 44 Drawing Sheets

(56) References Cited

U.S. PATENT DOCUMENTS

| | | | |
|---|---|---|---|
| 2019/0098689 A1* | 3/2019 | Wei | H04W 76/28 |
| 2019/0103954 A1 | 4/2019 | Lee | |
| 2019/0165847 A1* | 5/2019 | Kim | H04L 5/0091 |
| 2019/0289586 A1 | 9/2019 | Ouchi | |

OTHER PUBLICATIONS

3GPP TS 38.212 V15.0.0 (Dec. 2017); Technical Specification; 3rd Generation Partnership Project; Technical Specification Group Radio Access Network; NR; Multiplexing and channel coding; (Release 15).
3GPP TS 38.213 V15.0.0 (Dec. 2017); Technical Specification; 3rd Generation Partnership Project; Technical Specification Group Radio Access Network; NR; Physical layer procedures for control (Release 15).
3GPP TS 38.214 V15.0.0 (Dec. 2017); Technical Specification; 3rd Generation Partnership Project; Technical Specification Group Radio Access Network; NR; Physical layer procedures for data (Release 15).
3GPP TS 38.300 V15.0.0 (Dec. 2017); Technical Specification; 3rd Generation Partnership Project; Technical Specification Group Radio Access Network; NR; NR and NG-RAN Overall Description; Stage 2; (Release 15).
3GPP TS 38.321 V15.0.0 (Dec. 2017); Technical Specification; 3rd Generation Partnership Project; Technical Specification Group Radio Access Network; NR; Medium Access Control (MAC) protocol specification; (Release 15).
3GPP TS 38.331 V15.0.0 (Dec. 2017); Technical Specification; 3rd Generation Partnership Project; Technical Specification Group Radio Access Network NR Radio Resource Control (RRC) protocol specification; (Release 15).
R1-1716357 On semi-persistent CSI reporting on PUSCH; 3GPP TSG-RAN WG1 NR Ad Hoc #3 Nagoya, Japan, Sep. 18-21, 2017;; Source:Ericsson; Title:On semi-persistent CSI reporting on PUSCH; Agenda Item:6.2.2.6.
R1-1717300; 3GPP TSG RAN WG1 Meeting #90bis; Prague, Czech Republic, Oct. 9-13, 2017; ; Agenda Item:7.2.2.2; Source:Huawei, HiSilicon; Title:Details of CSI reporting on PUCCH/PUSCH.
R1-1717367_CSI reporting; 3GPP TSG RAN WG1 #90b; Prague, Czech Republic Oct. 9-13, 2017; ; Source: Intel Corporation ; Title:Remaining issues on CSI reporting; Agenda item:7.2.2.2.
R1-1717423 Remaining details on CSI reporting; 3GPP TSG RAN WG1 Meeting #90bis Prague, Czech Republic, Oct. 9-13, 2017; Source: ZTE, Sanechips; Title:Remaining details on CSI reporting Agenda Item:7.2.2.2; Document for:Discussion and Decision.
R1-1717471_Discussion on CSI reporting; 3GPP TSG RAN WG1 Meeting #90bis; Prague, CZ, Oct. 9-13, 2017; ; Source:vivo; Title:Discussion on CSI reporting; Agenda Item:7.2 2.2.
R1-1717811; 3GPP TSG RAN WG1 Meeting 90bis ; Prague, CZ, Oct. 9-13, 2017; ; Source:CATT; Title:Remaining issues on CSI reporting; Agenda Item:7.2.2.2.
R1-1717940_CSI reporting_v3; 3GPP TSG RAN WG1 Meeting #90bis; Prague, Czech Republic, Oct. 9-13, 2017; Agenda Item:7.2.2.2; Source: LG Electronics; Title: Discussions on CSI reporting; Document for:Discussion/Decision.
R1-1718191_CSI_Reporting; 3GPP TSG RAN WG1 Meeting 90bis; Prague, CZ, Oct. 9-13, 2017; ; Source:NTT DOCOMO; Title:Remaining Issues on Feedback Design for CSI Type I and Type II; Agenda Item:7.2.2.2.
R1-1718337; 3GPP TSG RAN WG1 Meeting 90bis ; Prague, CZ, Oct. 9-13, 2017; Source: MediaTek Inc.; Title: Remaining details for CSI reporting; Agenda Item: 7.2.2.2; Document for:Discussion.
R1-1718432 On remaining detailsof CSI reporting; 3GPP TSG RAN WG1 Meeting 90bis; Prague, CZ, Oct. 9-13, 2017; ; Source:Ericsson; Title:On remaining details of CSI reporting; Agenda Item:7.2.2.2.
R1-1718442 On semi-persistent CSI reporting on PUSCH; 3GPP TSG-RAN WG1 #90bis Prague, Czech Republic, Oct. 9-13, 2017;; Source:Ericsson; Title:On semi-persistent CSI reporting on PUSCH; Agenda Item:7.2.2.6.
R1-1718443 On aperiodic and semi-persistent CSI reporting on PUCCH ; 3GPP TSG RAN WG1 Meeting 90bis; Prague, CZ, Oct. 9-13, 2017; ; Source:Ericsson; Title:On aperiodic and semi-persistent CSI reporting on PUCCH; Agenda Item:7.2.2.2.
R1-1718481 CSI reporting; 3GPP TSG RAN WG1 Meeting #90bis; Prague, Czech Republic, Oct. 9-13, 2017;; Agenda Item:7.2.2.2; Source:InterDigital, Inc.; Title:Remaining issues on CSI reporting.
R1-1718510; 3GPP TSG RAN WG1 Meeting 90bis ; Prague, CZ, Oct. 9-13, 2017; ; Agenda item:7.2.2.2; Source:Nokia, Nokia Shanghai Bell; Title:Remaining details on CSI reporting for Type II and Type I codebook.
R1-1718540; 3GPP TSG RAN WG1 Meeting 90bis ; Oct. 9-13, 2017; Prague, Czech; ; Agenda item:7.2.2.2; Source: Qualcomm Incorporated.
R1-1718910 Summary of CSI measurement; 3GPP TSG RAN WG1 Meeting #90bis; Prague, CZ, Oct. 9-13, 2017; ; Source:ZTE, Sanechips; Title: Summary of CSI measurement; Agenda Item 7.2.2.1.
R1-1719142 Offline session notes CSI reporting 7.2.2.2; 3GPP TSG RAN WG1 Meeting 90bis R1-1719142 Prague, CZ, Oct. 9-13, 2017; ; Agenda Item:7.2.2.2; Source: Ericsson; Title:Offline session notes CSI reporting (Al 7.2.2.2).
R1-1719425; 3GPP TSG RAN WG1 Meeting #91 ; Reno, USA, Nov. 27-Dec. 1, 2017; ; Agenda Item:7.2.2.2; Source:Huawei, HiSilicon; Title:Remaining issues for CSI reporting.
R1-1719532 Remaining details on CSI reporting; 3GPP TSG RAN WG1 Meeting #91; Reno, USA, Nov. 27-Dec. 1, 2017; Source: ZTE, Sanechips; Title:Remaining details on CSI reporting; Agenda Item:7.2.2.2; Document for:Discussion and Decision.
R1-1719564 Remaining details for CSI reporting; 3GPP TSG RAN WG1 Meeting 91; Reno, USA, Nov. 27-Dec. 1, 2017; Agenda Item: 7.2.2.2; Source: MediaTek Inc.; Title: Remaining details for CSI reporting; Document for: Discussion.
R1-1719696_Remaining issues on csi feedback; 3GPP TSG RAN WG1 Meeting #91; Reno, USA, Nov. 27-Dec. 1, 2017; ; Agenda Item:7.2.2.2; Source:Spreadtrum Communications; Title Remaining issues on CSI feedback.
R1-1719768_Remaining details on CSI reporting; 3GPP TSG RAN WG1 Meeting #91; Reno, USA, Nov. 27-Dec. 1, 2017; ; Source:vivo; Title:Remaining details on CSI reporting; Agenda Item:7.2.2.2.
R1-1719906_CSI reporting_v2; 3GPP TSG RAN WG1 Meeting #91; Reno, USA, Nov. 27-Dec. 1, 2017; Agenda Item:7.2.2.2; Source: LG Electronics; Title: Discussions on CSI reporting; Document for:Discussion/Decision.
R1-1720070_CSI reporting; 3GPP TSG RAN WG1 #91; Reno, Nevada, USA Nov. 27-Dec. 1, 2017; ; Source: Intel Corporation ; Title:Remaining issues on CSI reporting; Agenda item:7.2.2.2.
R1-1720181; 3GPP TSG RAN WG1 Meeting 91; Reno, USA, Nov. 27-Dec. 1, 2017; ; Source:CATT; Title:Remaining details on CSI reporting; Agenda item:7.2.2.2.
R1-1720612; 3GPP TSG RAN WG1 WG1#91 Meeting ; Reno, Nevada, USA, Nov. 27- Dec. 1, 2017; ; Source:Sharp, APT; Title:Remaining issues on CSI reporting ; Agenda Item:7.2.2.2.
R1-1720628 CSI reporting; 3GPP TSG RAN WG1 Meeting #91 R1- 1720628 Reno, USA, Nov. 27-Dec. 1, 2017; ; Agenda Item:7.2.2.2; Source:InterDigital, Inc.; Title:Remaining issues on CSI reporting.
R1-1720661; 3GPP TSG RAN WG1 Meeting #91 ; Nov. 27-Dec. 1, 2017; Reno, Nevada, USA; ; Agenda item:7.2.2.2; Source: Qualcomm Incorporated.
R1-1720720 Beam management in C-DRX; 3GPP TSG-RAN WG1 #91; Reno, USA, Nov. 27-Dec. 1, 2017; ; Source:Ericsson; Title:Beam management in C-DRX; Agenda item:7.2.2.6.
R1-1720734 On remaining details of CSI reporting; 3GPP TSG-RAN WG1 #91; Reno, USA, Nov. 27-Dec. 1, 2017; ; Source:Ericsson; Title:On remaining details of CSI reporting; Agenda Item:7.2.2.2.

(56) References Cited

OTHER PUBLICATIONS

R1-1720746 On semi-persistent CSI reporting on PUSCH ; 3GPP TSG-RAN WG1 #91; Reno, USA, Nov. 27-Dec. 1, 2017; ; Source:Ericsson; Title:On semi-persistent CSI reporting on PUSCH; Agenda Item:7.2.2.6.
R1-1720802_CSI_Reporting; 3GPP TSG RAN WG1 Meeting 91; Reno, USA, Nov. 27-Dec. 1, 2017; ; Source:NTT Docomo; Title:Remaining Issues on CSI reporting; Agenda Item:7.2.2.2.
R1-1720889; 3GPP TSG RAN WG1 Meeting 91 ; Reno, USA, Nov. 27-Dec. 1, 2017; ; Agenda item:7.2.2.2; Source:Nokia, Nokia Shanghai Bell; Title: Remaining details on CSI reporting.
R1-1721451 Summary of views on CSI reporting v4 with offline notes; 3GPP TSG-RAN WG1 #91; Reno, USA, Nov. 27-Dec. 1, 2017; ; Source:Ericsson; Title:Summary of views on CSI reporting Agenda Item:7.2.2.2.
3GPP TSG-RAN WG2 meeting #101 R2-1801701; Athens, Greece, Feb. 26-Mar. 2, 2018; Agenda Item: 2.2 Source: ETSI MCC; Title: Report of 3GPP TSG RAN2#100 meeting, Reno, Nevada, USA.
3GPP TSG-RAN WG1 NR Ad Hoc #3; Nagoya, Japan, Sep. 18-21, 2017; Agenda item 6.2.2.3; R1-1716842; WF on QCL Indication for DL Physical Channels; Ericsson, CATT, NTT Docomo, Samsung, Qualcomm.
3GPP TSG RAN WG1 Meeting #91 R1-1721527; Reno, USA, Nov. 27-Dec. 1, 2017; WF on CSI timing offset for PUSCH; LG Electronics, Ericsson, InterDigital, Samsung, [ZTE, Sanechips].

\* cited by examiner

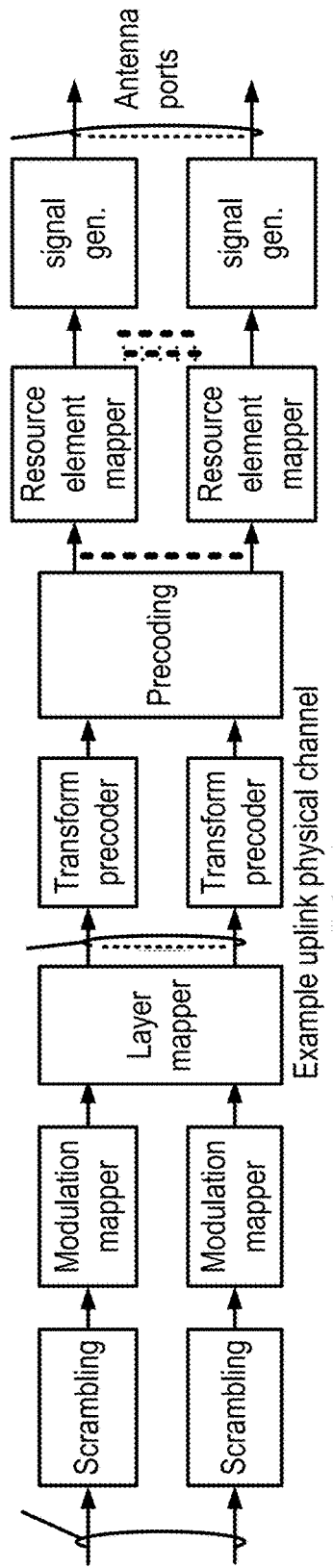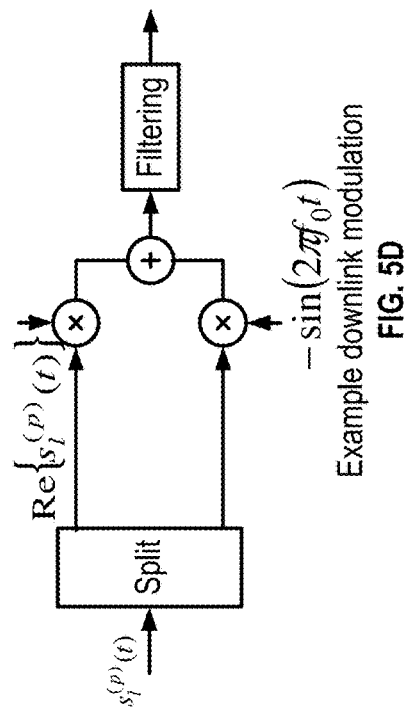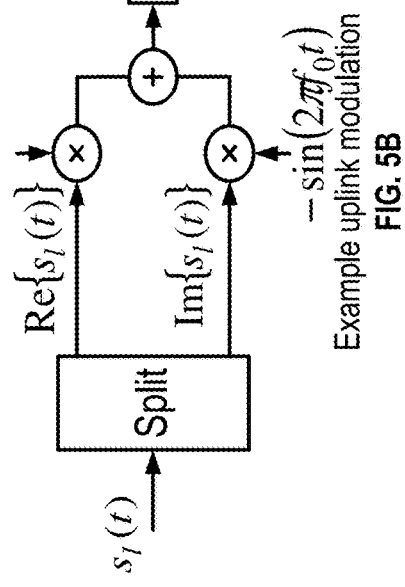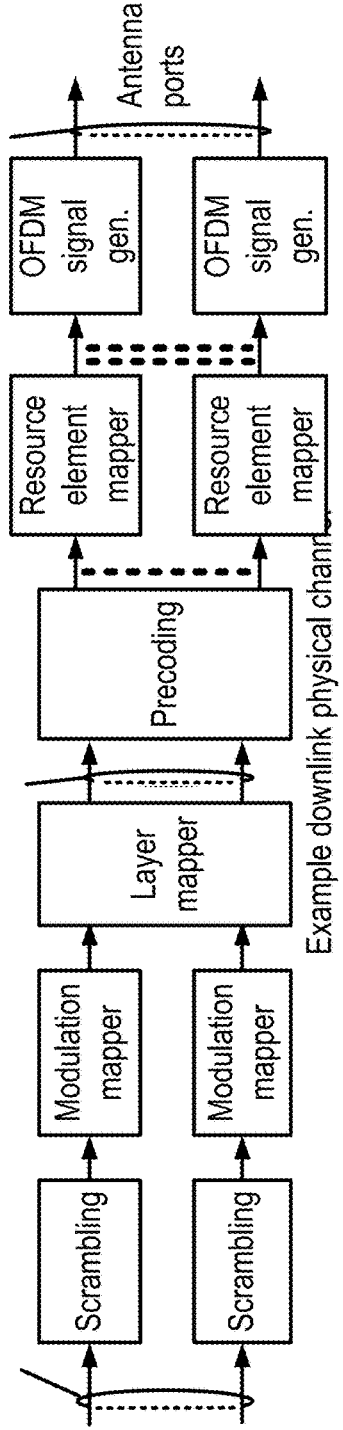

Example 1: 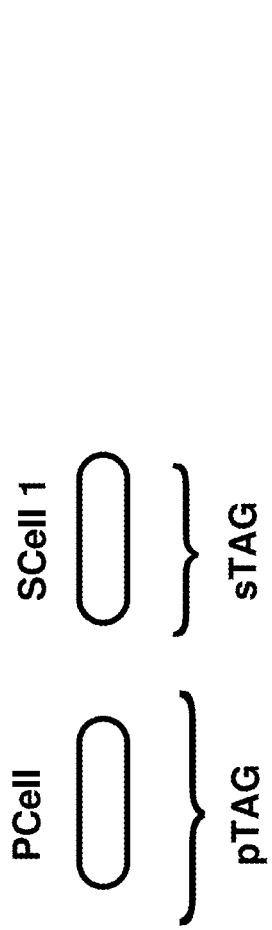
Example 2: 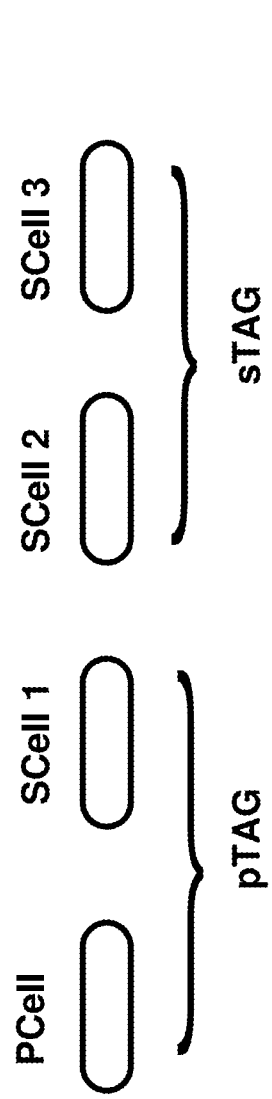
Example 3: 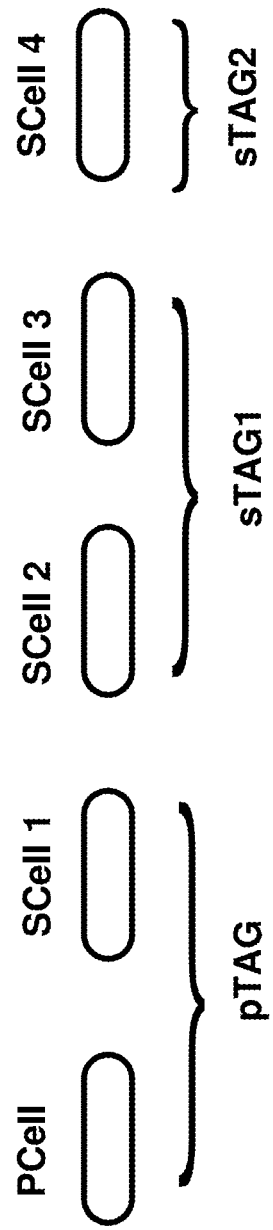
FIG. 8 gNB connected to NGC eLTE eNB connected to NGC

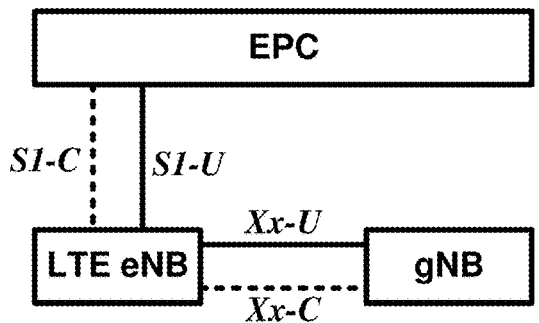

LTE eNB connected to EPC with non-standalone gNB.
gNB user plane connected to EPC via LTE eNB.

FIG. 11A

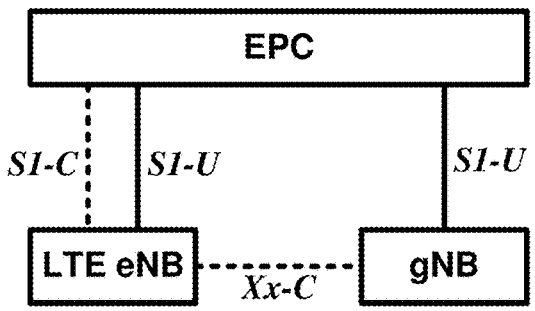

LTE eNB connected to EPC with non-standalone gNB.
gNB user plane connected to EPC directly.

FIG. 11B

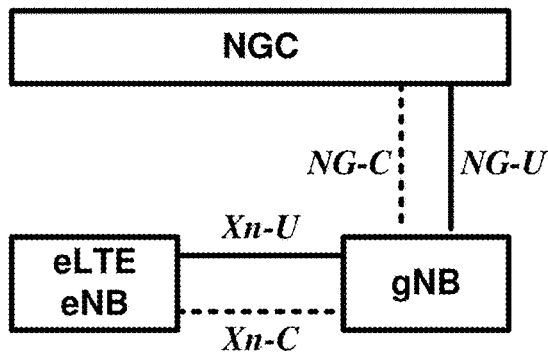

gNB connected to NGC with non-standalone eLTE eNB.
eLTE eNB user plane connected to NGC via gNB.

FIG. 11C

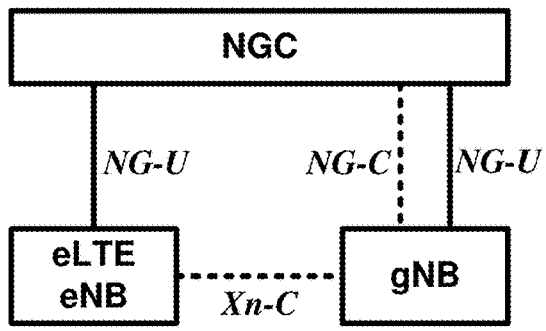

gNB connected to NGC with non-standalone eLTE eNB.
eLTE eNB user plane connected to NGC directly.

FIG. 11D

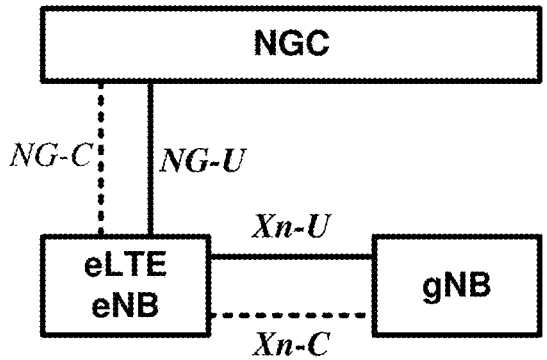

eLTE eNB connected to NGC with non-standalone gNB.
gNB user plane connected to NGC via eLTE eNB.

FIG. 11E

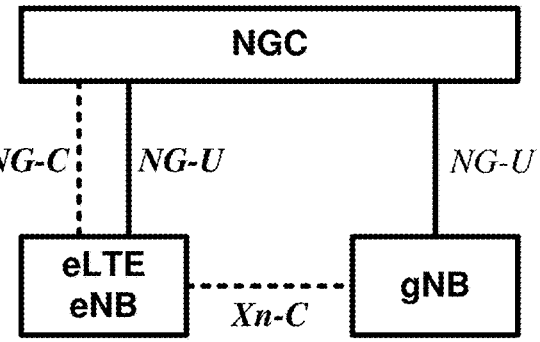

eLTE eNB connected to NGC with non-standalone gNB.
gNB user plane connected to NGC directly.

FIG. 11F

Radio protocol architecture for split bearer and SCG bearer. LTE eNB connected to EPC with non-standalone gNB.

Radio protocol architecture for split bearer and SCG bearer. gNB connected to NGC with non-standalone eLTE eNB.

Radio protocol architecture for split bearer and SCG bearer. eLTE eNB connected to NGC with non-standalone gNB.

Non-centralized deployment

Centralized deployment

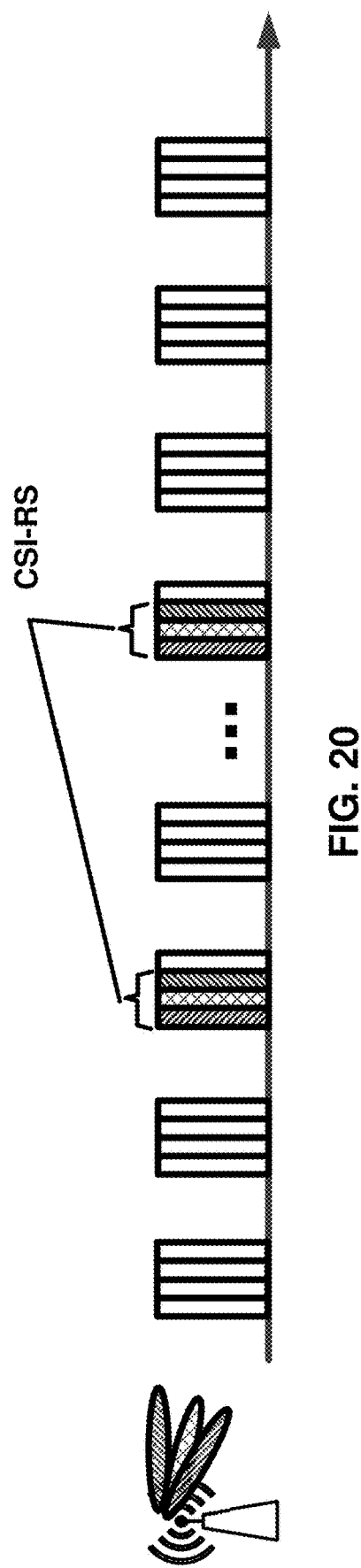

| Value of CSI request field | Description |
|---|---|
| '000' | No aperiodic CSI report is triggered |
| '001' | Aperiodic CSI report is triggered for a 1st set of {CSI process, CSI-RS resource} configured by higher layers for serving cell $c$ |
| '010' | Aperiodic CSI report is triggered for a 2nd set of {CSI process, CSI-RS resource} configured by higher layers for serving cell $c$ |
| '011' | Aperiodic CSI report is triggered for a 3rd set of {CSI process, CSI-RS resource} configured by higher layers for serving cell $c$ |
| '100' | Aperiodic CSI report is triggered for a 4th set of {CSI process, CSI-RS resource} configured by higher layers for serving cell $c$ |
| '101' | Aperiodic CSI report is triggered for a 5th set of {CSI process, CSI-RS resource} configured by higher layers for serving cell $c$ |
| '110' | Aperiodic CSI report is triggered for a 6th set of {CSI process, CSI-RS resource} configured by higher layers for serving cell $c$ |
| '111' | Aperiodic CSI report is triggered for a 7th set of {CSI process, CSI-RS resource} configured by higher layers for serving cell $c$ |

FIG. 22

| CSI-RS Configuration | Periodic CSI Reporting | Semi-Persistent CSI Reporting | Aperiodic CSI Reporting |
|---|---|---|---|
| Periodic CSI-RS | No dynamic triggering/activation | Reporting on PUCCH: The UE receives a selection command [10. TS 38.321] Reporting on PUSCH: DCI | DCI |
| Semi-Persistent CSI-RS | Not Supported | Reporting on PUCCH: The UE receives a selection command [10. TS 38.321] Reporting on PUSCH: DCI | DCI |
| Aperiodic CSI-RS | Not supported | Not supported | DCI |

FIG. 30

Receive, by a wireless device, message(s) comprising: 1st configuration parameters of a periodic CSI reporting; 2nd configuration parameters of a semi-persistent CSI reporting; and discontinuous reception configuration parameters
4410

Receive a control element indicating activation of semi-persistent CSI reports via a resources comprising a 1st resource of an uplink control channel
4420

Based on the discontinuous reception configuration parameters, is the wireless device in active time in a 1st transmission duration of the 1st resource?
4430

No

Based on the discontinuous reception configuration parameters, is the wireless device in active time in a 2nd transmission duration of a 2nd resource of the uplink control channel configured for a periodic CSI report?
4440

No

Transmit a semi-persistent CSI report via the 1st resource and do not transmit the periodic CSI report via the 2nd resource
4450

FIG. 44

DISCONTINUOUS RECEPTION INACTIVITY TIMER AND A SEMI-PERSISTENT CHANNEL STATE INFORMATION OF AA WIRELESS DEVICE

This application is a continuation of U.S. patent application Ser. No. 16/245,847, filed Jan. 11, 2019, which claims the benefit of U.S. Provisional Application No. 62/616,196, filed Jan. 11, 2018, and U.S. Provisional Application No. 62/616,202, filed Jan. 11, 2018, which are hereby incorporated by reference in their entirety.

BRIEF DESCRIPTION OF THE SEVERAL VIEWS OF THE DRAWINGS

Examples of several of the various embodiments of the present disclosure are described herein with reference to the drawings.

FIG. 5A, FIG. 5B, FIG. 5C and FIG. 5D are example diagrams for uplink and downlink signal transmission as per an aspect of embodiments of the present disclosure.

FIG. 8 shows example TAG configurations as per an aspect of an embodiment of the present disclosure.

FIG. 11A, FIG. 11B, FIG. 11C, FIG. 11D, FIG. 11E, and FIG. 11F are example diagrams for architectures of tight interworking between 5G RAN (e.g. gNB) and LTE RAN (e.g. (e)LTE eNB) as per an aspect of embodiments of the present disclosure.

FIG. 20 is an example CSI-RS transmission in a multi-beam system as per an aspect of an embodiment of the present disclosure.

FIG. 22 is an example of CSI request file for PDCCH/EPDCCH with uplink DCI format in UE specific search space as per an aspect of an embodiment of the present disclosure.

FIG. 30 is an example Triggering/Activation of CSI Reporting for the possible CSI-RS Configurations as per an aspect of an embodiment of the present disclosure.

FIG. 44 is an example flow diagram of an aspect of an embodiment of the present disclosure.

DETAILED DESCRIPTION OF EMBODIMENTS

Figure 1:
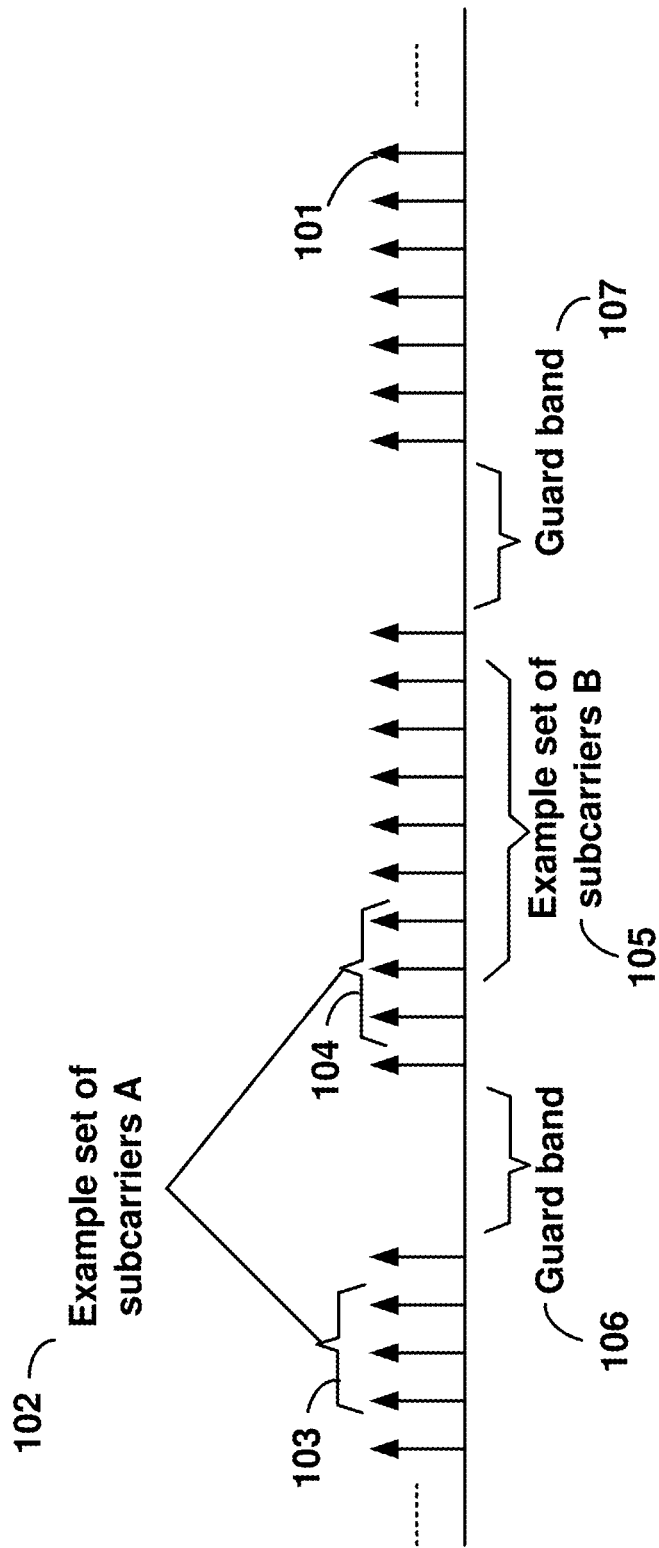
FIG. 1 is a diagram depicting example sets of OFDM subcarriers as per an aspect of an embodiment of the present disclosure.

Example embodiments of the present invention enable operation of DRX. Embodiments of the technology disclosed herein may be employed in the technical field of multicarrier communication systems. More particularly, the embodiments of the technology disclosed herein may relate to DRX operation in a multicarrier communication system.

The following Acronyms are used throughout the present disclosure:

| | |
|---|---|
| ASIC | application-specific integrated circuit |
| BPSK | binary phase shift keying |
| CA | carrier aggregation |
| CSI | channel state information |
| CDMA | code division multiple access |
| CSS | common search space |
| CPLD | complex programmable logic devices |
| CC | component carrier |
| CP | cyclic prefix |
| DL | downlink |
| DCI | downlink control information |
| DC | dual connectivity |
| eMBB | enhanced mobile broadband |
| EPC | evolved packet core |
| E-UTRAN | evolved-universal terrestrial radio access network |
| FPGA | field programmable gate arrays |
| FDD | frequency division multiplexing |
| HDL | hardware description languages |
| HARQ | hybrid automatic repeat request |
| IE | information element |
| LTE | long term evolution |
| MCG | master cell group |
| MeNB | master evolved node B |
| MIB | master information block |
| MAC | media access control |
| MAC | media access control |
| MME | mobility management entity |
| mMTC | massive machine type communications |
| NAS | non-access stratum |
| NR | new radio |
| OFDM | orthogonal frequency division multiplexing |
| PDCP | packet data convergence protocol |
| PDU | packet data unit |
| PHY | physical |
| PDCCH | physical downlink control channel |
| PHICH | physical HARQ indicator channel |
| PUCCH | physical uplink control channel |
| PUSCH | physical uplink shared channel |
| PCell | primary cell |
| PCell | primary cell |
| PCC | primary component carrier |
| PSCell | primary secondary cell |

-continued

| | |
|---|---|
| pTAG | primary timing advance group |
| QAM | quadrature amplitude modulation |
| QPSK | quadrature phase shift keying |
| RBG | resource block groups |
| RLC | radio link control |
| RRC | radio resource control |
| RA | random access |
| RB | resource blocks |
| SCC | secondary component carrier |
| SCell | secondary cell |
| Scell | secondary cells |
| SCG | secondary cell group |
| SeNB | secondary evolved node B |
| sTAGs | secondary timing advance group |
| SDU | service data unit |
| S-GW | serving gateway |
| SRB | signaling radio bearer |
| SC-OFDM | single carrier-OFDM |
| SFN | system frame number |
| SIB | system information block |
| TAI | tracking area identifier |
| TAT | time alignment timer |
| TDD | time division duplexing |
| TDMA | time division multiple access |
| TA | timing advance |
| TAG | timing advance group |
| TTI | transmission time intervalTB transport block |
| UL | uplink |
| UE | user equipment |
| URLLC | ultra-reliable low-latency communications |
| VHDL | VHSIC hardware description language |
| CU | central unit |
| DU | distributed unit |
| Fs-C | Fs-control plane |
| Fs-U | Fs-user plane |
| gNB | next generation node B |
| NGC | next generation core |
| NG CP | next generation control plane core |
| NG-C | NG-control plane |
| NG-U | NG-user plane |
| NR | new radio |
| NR MAC | new radio MAC |
| NR PHY | new radio physical |
| NR PDCP | new radio PDCP |
| NR RLC | new radio RLC |
| NR RRC | new radio RRC |
| NSSAI | network slice selection assistance information |
| PLMN | public land mobile network |
| UPGW | user plane gateway |
| Xn-C | Xn-control plane |
| Xn-U | Xn-user plane |
| Xx-C | Xx-control plane |
| Xx-U | Xx-user plane |

Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
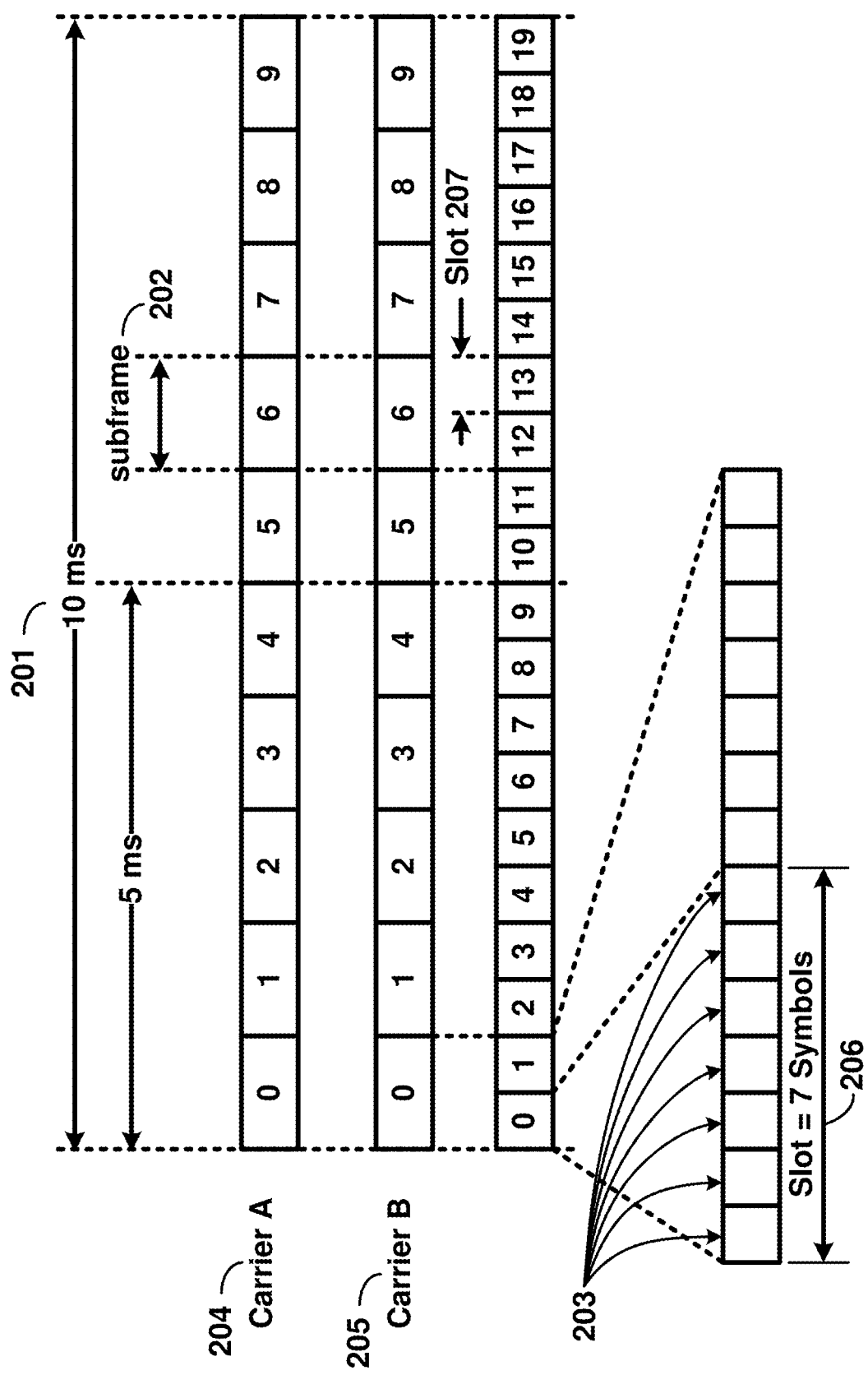
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
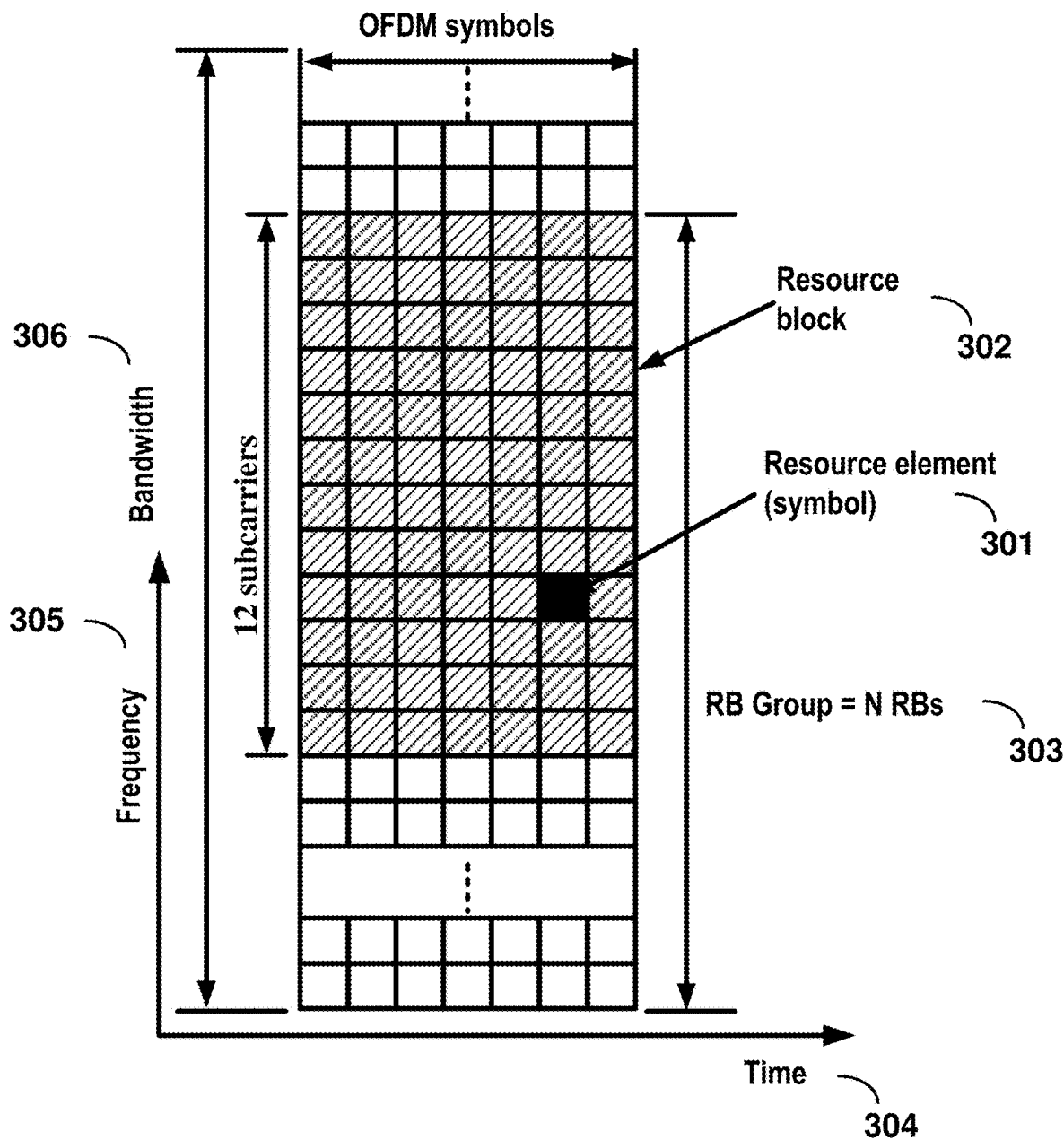
FIG. 3 is a diagram depicting OFDM radio resources as per an aspect of an embodiment of the present disclosure.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

In an example embodiment, multiple numerologies may be supported. In an example, a numerology may be derived by scaling a basic subcarrier spacing by an integer N. In an example, scalable numerology may allow at least from 15 kHz to 480 kHz subcarrier spacing. The numerology with 15 kHz and scaled numerology with different subcarrier spacing with the same CP overhead may align at a symbol boundary every 1 ms in a NR carrier.

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
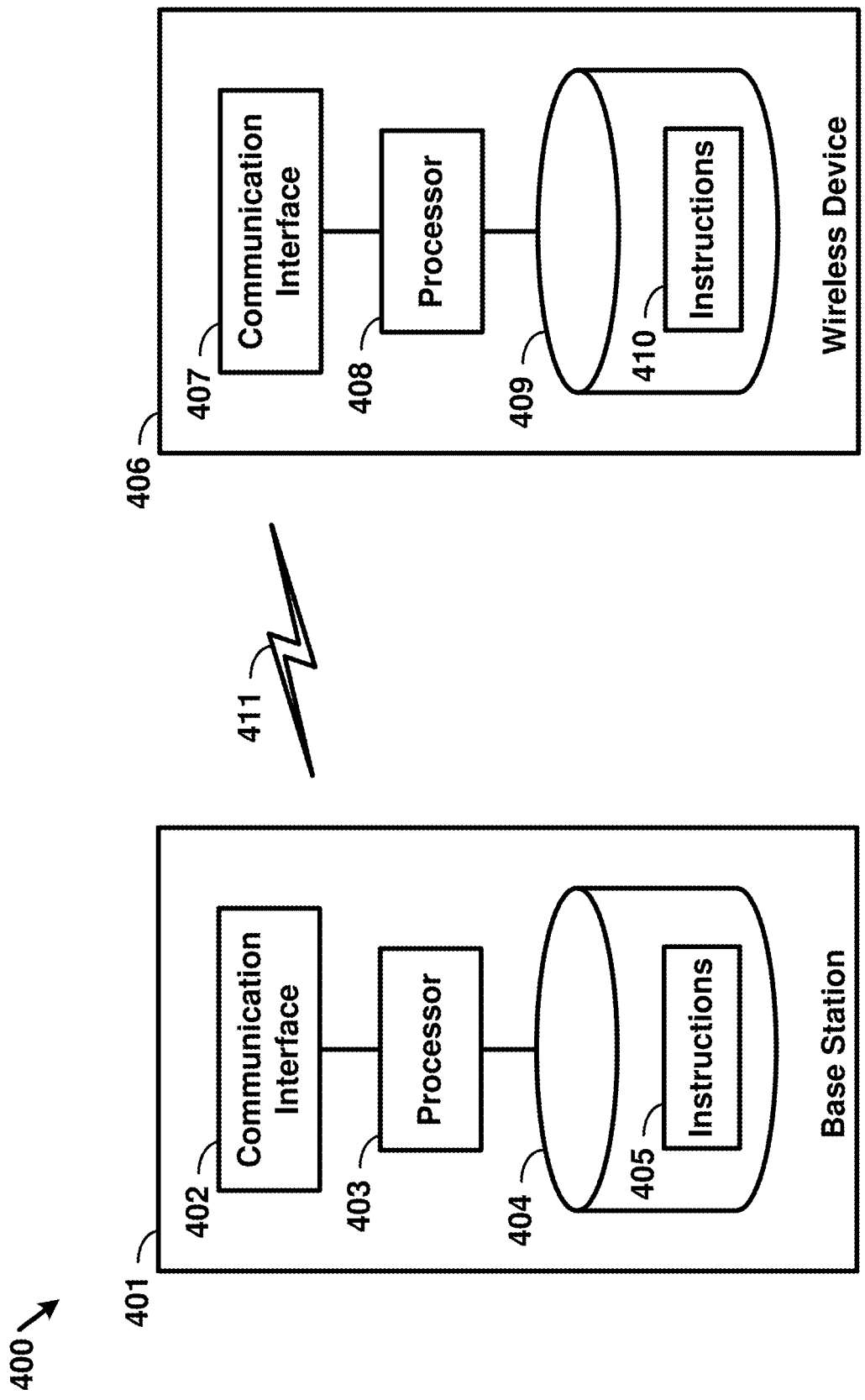
FIG. 4 is a block diagram of a base station and a wireless device as per an aspect of an embodiment of the present disclosure.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

Figure 10A:
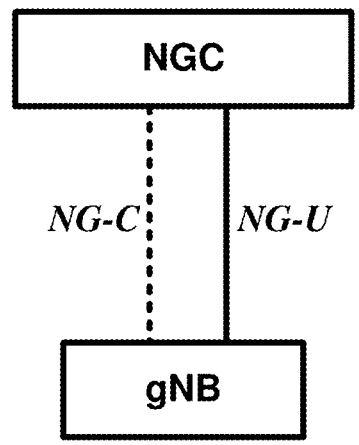
FIG. 10A and FIG. 10B are example diagrams for interfaces between a 5G core network (e.g. NGC) and base stations (e.g. gNB and eLTE eNB) as per an aspect of embodiments of the present disclosure.
Figure 10B:
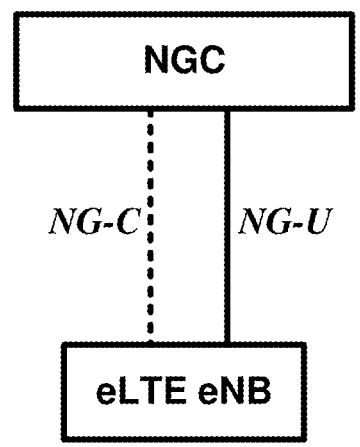

According to some of the various aspects of embodiments, a 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g. employing an Xn interface). The base stations may also be connected employing, for example, an NG interface to an NGC. FIG. 10A and FIG. 10B are example diagrams for interfaces between a 5G core network (e.g. NGC) and base stations (e.g. gNB and eLTE eNB) as per an aspect of an embodiment of the present invention. For example, the base stations may be interconnected to the NGC control plane (e.g. NG CP) employing the NG-C interface and to the NGC user plane (e.g. UPGW) employing the NG-U interface. The NG interface may support a many-to-many relation between 5G core networks and base stations.

A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

Figure 6:
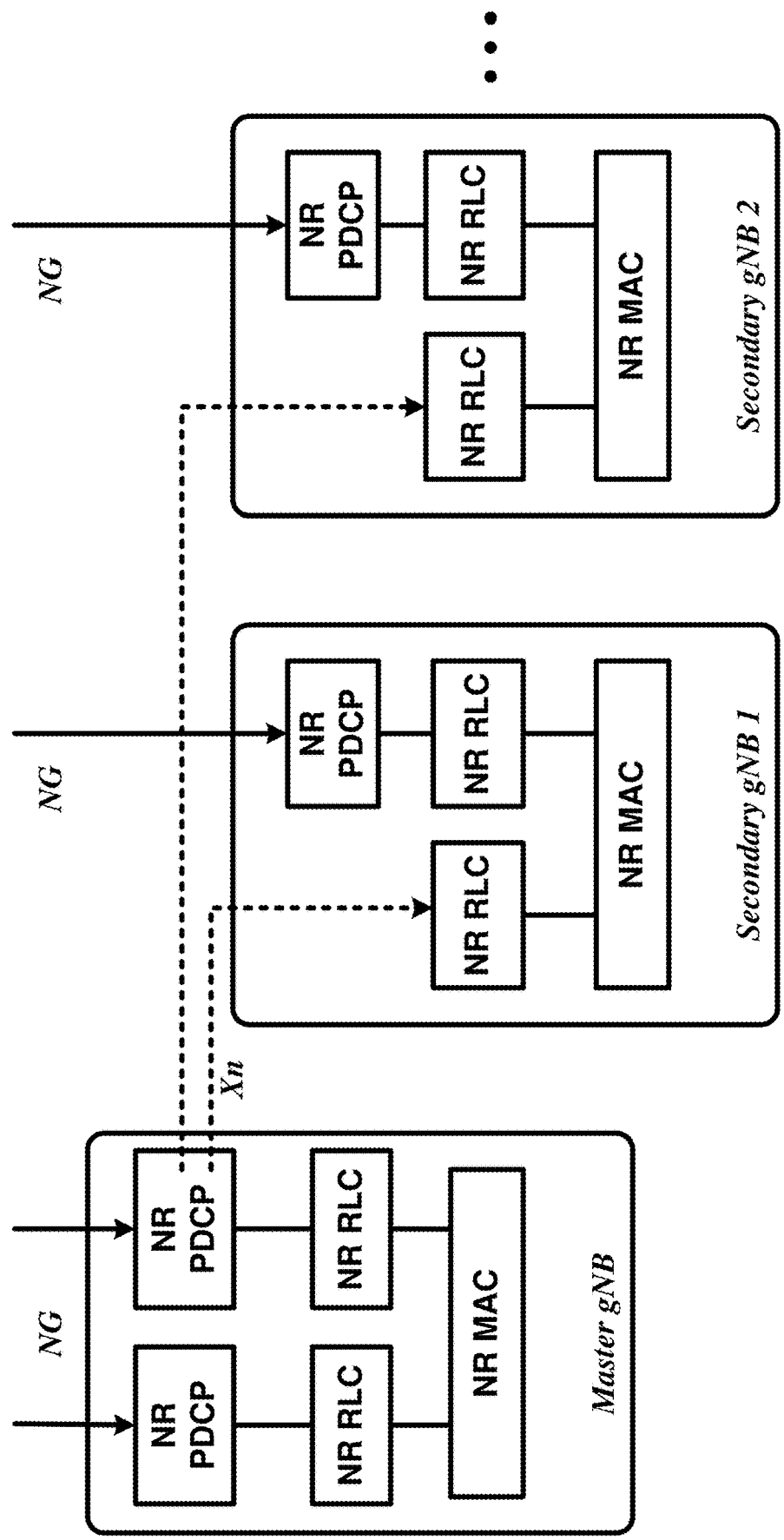
FIG. 6 is an example diagram for a protocol structure with multi-connectivity as per an aspect of an embodiment of the present disclosure.
Figure 7:
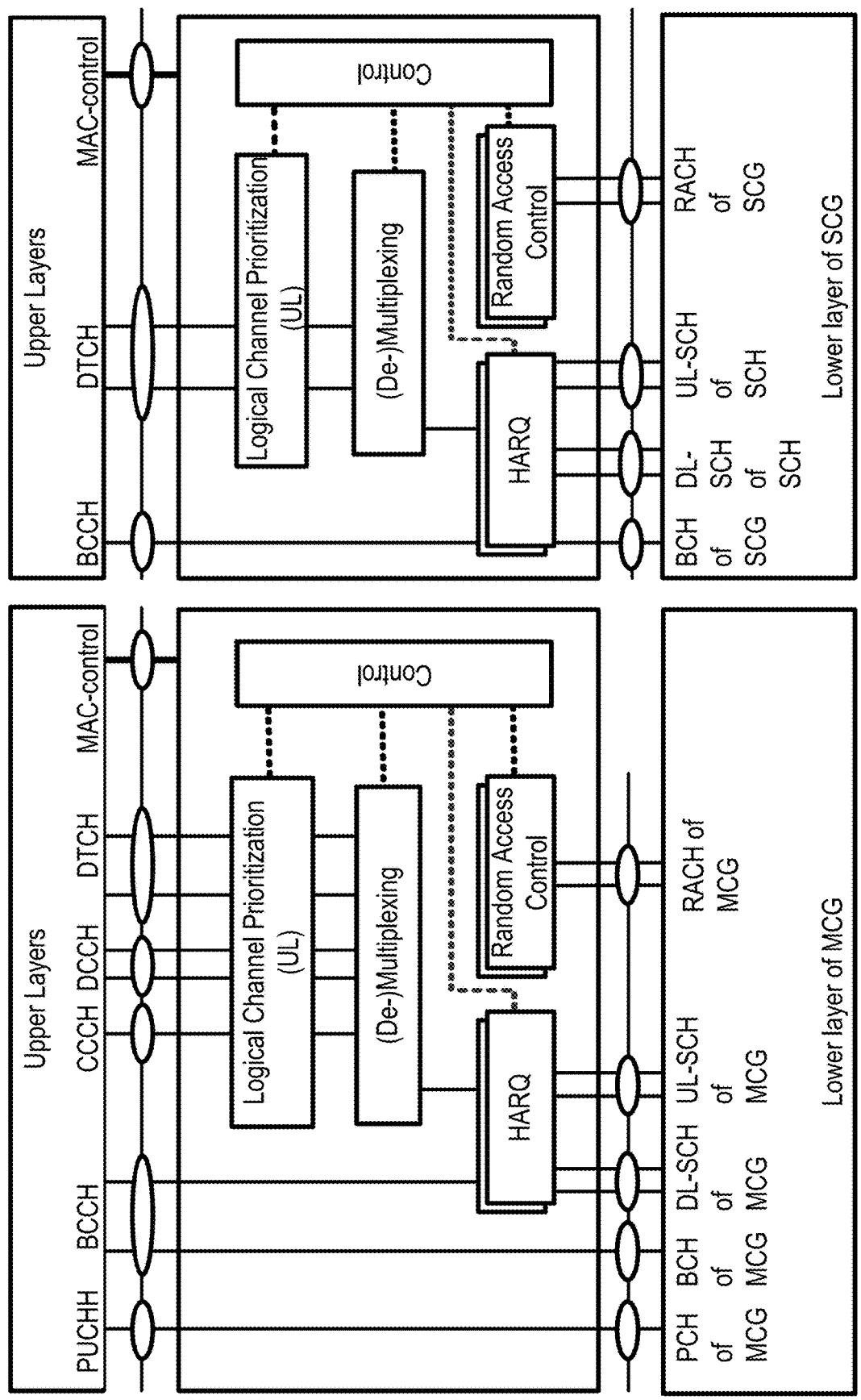
FIG. 7 is an example diagram for a protocol structure with CA and DC as per an aspect of an embodiment of the present disclosure.

FIG. 6 and FIG. 7 are example diagrams for protocol structure with CA and multi-connectivity as per an aspect of an embodiment of the present invention. NR may support multi-connectivity operation whereby a multiple RX/TX UE in RRC_CONNECTED may be configured to utilize radio resources provided by multiple schedulers located in multiple gNBs connected via a non-ideal or ideal backhaul over the Xn interface. gNBs involved in multi-connectivity for a certain UE may assume two different roles: a gNB may either act as a master gNB or as a secondary gNB. In multi-connectivity, a UE may be connected to one master gNB and one or more secondary gNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In multi-connectivity, the radio protocol architecture that a particular bearer uses may depend on how the bearer is setup. Three alternatives may exist, an MCG bearer, an SCG bearer and a split bearer as shown in FIG. 6. NR RRC may be located in master gNB and SRBs may be configured as a MCG bearer type and may use the radio resources of the master gNB. Multi-connectivity may also be described as having at least one bearer configured to use radio resources provided by the secondary gNB. Multi-connectivity may or may not be configured/implemented in example embodiments of the invention.

In the case of multi-connectivity, the UE may be configured with multiple NR MAC entities: one NR MAC entity for master gNB, and other NR MAC entities for secondary gNBs. In multi-connectivity, the configured set of serving cells for a UE may comprise of two subsets: the Master Cell Group (MCG) containing the serving cells of the master gNB, and the Secondary Cell Groups (SCGs) containing the serving cells of the secondary gNBs. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of NR RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master gNB may be informed by the UE of a SCG failure type, for split bearer, the DL data transfer over the master gNB is maintained; the NR RLC AM bearer may be configured for the split bearer; like PCell, PSCell may not be de-activated; PSCell may be changed with a SCG change (e.g. with security key change and a RACH procedure); and/or a direct bearer type change between a Split bearer and a SCG bearer or simultaneous configuration of a SCG and a Split bearer may or may not supported.

With respect to the interaction between a master gNB and secondary gNBs for multi-connectivity, one or more of the following principles may be applied: the master gNB may maintain the RRM measurement configuration of the UE and may, (e.g., based on received measurement reports or traffic conditions or bearer types), decide to ask a secondary gNB to provide additional resources (serving cells) for a UE; upon receiving a request from the master gNB, a secondary gNB may create a container that may result in the configuration of additional serving cells for the UE (or decide that it has no resource available to do so); for UE capability coordination, the master gNB may provide (part of) the AS configuration and the UE capabilities to the secondary gNB; the master gNB and the secondary gNB may exchange information about a UE configuration by employing of NR RRC containers (inter-node messages) carried in Xn messages; the secondary gNB may initiate a reconfiguration of its existing serving cells (e.g., PUCCH towards the secondary gNB); the secondary gNB may decide which cell is the PSCell within the SCG; the master gNB may or may not change the content of the NR RRC configuration provided by the secondary gNB; in the case of a SCG addition and a SCG SCell addition, the master gNB may provide the latest measurement results for the SCG cell(s); both a master gNB and secondary gNBs may know the SFN and subframe offset of each other by OAM, (e.g., for the purpose of DRX alignment and identification of a measurement gap). In an example, when adding a new SCG SCell, dedicated NR RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
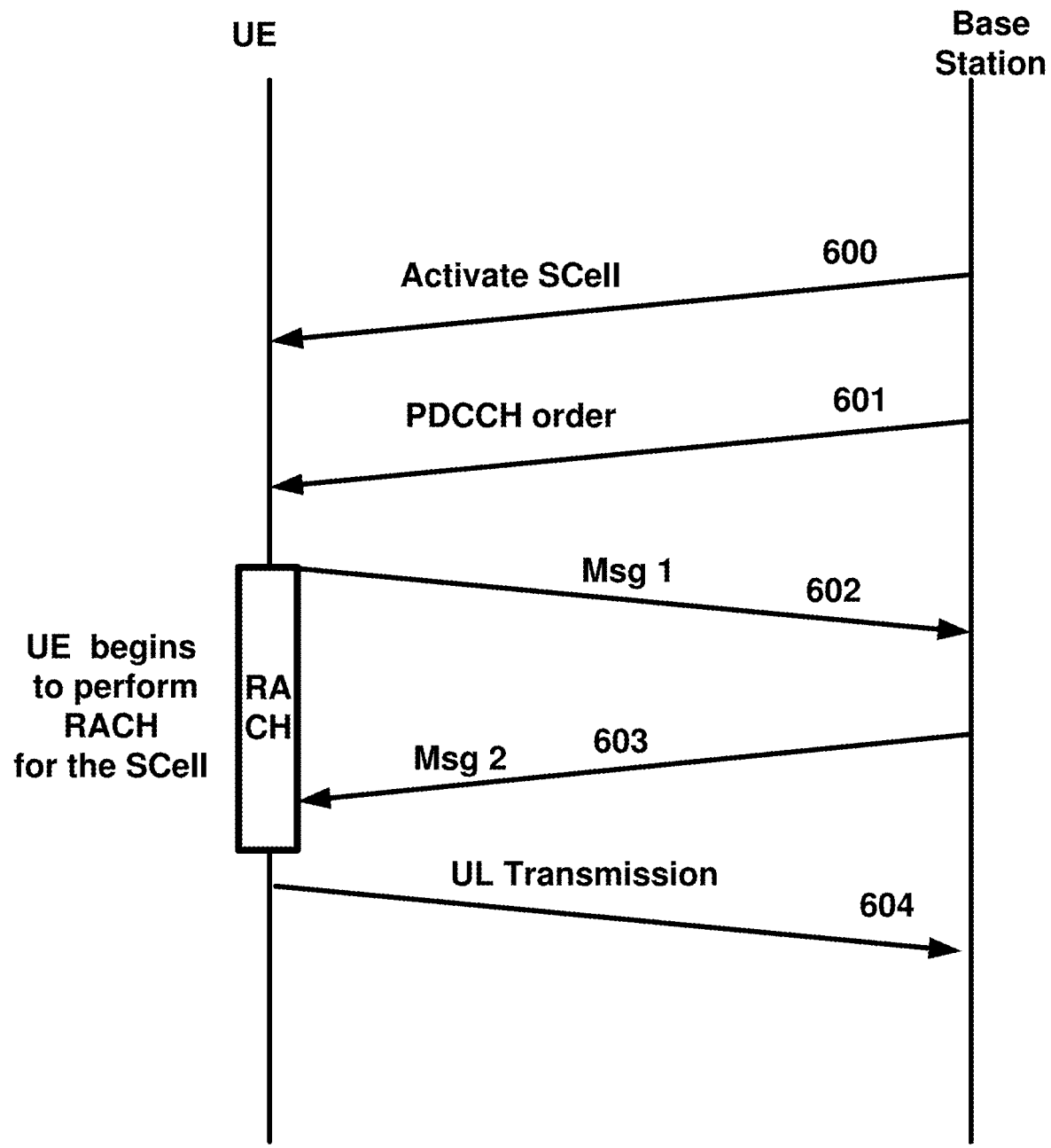
FIG. 9 is an example message flow in a random access process in a secondary TAG as per an aspect of an embodiment of the present disclosure.

FIG. 9 is an example message flow in a random access process in a secondary TAG as per an aspect of an embodiment of the present invention. An eNB transmits an activation command 600 to activate an SCell. A preamble 602

(Msg1) may be sent by a UE in response to a PDCCH order 601 on an SCell belonging to a sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the invention may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

FIG. 11A, FIG. 11B, FIG. 11C, FIG. 11D, FIG. 11E, and FIG. 11F are example diagrams for architectures of tight interworking between 5G RAN and LTE RAN as per an aspect of an embodiment of the present invention. The tight interworking may enable a multiple RX/TX UE in RRC_CONNECTED to be configured to utilize radio resources provided by two schedulers located in two base stations (e.g. (e)LTE eNB and gNB) connected via a non-ideal or ideal backhaul over the Xx interface between LTE eNB and gNB or the Xn interface between eLTE eNB and gNB. Base stations involved in tight interworking for a certain UE may assume two different roles: a base station may either act as a master base station or as a secondary base station. In tight interworking, a UE may be connected to one master base station and one secondary base station. Mechanisms implemented in tight interworking may be extended to cover more than two base stations.

In FIG. 11A and FIG. 11B, a master base station may be an LTE eNB, which may be connected to EPC nodes (e.g. to an MME via the S1-C interface and to an S-GW via the S1-U interface), and a secondary base station may be a gNB, which may be a non-standalone node having a control plane connection via an Xx-C interface to an LTE eNB. In the tight interworking architecture of FIG. 11A, a user plane for a gNB may be connected to an S-GW through an LTE eNB via an Xx-U interface between LTE eNB and gNB and an S1-U interface between LTE eNB and S-GW. In the architecture of FIG. 11B, a user plane for a gNB may be connected directly to an S-GW via an S1-U interface between gNB and S-GW.

In FIG. 11C and FIG. 11D, a master base station may be a gNB, which may be connected to NGC nodes (e.g. to a control plane core node via the NG-C interface and to a user plane core node via the NG-U interface), and a secondary base station may be an eLTE eNB, which may be a non-standalone node having a control plane connection via an Xn-C interface to a gNB. In the tight interworking architecture of FIG. 11C, a user plane for an eLTE eNB may be connected to a user plane core node through a gNB via an Xn-U interface between eLTE eNB and gNB and an NG-U interface between gNB and user plane core node. In the architecture of FIG. 11D, a user plane for an eLTE eNB may be connected directly to a user plane core node via an NG-U interface between eLTE eNB and user plane core node.

In FIG. 11E and FIG. 11F, a master base station may be an eLTE eNB, which may be connected to NGC nodes (e.g. to a control plane core node via the NG-C interface and to a user plane core node via the NG-U interface), and a secondary base station may be a gNB, which may be a non-standalone node having a control plane connection via an Xn-C interface to an eLTE eNB. In the tight interworking architecture of FIG. 11E, a user plane for a gNB may be connected to a user plane core node through an eLTE eNB via an Xn-U interface between eLTE eNB and gNB and an NG-U interface between eLTE eNB and user plane core node. In the architecture of FIG. 11F, a user plane for a gNB may be connected directly to a user plane core node via an NG-U interface between gNB and user plane core node.

Figure 12A:
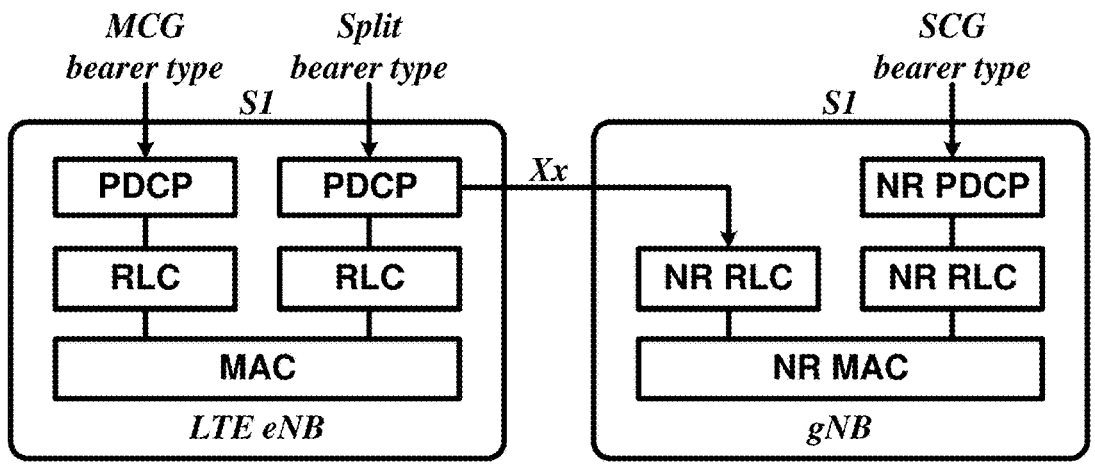
FIG. 12A, FIG. 12B, and FIG. 12C are example diagrams for radio protocol structures of tight interworking bearers as per an aspect of embodiments of the present disclosure.
Figure 12B:
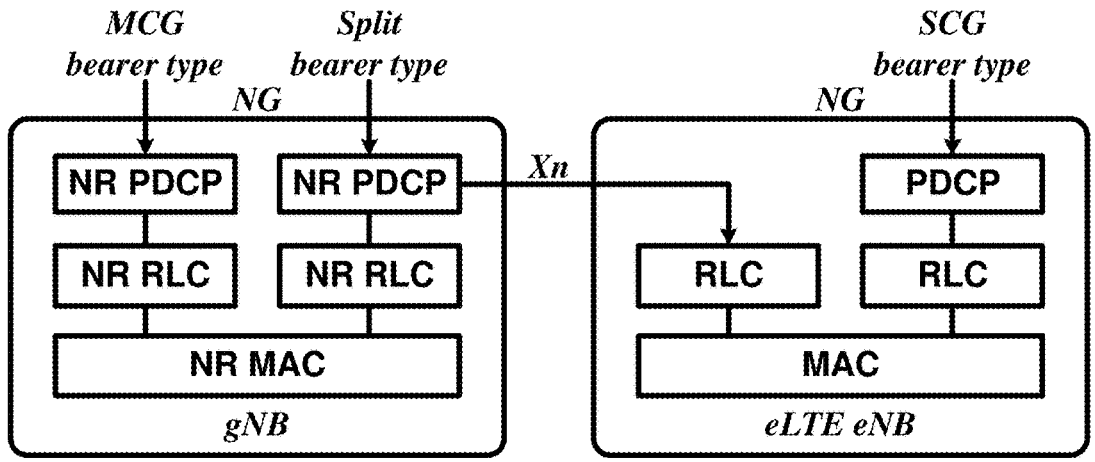
Figure 12C:
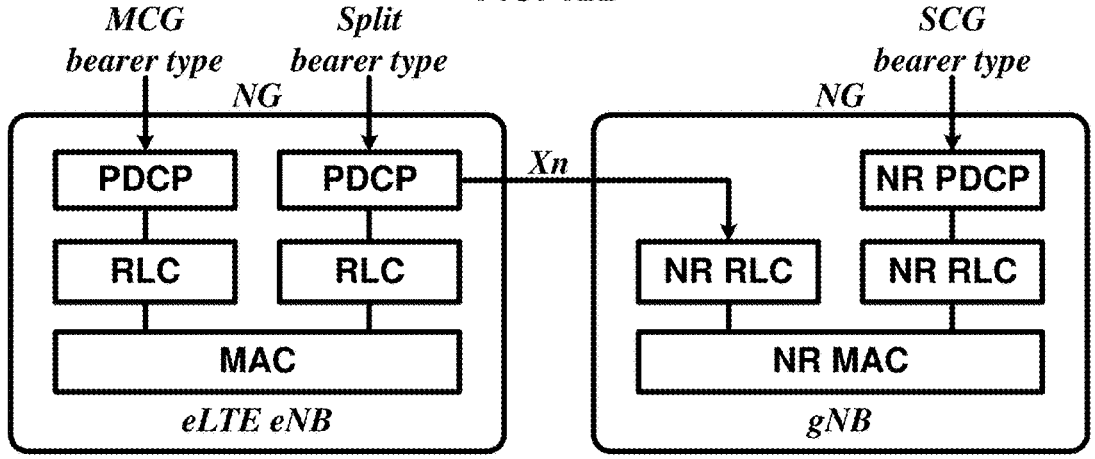

FIG. 12A, FIG. 12B, and FIG. 12C are example diagrams for radio protocol structures of tight interworking bearers as per an aspect of an embodiment of the present invention. In FIG. 12A, an LTE eNB may be a master base station, and a gNB may be a secondary base station. In FIG. 12B, a gNB may be a master base station, and an eLTE eNB may be a secondary base station. In FIG. 12C, an eLTE eNB may be a master base station, and a gNB may be a secondary base station. In 5G network, the radio protocol architecture that a particular bearer uses may depend on how the bearer is setup. Three alternatives may exist, an MCG bearer, an SCG bearer, and a split bearer as shown in FIG. 12A, FIG. 12B, and FIG. 12C. NR RRC may be located in master base station, and SRBs may be configured as an MCG bearer type and may use the radio resources of the master base station. Tight interworking may also be described as having at least one bearer configured to use radio resources provided by the secondary base station. Tight interworking may or may not be configured/implemented in example embodiments of the invention.

In the case of tight interworking, the UE may be configured with two MAC entities: one MAC entity for master base station, and one MAC entity for secondary base station. In tight interworking, the configured set of serving cells for a UE may comprise of two subsets: the Master Cell Group (MCG) containing the serving cells of the master base station, and the Secondary Cell Group (SCG) containing the serving cells of the secondary base station. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one split bearer; upon detection of a physical layer problem or a random access problem on a PSCell, or the maximum number of (NR) RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master base station may be informed by the UE of a SCG failure type, for split bearer, the DL data transfer over the master base station is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a master base station and a secondary base station, one or more of the following principles may be applied: the master base station may maintain the RRM measurement configuration of the UE and may, (e.g., based on received measurement reports, traffic conditions, or bearer types), decide to ask a secondary base station to provide additional resources (serving cells) for a UE; upon receiving a request from the master base station, a secondary base station may create a container that may result in the configuration of additional serving cells for the UE (or decide that it has no resource available to do so); for UE capability coordination, the master base station may provide (part of) the AS configuration and the UE capabilities to the secondary base station; the master base station and the secondary base station may exchange information about a UE configuration by employing of RRC containers (inter-node messages) carried in Xn or Xx messages; the secondary base station may initiate a reconfiguration of its existing serving cells (e.g., PUCCH towards the secondary base station); the secondary base station may decide which cell is the PSCell within the SCG; the master base station may not change the content of the RRC configuration provided by the secondary base station; in the case of a SCG addition and a SCG SCell addition, the master base station may provide the latest measurement results for the SCG cell(s); both a master base station and a secondary base station may know the SFN and subframe offset of each other by OAM, (e.g., for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

Figure 13A:
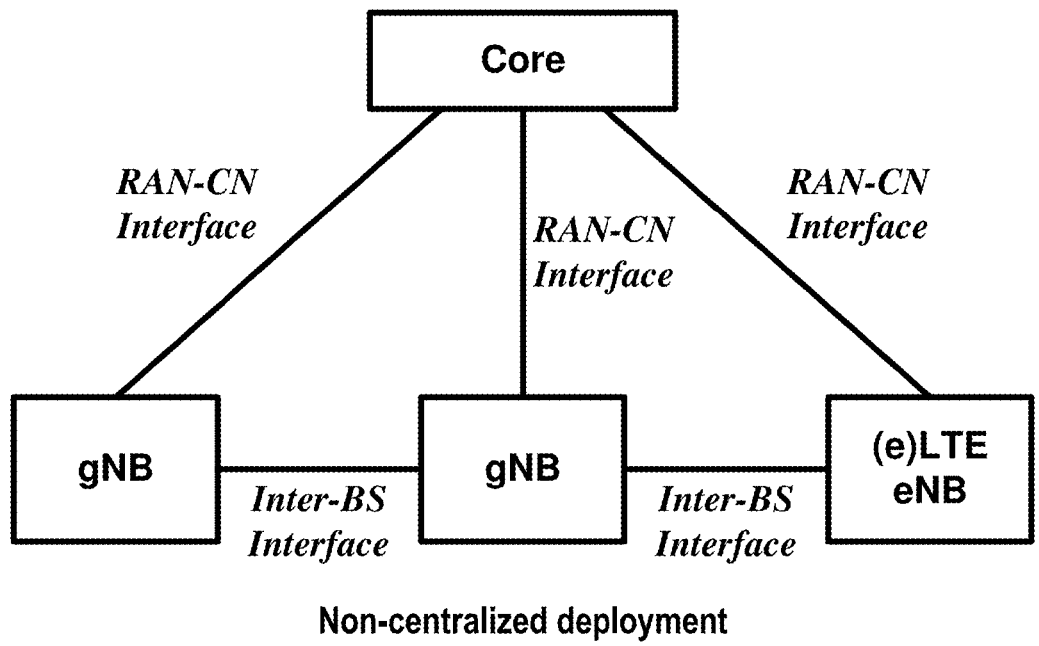
FIG. 13A and FIG. 13B are example diagrams for gNB deployment scenarios as per an aspect of embodiments of the present disclosure.
Figure 13B:
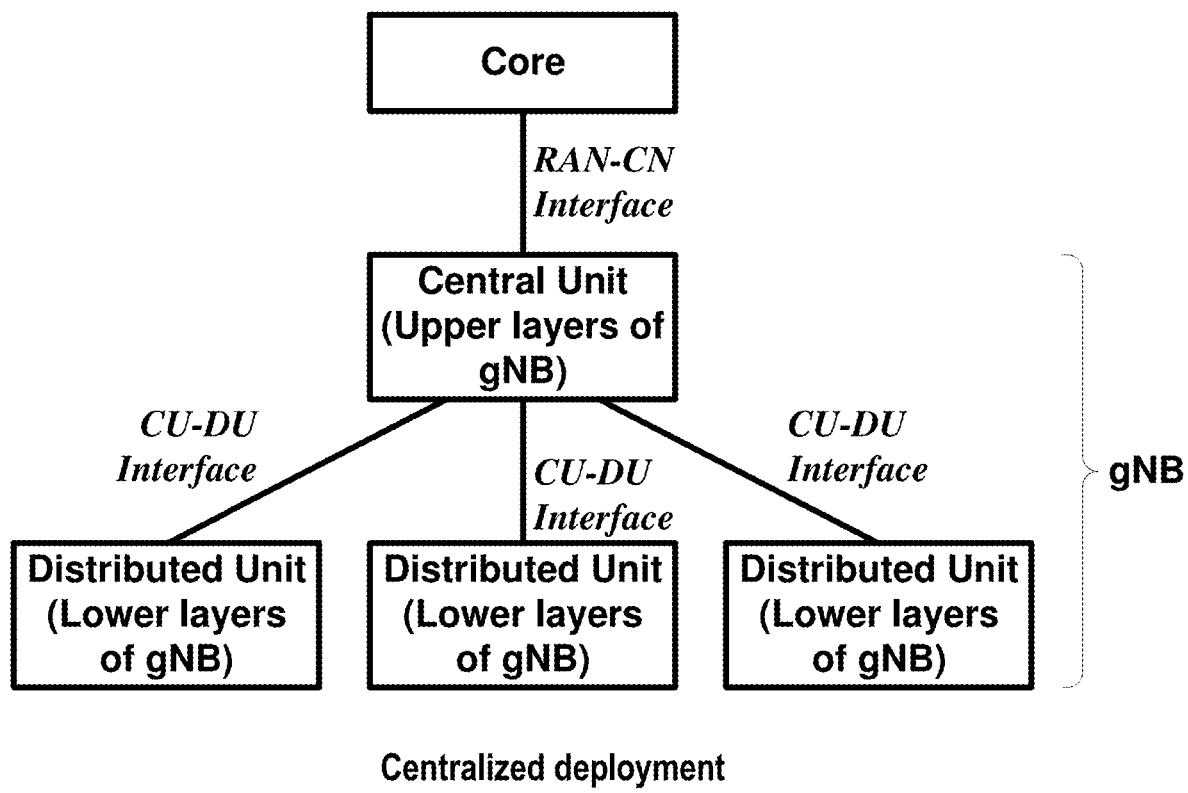

FIG. 13A and FIG. 13B are example diagrams for gNB deployment scenarios as per an aspect of an embodiment of the present invention. In the non-centralized deployment scenario in FIG. 13A, the full protocol stack (e.g. NR RRC, NR PDCP, NR RLC, NR MAC, and NR PHY) may be supported at one node. In the centralized deployment scenario in FIG. 13B, upper layers of gNB may be located in a Central Unit (CU), and lower layers of gNB may be located in Distributed Units (DU). The CU-DU interface (e.g. Fs interface) connecting CU and DU may be ideal or non-ideal. Fs-C may provide a control plane connection over Fs interface, and Fs-U may provide a user plane connection over Fs interface. In the centralized deployment, different functional split options between CU and DUs may be possible by locating different protocol layers (RAN functions) in CU and DU. The functional split may support flexibility to move RAN functions between CU and DU depending on service requirements and/or network environments. The functional split option may change during operation after Fs interface setup procedure, or may change only in Fs setup procedure (i.e. static during operation after Fs setup procedure).

Figure 14:
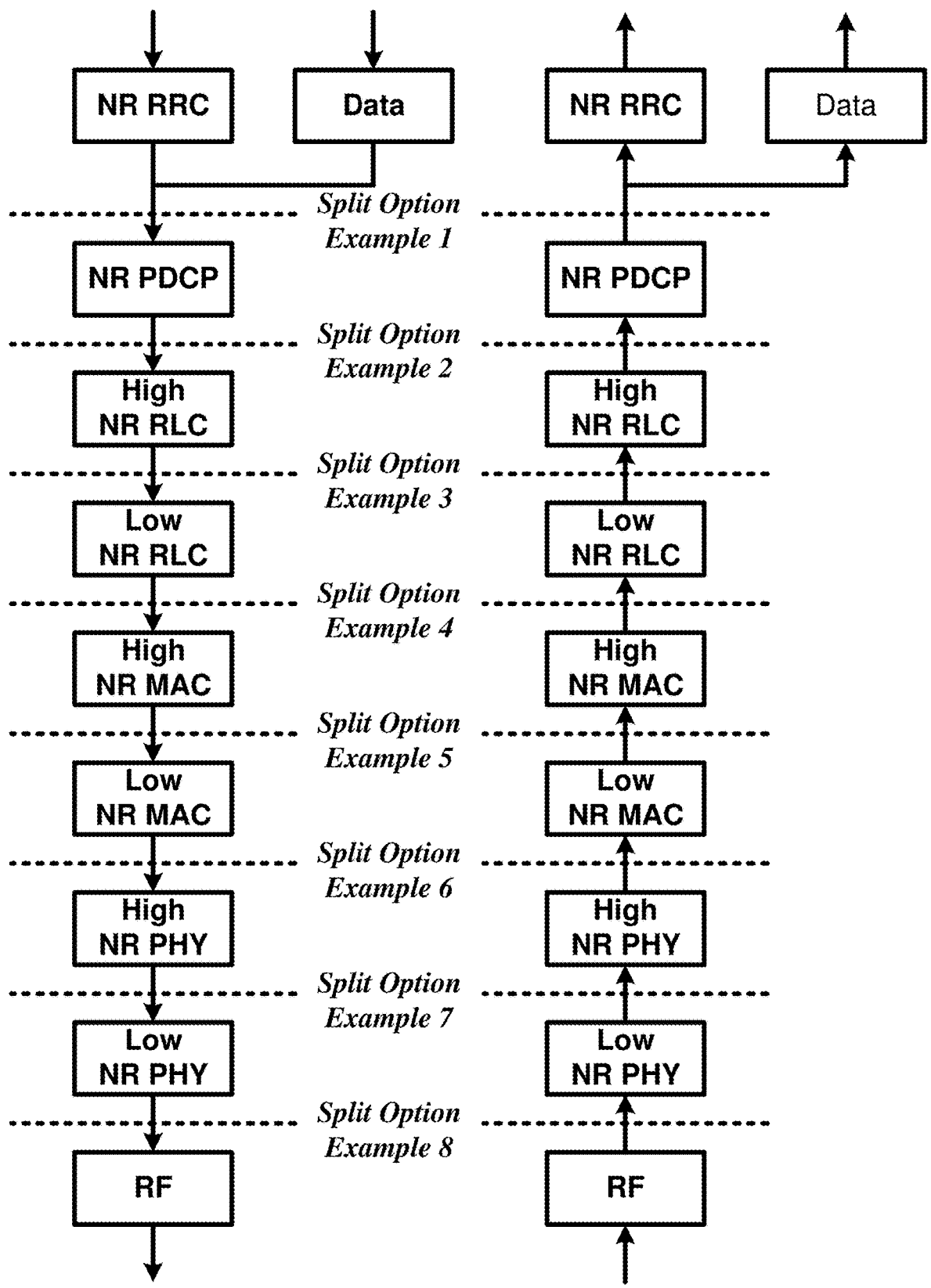
FIG. 14 is an example diagram for functional split option examples of the centralized gNB deployment scenario as per an aspect of an embodiment of the present disclosure.

FIG. 14 is an example diagram for different functional split option examples of the centralized gNB deployment scenario as per an aspect of an embodiment of the present invention. In the split option example 1, an NR RRC may be in CU, and NR PDCP, NR RLC, NR MAC, NR PHY, and RF may be in DU. In the split option example 2, an NR RRC and NR PDCP may be in CU, and NR RLC, NR MAC, NR PHY, and RF may be in DU. In the split option example 3, an NR RRC, NR PDCP, and partial function of NR RLC may be in CU, and the other partial function of NR RLC, NR MAC, NR PHY, and RF may be in DU. In the split option example 4, an NR RRC, NR PDCP, and NR RLC may be in CU, and NR MAC, NR PHY, and RF may be in DU. In the split option example 5, an NR RRC, NR PDCP, NR RLC, and partial function of NR MAC may be in CU, and the other partial function of NR MAC, NR PHY, and RF may be in DU. In the split option example 6, an NR RRC, NR PDCP, NR RLC, and NR MAC may be in CU, and NR PHY and RF may be in DU. In the split option example 7, an NR RRC, NR PDCP, NR RLC, NR MAC, and partial function of NR PHY may be in CU, and the other partial function of NR PHY and RF may be in DU. In the split option example 8, an NR RRC, NR PDCP, NR RLC, NR MAC, and NR PHY may be in CU, and RF may be in DU.

The functional split may be configured per CU, per DU, per UE, per bearer, per slice, or with other granularities. In per CU split, a CU may have a fixed split, and DUs may be configured to match the split option of CU. In per DU split, each DU may be configured with a different split, and a CU may provide different split options for different DUs. In per UE split, a gNB (CU and DU) may provide different split options for different UEs. In per bearer split, different split options may be utilized for different bearer types. In per slice splice, different split options may be applied for different slices.

In an example embodiment, the new radio access network (new RAN) may support different network slices, which may allow differentiated treatment customized to support different service requirements with end to end scope. The new RAN may provide a differentiated handling of traffic for different network slices that may be pre-configured, and may allow a single RAN node to support multiple slices. The new RAN may support selection of a RAN part for a given network slice, by one or more slice ID(s) or NSSAI(s) provided by a UE or a NGC (e.g. NG CP). The slice ID(s) or NSSAI(s) may identify one or more of preconfigured network slices in a PLMN. For initial attach, a UE may provide a slice ID and/or an NSSAI, and a RAN node (e.g. gNB) may use the slice ID or the NSSAI for routing an initial NAS signaling to an NGC control plane function (e.g. NG CP). If a UE does not provide any slice ID or NSSAI, a RAN node may send a NAS signaling to a default NGC control plane function. For subsequent accesses, the UE may provide a temporary ID for a slice identification, which may be assigned by the NGC control plane function, to enable a RAN node to route the NAS message to a relevant NGC control plane function. The new RAN may support resource isolation between slices. The RAN resource isolation may be achieved by avoiding that shortage of shared resources in one slice breaks a service level agreement for another slice.

The amount of data traffic carried over cellular networks is expected to increase for many years to come. The number of users/devices is increasing, and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

In an example embodiment, with operation in bandwidth parts (BWPs) of a serving cell, a UE may be configured by higher layers for the serving cell, a set of bandwidth parts (BWPs) for receptions by the UE (DL BWP set), or a set of BWPs for transmissions by the UE (UL BWP set). In an example, for a DL BWP or UL BWP in a set of DL BWPs or UL BWPs, respectively, the UE may be configured at least one of following for the serving cell: a subcarrier spacing (SCS) for DL and/or UL BWP, a cyclic (CP) prefix for DL and/or UL BWP, a number of contiguous PRBs for DL and/or UL BWP, an offset of the first PRB for DL and/or UL in the number of contiguous PRBs relative to the first PRB of a reference location, or Q control resource sets if the BWP is a DL BWP.

In an example embodiment, for each serving cell, higher layer signaling may configure a UE with Q control resource sets. In an example, for control resource set q, $0 \leq q < Q$, the configuration may comprise at least one of following: a first OFDM symbol, a number of consecutive OFDM symbols, a set of resource blocks, a CCE-to-REG mapping, a REG bundle size, in case of interleaved CCE-to-REG mapping, or antenna port quasi-collocation.

In an example embodiment, a control resource set may comprise a set of CCEs numbered from 0 to $N_{CCE,q}-1$ where $N_{CCE,q}$ may be the number of CCEs in control resource set q.

In an example embodiment, the sets of PDCCH candidates that a UE monitors may be defined in terms of PDCCH UE-specific search spaces. A PDCCH UE-specific search space at CCE aggregation level $L \in \{1, 2, 4, 8\}$ may be defined by a set of PDCCH candidates for CCE aggregation level L. In an example, for a DCI format, a UE may be configured per serving cell by one or more higher layer parameters a number of PDCCH candidates per CCE aggregation level L.

In an example embodiment, in non-DRX mode operation, a UE may monitor one or more PDCCH candidate in control resource set q according to a periodicity of $W_{PDCCH,\ q}$ symbols that may be configured by one or more higher layer parameters for control resource set q.

In an example embodiment, if a UE is configured with higher layer parameter, e.g., cif-InSchedulingCell, the carrier indicator field value may correspond to cif-InSchedulingCell.

In an example embodiment, for the serving cell on which a UE may monitor one or more PDCCH candidate in a UE-specific search space, if the UE is not configured with a carrier indicator field, the UE may monitor the one or more PDCCH candidates without carrier indicator field. In an example, for the serving cell on which a UE may monitor one or more PDCCH candidates in a UE-specific search space, if a UE is configured with a carrier indicator field, the UE may monitor the one or more PDCCH candidates with carrier indicator field.

In an example embodiment, a UE may not monitor one or more PDCCH candidates on a secondary cell if the UE is configured to monitor one or more PDCCH candidates with carrier indicator field corresponding to that secondary cell in another serving cell. For example, for the serving cell on which the UE may monitor one or more PDCCH candidates, the UE may monitor the one or more PDCCH candidates at least for the same serving cell.

In an example embodiment, a UE may receive PDCCH and PDSCH in a DL BWP according to a configured SCS and CP length for the DL BWP. A UE may transmit PUCCH and PUSCH in an UL BWP according to a configured SCS and CP length for the UL BWP.

In an example embodiment, a UE may be configured, by one or more higher layer parameters, a DL BWP from a configured DL BWP set for DL receptions. A UE may be configured by one or more higher layer parameters, an UL BWP from a configured UL BWP set for UL transmissions. If a DL BWP index field is configured in a DCI format scheduling PDSCH reception to a UE, the DL BWP index field value may indicate the DL BWP, from the configured DL BWP set, for DL receptions. If an UL-BWP index field is configured in a DCI format scheduling PUSCH transmission from a UE, the UL-BWP index field value may indicate the UL BWP, from the configured UL BWP set, for UL transmissions.

In an example embodiment, for TDD, a UE may expect that the center frequency for the DL BWP is same as the center frequency for the UL BWP.

In an example embodiment, a UE may not monitor PDCCH when the UE performs measurements over a bandwidth that is not within the DL BWP for the UE.

In an example embodiment, for an initial active DL BWP, UE may identify the bandwidth and frequency of the initial active DL BWP in response to receiving the NR-PBCH.

In an example embodiment, a bandwidth of an initial active DL BWP may be confined within the UE minimum bandwidth for the given frequency band. For example, for flexible for DL information scheduling, the bandwidth may be indicated in PBCH, and/or some bandwidth candidates may be predefined. For example, x bits may be employed for indication.

In an example embodiment, a frequency location of initial active DL BWP may be derived from the bandwidth and SS block, e.g. center frequency of the initial active DL BWP. For example, a SS block may have a frequency offset, as the edge of SS block PRB and data PRB boundary may not be aligned. Predefining the frequency location of SS block and initial active DL BWP may reduce the PBCH payload size, additional bits are not needed for indication of frequency location of initial active DL BWP.

In an example, for the paired UL BWP, the bandwidth and frequency location may be informed in RMSI.

In an example embodiment, for a UE, gNB may configure a set of BWPs by RRC. The UE may transmit or receive in an active BWP from the configured BWPs in a given time instance. For example, an activation/deactivation of DL bandwidth part by means of timer for a UE to switch its active DL bandwidth part to a default DL bandwidth part may be supported. In this case, when the timer expires, e.g. the UE has not received scheduling DCI for X ms, the UE may switch to the default DL BWP.

In an example, a new timer, e.g., BWPDeactivationTimer, may be defined to deactivate the original BWP and switch to the default BWP. The BWPDeactivationTimer may be started when the original BWP is activated by the activation/deactivation DCI. If PDCCH on the original BWP is received, a UE may restart the BWPDeactivationTimer associated with the original BWP. For example, if the BWPDeactivationTimer expires, a UE may deactivate the original BWP and switch to the default BWP, may stop the BWPDeactivationTimer for the original BWP, and may (or may not) flush all HARQ buffers associated with the original BWP.

In an example embodiment, gNB and UE may have different understanding of the starting of the timer since the UE may miss scheduling grants. In an example, the UE may be triggered to switch to the default BWP, but gNB may schedules the UE in the previous active BWP. For example, in the case that the default BWP is nested within other BWPs, gNB may restrict the location of the CORESET of BWP2 to be within BWP1 (e.g., the narrow band BWP1 may be the default BWP). Then the UE may receive CORESET and switch back to BWP2 if it mistakenly switches to the default BWP.

In an example embodiment, for a case that the default BWP and the other BWPs are not overlapped in frequency domain, it may not solve a miss switching problem by restricting the location of the CORESET. For example, the gNB may maintain a timer for a UE. When the timer expires, e.g. there is no data scheduling for the UE for Y ms, or gNB has not received feedback from the UE for Y' ms, the UE may switch to the default BWP, and the gNB may send paging signal or re-schedule the UE in the default BWP.

In an example embodiment, gNB may not fix the default BWP to be the same as initial active BWP. Since the initial active DL BWP may be the SS block bandwidth which is common to UEs in the cell, the traffic load may be very heavy if many UEs fall back to such small bandwidth for data transmission. Configuring the UEs with different default BWPs may help to balance the load in the system bandwidth.

In an example embodiment, on a SCell, there may be no initial active BWP since the initial access is performed on the PCell. For example, the initially activated DL BWP and/or UL BWP when the SCell is activated may be configured or reconfigured by RRC signaling. In an example, the default BWP of the SCell may also be configured or reconfigured by RRC signaling. To strive for a unified design for both PCell and SCell, the default BWP may be configured or reconfigured by the RRC signaling, and the default BWP may be one of the configured BWPs of the UE.

In an example embodiment, gNB may configure UE-specific default DL BWP other than initial active BWP after RRC connection, e.g., for the purpose of load balancing. The default BWP may support other connected mode operations (besides operations supported by initial active BWP) for example fall back and connected mode paging. In this case, the default BWP may comprise common search space, at least the search space needed for monitoring the pre-emption indications. For example, for FDD, the default DL and UL BWPs may be independently configured to the UE.

In an example, the initial active DL/UL BWP may be set as default DL/UL BWP. In an example, a UE may return to default DL/UL BWP in some cases. For example, if a UE does not receive control for a long time, the UE may fallback to default BWP.

In an example embodiment, gNB may configure UE with multiple BWPs. For example, the multiple BWPs may share at least one CORESET including default BWP. For example, CORESET for RMSI may be shared for all configured BWP.

Without going back to another BWP or default BWP, the UE may receive control information via the common CORESET. To minimize the ambiguity of resource allocation, the common CORESET may schedule data within only default BWP. For example, frequency region of default BWP may belong to all the configured BWPs.

In an example embodiment, when the configured BWP is associated with a different numerology from default BWP, a semi-static pattern of BWP switching to default BWP may be performed. For example, to check RMSI at least periodically, switching to default BWP may be performed. This may be necessary particularly when BWPs use different numerologies.

In an example embodiment, in terms of reconfiguration of default BWP from initial BWP, it may be considered for RRC connected UEs. For RRC IDLE UEs, default BWP may be same as initial BWP (or, RRC IDLE UE may fallback to initial BWP regardless of default BWP). If a UE performs measurement based on SS block, reconfiguration of default BWP outside of initial BWP may become very inefficient due to frequent measurement gap. In this sense, if default BWP is reconfigured to outside of initial BWP, the following conditions may be satisfied: a UE is in CONNECTED mode, and a UE is not configured with SS block based measurement for both serving cell and neighbor cells.

In an example embodiment, a DL BWP other than the initial active DL BWP may be configured to a UE as the default DL BWP. The reconfiguring the default DL BWP may be due to load balancing and/or different numerologies employed for active DL BWP and initial active DL BWP.

In an example embodiment, a default BWP on PCell may be an initial active DL BWP for transmission of RMSI, comprising RMSI CORESET with CSS. The RMSI CORESET may comprise USS. The initial active/default BWP may remain active BWP for the user also after UE becomes RRC connected.

In an example embodiment, for a paired spectrum, downlink and uplink bandwidth parts may be independently activated while, for an unpaired spectrum downlink and uplink bandwidth parts are jointly activated. In case of bandwidth adaptation, where the bandwidth of the active downlink BWP may be changed, there may, in case of an unpaired spectrum, be a joint activation of a new downlink BWP and new uplink BWP. For example, a new DL/UL BWP pair where the bandwidth of the uplink BWPs may be the same (e.g., no change of uplink BWP).

In an example embodiment, there may be an association of DL BWP and UL BWP in RRC configuration. For example, in case of TDD, a UE may not retune the center frequency of channel BW between DL and UL. In this case, since the RF is shared between DL and UL in TDD, a UE may not retune the RF BW for every alternating DL-to-UL and UL-to-DL switching.

In an example embodiment, making an association between DL BWP and UL BWP may allow that one activation/deactivation command may switch both DL and UL BWPs at once. Otherwise, separate BWP switching commands may be necessary.

In an example embodiment, a DL BWP and a UL BWP may be configured to the UE separately. Pairing of the DL BWP and the UL BWP may impose constrains on the configured BWPs, e.g., the paired DL BWP and UL BWP may be activated simultaneously. For example, gNB may indicate a DL BWP and a UL BWP to a UE for activation in a FDD system. In an example, gNB may indicate a DL BWP and a UL BWP with the same center frequency to a UE for activation in a TDD system. Since the activation/deactivation of the BWP of the UE is instructed by gNB, no paring or association of the DL BWP and UL BWP may be mandatory even for TDD system.

In an example embodiment, the association between DL carrier and UL carrier within a serving cell may be done by carrier association. For example, for TDD system, UE may not be expected to retune the center frequency of channel BW between DL and UL. To achieve it, an association between DL BWP and UL BWP may be needed. For example, a way to associate them may be to group DL BWP configurations with same center frequency as one set of DL BWPs and group UL BWP configurations with same center frequency as one set of UL BWPs. The set of DL BWPs may be associated with the set of UL BWPs sharing the same center frequency.

For an FDD serving cell, there may be no association between DL BWP and UL BWP if the association between DL carrier and UL carrier within a serving cell may be done by carrier association.

In an example embodiment, UE may identify a BWP identity from DCI to simplify the indication process. The total number of bits for BWP identity may depend on the number of bits that may be employed within the scheduling DCI (or switching DCI) and the UE minimum BW. The number of BWPs may be determined by the UE supported minimum BW along with the network maximum BW. For instance, in a similar way, the maximum number of BWP may be determined by the network maximum BW and the UE minimum BW. In an example, if 400 MHz is the network maximum BW and 50 MHz is the UE minimum BW, 8 BWPs may be configured to the UE which means that 3 bits may be needed within the DCI to indicate the BWP. In an example, such a split of the network BW depending on the UE minimum BW may be useful for creating one or more default BWPs from the network side by distributing UEs across the entire network BW, e.g., load balancing purpose.

In an example embodiment, at least 2 DL and 2 UL BWP may be supported by a UE for a BWP adaption. For example, the total number of BWP supported by a UE may be given by 2≤Number of DL/UL BWP≤floor (Network maximum BW/UE minimum DL/UL BW). For example, a maximum number of configured BWPs may be 4 for DL and UL respectively. For example, a maximum number of configured BWPs for UL may be 2.

In an example embodiment, different sets of BWPs may be configured for different DCI formats/scheduling types respectively. For example, some larger BWPs may be configured for non-slot-based scheduling than that for slot-based scheduling. If different DCI formats are defined for slot-based scheduling and non-slot-based scheduling, different BWPs may be configured for different DCI formats. This may provide flexibility between different scheduling types without increasing DCI overhead. The 2-bit bitfield may be employed to indicate a BWP among the four for the DCI format. For example, 4 DL BWPs or [2 or 4] UL BWPs may be configured for each DCI formats. Same or different BWPs may be configured for different DCI formats.

In an example embodiment, a required maximum number of configured BWPs (may be not comprising the initial BWP) may depend on the flexibility needed for a BWP functionality. For example, in the minimal case of supporting bandlimited devices, it may be sufficient to be able to configure one DL BWP and one UL BWP (or a single DL/UL BWP pair in case of unpaired spectrum). For example, to support bandwidth adaptation, there may be a need to configure (at least) two DL BWPs and a single uplink BWP for paired spectrum (or two DL/UL BWP pairs for unpaired spectrum). For example, to support dynamic load-balancing between different parts of the spectrum, there may be a need to configure one or more DL (UL) BWPs that jointly cover different parts of the downlink (uplink) carrier. In an example, for dynamic load balancing, it may be sufficient with two BWPs. In addition to the two BWPs, two additional BWPs may be needed for bandwidth adaptation. For example, a Maximum number of configured BWPs may be four DL BWPs and two UL BWPs for a paired spectrum. For example, a Maximum number of configured BWPs may be four DL/UL BWP pairs for an unpaired spectrum.

In an example embodiment, UE may monitor for RMSI and broadcast OSI which may be transmitted by the gNB within the common search space (CSS) on the PCell. In an example, RACH response and paging control monitoring on the PCell may be transmitted within the CSS. In an example, when a UE is allowed to be on an active BWP configured with UE-specific search space (USSS or USS), the UE may not monitor the common search space.

In an example, for a PCell, at least one of configured DL bandwidth parts may comprise at least one CORESET with a CSS type. For example, to monitor RMSI and broadcast OSI, UE may periodically switch to the BWP containing the CSS. In an example, the UE may periodically switch to the BWP containing the CSS for RACH response and paging control monitoring on the PCell.

In an example, if BWP switching to monitor the CSS happens frequently, it may result in increasing overhead. In an example, the overhead due to the CSS monitoring may depends on overlapping in frequency between any two BWPs. In an example, in a nested BWP configuration where one BWP is a subset of another BWP, the same CORESET configuration may be employed across the BWPs. In this case, unless reconfigured otherwise, a default BWP may be the one containing the CSS, and another BWP may contain the CSS. In an example, the BWPs may be partially overlapping. If the overlapping region is sufficient, a CSS may be across a first BWP and a second BWP. In an example, two non-overlapping BWP configurations may exist.

In an example embodiment, there may be one or more benefits of configuring the same CORESET containing the CSS across BWPs. For example, RMSI and broadcast OSI monitoring may be handled without necessitating BWP switching. In an example, RACH response and paging control monitoring on the PCell may also be handled without switching. For example, if CORESET configuration is the same across BWPs, robustness for BWP switching may improve, because even if gNB and UE are out-of-sync as to which BWP is currently active, the DL control channel may work. In an example, one or more constraints on BWP configuration may not be too much, considering that BWP may be for power saving, even the nested configuration may be very versatile for different applications.

In an example embodiment, NR may support group-common search space (GCSS). For example, the GCSS may be employed as an alternative to CSS for certain information. In an example, gNB may configure GCSS within a BWP for a UE, and information such as RACH response and paging control may be transmitted on GCSS. For example, the UE may monitor GCSS instead of switching to the BWP containing the CSS for such information.

In an example embodiment, for pre-emption indication and other group-based commands on a serving cell, gNB may transmit the information on GCSS. UE may monitor the GCSS for the information.

In an example embodiment, NR may configure a CORESET without using a BWP. For example, NR support to configure a CORESET based on a BWP to reduce signaling overhead. In an example, a first CORESET for a UE during an initial access may be configured based on its default BWP. In an example, a CORESET for monitoring PDCCH for RAR and paging may be configured based on a DL BWP. In an example, the CORESET for monitoring group common (GC)-PDCCH for SFI may be configured based on a DL BWP. In an example, the CORESET for monitoring GC-DCI for pre-emption indication may be configured based on a DL BWP. In an example, the BWP index may be indicated in the CORESET configuration. In an example, the default BWP index may not be indicated in the CORESET configuration.

In an example embodiment, the contention-based random access (CBRA) RACH procedure may be supported via an initial active DL and UL BWPs since the UE identity is unknown to the gNB. In an example, the contention-free random access (CFRA) RACH procedure may be supported via the USS configured in an active DL BWP for the UE. For example, in this case, an additional CSS for RACH purpose may not need to be configured per BWP. For example, idle mode paging may be supported via an initial active DL BWP and the connected mode paging may be supported via a default BWP. No additional configurations for the BWP for paging purposes may not be needed for paging. For the case of pre-emption, a configured BWP (on a serving cell) may have the CSS configured for monitoring the pre-emption indications.

In an example embodiment, for a configured DL BWP, a group-common search space may be associated with at least one CORESET configured for the same DL BWP. For example, depending on the monitoring periodicity of different group-common control information types, it may not be practical for the UE to autonomously switch to a default BWP where a group-common search space is available to monitor for such DCI. In this case, if there is at least one CORESET configured on a DL BWP, it may be possible to configure a group-common search space in the same CORESET.

In an example embodiment, a center frequency of the activated DL BWP may not be changed. In an example, the center frequency of the activated DL BWP may be changed. For example, for TDD, if the center frequency of the activated DL BWP and deactivated DL BWP is not aligned, the active UL BWP may be switched implicitly.

In an example embodiment, BWPs with different numerologies may be overlapped, and rate matching for CSI-RS/SRS of another BWP in the overlapped region may be employed to achieve dynamic resource allocation of different numerologies in FDM/TDM fashion. In an example, for the CSI measurement within one BWP, if the CSI-RS/SRS is collided with data/RS in another BWP, the collision region in another BWP may be rate matched. For example, CSI information over the two BWPs may be known at a gNB side by UE reporting. Dynamic resource allocation with different numerologies in a FDM manner may be achieved by gNB scheduling.

In an example embodiment, PUCCH resources may be configured in a configured UL BWP, in a default UL BWP and/or in both. For instance, if the PUCCH resources are configured in the default UL BWP, UE may retune to the default UL BWP for transmitting an SR. for example, the PUCCH resources are configured per BWP or a BWP other than the default BWP, the UE may transmit an SR in the current active BWP without retuning.

In an example embodiment, if a configured SCell is activated for a UE, a DL BWP may be associated with an UL BWP at least for the purpose of PUCCH transmission, and a default DL BWP may be activated. If the UE is configured for UL transmission in same serving cell, a default UL BWP may be activated.

In an example embodiment, at least one of configured DL BWPs comprises one CORESET with common search space (CSS) at least in primary component carrier. The CSS may be needed at least for RACH response (msg2) and pre-emption indication.

In an example, for the case of no periodic gap for RACH response monitoring on PCell, one of configured DL BWPs may comprise one CORESET with the CSS type for RMSI & OSI. For PCell, a configured DL BWP may comprise one CORESET with the CSS type for RACH response & paging control for system information update. For a serving cell, a configured DL BWP may comprise one CORESET with the CSS type for pre-emption indication and other group-based commands.

In an example embodiment, BWPs may be configured with respect to common reference point (PRB 0) on a NW carrier. In an example, the BWPs may be configured using TYPE1 RA as a set of contiguous PRBs, with PRB granularity for the START and LENGTH, and the minimum length may be determined by the minimum supported size of a CORESET.

In an example embodiment, a CSS may be configured on a non-initial BWP for RAR and paging.

In an example embodiment, to monitor (group) common channel for RRC CONNECTED UE, an initial DL BWP may comprise control channel for RMSI, OSI and paging and UE switches BWP to monitor such channel. In an example, a configured DL BWP may comprise control channel for Msg2. In an example, a configured DL BWP may comprise control channel for SFI. In an example, a configured DL BWP may comprise pre-emption indication and other group common indicators like power control.

In an example embodiment, a DCI may explicitly indicate activation/deactivation of BWP.

For example, a DCI without data assignment may comprise an indication to activate/deactivate BWP. In an example, UE may receive a first indication via a first DCI to activate/deactivate BWP. In order for the UE to start receiving data, a second DCI with a data assignment may be transmitted by the gNB. A UE may receive the first DCI in a target CORESET in a target BWP. In an example, until there is CSI feedback provided to a gNB, the gNB scheduler may make conservative scheduling decisions.

In an example, a DCI without scheduling for active BWP switching may be transmitted to measure the CSI before scheduling. It may be taken as an implementation issue of DCI with scheduling, for example, the resource allocation field may be set to zero, which means no data may be scheduled. Other fields in this DCI may comprise one or more CSI/SRS request fields.

In an example embodiment, support for a single scheduling DCI to trigger active BWP switching may be motivated by dynamic BWP adaptation for UE power saving during active state (which may comprise ON duration and when inactivity timer is running when C-DRX is configured). For example, with a C-DRX enabled, a UE may consume significant amount of power monitoring PDCCH without decoding any grant. To reduce the power consumption during PDCCH monitoring, two BWPs may be configured: a narrower BWP for PDCCH monitoring, and a wider BWP for scheduled data. In such a case, the UE may switch back-and-forth between the narrower BWP and the wider BWP, depending on the burstiness of the traffic. For example, the UE may be revisiting a BWP that it has dwelled on previously. For this case, combining a BWP switching indication and a scheduling grant may result in low latency and reduced signaling overhead for BWP switching.

In an example embodiment, a SCell activation and deactivation may trigger the corresponding action for its configured BWP. In an example, a SCell activation and deactivation may not trigger the corresponding action for its configured BWP.

In an example embodiment, a dedicated BWP activation/deactivation DCI may impact a DCI format. For example, a scheduling DCI with a dummy grant may be employed. the dummy grant may be constructed by invalidating one or some of the fields, for example, the resource allocation field. In an example, it may be feasible to leverage a fallback scheduling DCI format (which contains a smaller payload) to improve the robustness for BWP DCI signaling, without incurring extra work on introducing a new DCI format.

In an example embodiment, a DCI with data assignment may comprise an indication to activate/deactivate BWP along with a data assignment. For example, a UE may receive a combined data allocation and BWP activation/deactivation message. For example, a DCI format may comprise a field to indicate BWP activation/deactivation along with a field indicating UL/DL grant. In this case, the UE may start receiving data with a single DCI. In this case, the DCI may need indicate one or more target resources of a target BWP. A gNB scheduler may have little knowledge of the CSI in the target BW and may have to make conservative scheduling decisions.

In an example embodiment, for the DCI with data assignment, the DCI may be transmitted on a current active BWP, and scheduling information may be for a new BWP. For example, there may be a single active BWP. There may be one DCI in a slot for scheduling the current BWP or scheduling another BWP. The same CORESET may be employed for the DCI scheduling the current BWP and the DCI scheduling another BWP. For example, to reduce the number of blind decoding, the DCI payload size for the DCI scheduling current BWP and the scheduling DCI for BWP switching may be the same.

In an example embodiment, to support the scheduling DCI for BWP switching, a BWP group may be configured by gNB, in which a numerology in one group may be the same. In an example, the BWP switching for the BWP group may be configured, in which BIF may be present in the CORE-SETs for one or more BWPs in the group. For example, scheduling DCI for BWP switching may be configured per BWP group, in which an active BWP in the group may be switched to any other BWP in the group.

In an example, embodiment, a DCI comprising scheduling assignment/grant may not comprise active-BWP indicator. For a paired spectrum, a scheduling DCI may switch UEs active BWP for the transmission direction that the scheduling is valid for. For an unpaired spectrum, a scheduling DCI may switch the UEs active DL/UL BWP pair regardless of the transmission direction that the scheduling is valid for. There may be a possibility for downlink scheduling assignment/grant with "zero" assignment, in practice allowing for switch of active BWP without scheduling downlink or uplink transmission.

In an example embodiment, a timer-based activation/deactivation BWP may be supported. For example, a timer for activation/deactivation of DL BWP may reduce signaling overhead and may enable UE power savings. The activation/deactivation of a DL BWP may be based on an inactivity timer (referred to as a BWP inactive (or inactivity) timer).

For example, a UE may start and reset a timer upon reception of a DCI. When the UE is not scheduled for the duration of the timer, the timer may expire. In this case, the UE may activate/deactivate the appropriate BWP in response to the expiry of the timer. For example, the UE may activate the default BWP and may deactivate the active BWP.

For example, a BWP inactive timer may be beneficial for power saving for a UE switching to a default BWP with smaller BW and fallback for a UE missing DCI based activation/deactivation signaling to switch from one BWP to another BWP.

In an example embodiment, triggering conditions of the BWP inactive timer may follow the ones for the DRX timer in LTE. For example, an On-duration of the BWP inactive timer may be configured, and the timer may start when a UE-specific PDCCH is successfully decoded indicating a new transmission during the On-duration. The timer may restart when a UE-specific PDCCH is successfully decoded indicating a new transmission. The timer may stop once the UE is scheduled to switch to the default DL BWP.

In an example embodiment, the BWP inactive timer may start once the UE switches to a new DL BWP. The timer may restart when a UE-specific PDCCH is successfully decoded, wherein the UE-specific PDCCH may be associated with a new transmission, a retransmission or some other purpose, e.g., SPS activation/deactivation if supported.

In an example embodiment, a UE may switch to a default BWP if the UE does not receive any control/data from the network during a BWP inactive timer running. The timer may be reset upon reception of any control/data. For example, the timer may be triggered when UE receives a DCI to switch its active DL BWP from the default BWP to another. For example, the timer may be reset when a UE receives a DCI to schedule PDSCH(s) in the BWP other than the default BWP.

In an example embodiment, a DL BWP inactive timer may be defined separately from a UL BWP inactive timer. For example, there may be some ways to set the timer, e.g., independent timer for DL BWP and UL BWP, or a joint timer for DL and UL BWP. In an example, for the separate timers, assuming both DL BWP and UL BWP are activated, if there is DL data and UL timer expires, UL BWP may not be deactivated since PUCCH configuration may be affected. For example, for the uplink, if there is UL feedback signal related to DL transmission, the timer may be reset (Or, UL timer may not be set if there is DL data). On the other hand, if there is UL data and the DL timer expires, there may be no issue if the DL BWP is deactivated since UL grant is transmitted in the default DL BWP.

In an example embodiment, a BWP inactivity-timer may enable the fallback to default BWP on PCell and SCell.

In an example embodiment, a timer-based activation/deactivation of BWP may be similar to a UE DRX timer. For example, there may not be a separate inactivity timer for BWP activation/deactivation for the UE DRX timer. For example, one of the UE DRX inactivity timer may trigger BWP activation/deactivation.

For example, there may be a separate inactivity timer for BWP activation/deactivation for the UE DRX timer. For example, the DRX timers may be defined in a MAC layer, and the BWP timer may be defined in a physical layer. In an example, if the same DRX inactivity timer is employed for BWP activation/deactivation, UE may stay in a wider BWP for as long as the inactivity timer is running, which may be a long time. For example, the DRX inactivity timer may be set to a large value of 100~200 milliseconds for C-DRX cycle of 320 milliseconds, larger than the ON duration (10 milliseconds). This may imply that power saving due to narrower BWP may not be achievable. To realize potential of UE power saving promised by BWP switching, a new timer may be defined, and it may be configured to be smaller than the DRX inactivity timer. From the point of view of DRX operation, BWP switching may allow UE to operate at different power levels during the active state, effectively providing some more intermediate operating points between the ON and OFF states.

A New Radio (NR) system may support both single beam and multi-beam operations. In a multi-beam system, a base station (e.g., gNB) may perform a downlink beam sweeping to provide coverage for downlink Synchronization Signals (SSs) and common control channels. A User Equipment (UE) may perform an uplink beam sweeping to access a cell.

In a single beam scenario, a gNB may configure time-repetition transmission within one SS block, which may comprise at least Primary Synchronization Signal (PSS), Secondary Synchronization Signal (SSS), and Physical Broadcast Channel (PBCH), with a wide beam. In a multi-beam scenario, a gNB may configure at least some of the above-mentioned signals and physical channels in multiple beams. A UE may identify at least Orthogonal Frequency Division Multiplexing (OFDM) symbol index, slot index in a radio frame and radio frame number from an SS block.

Figure 15:
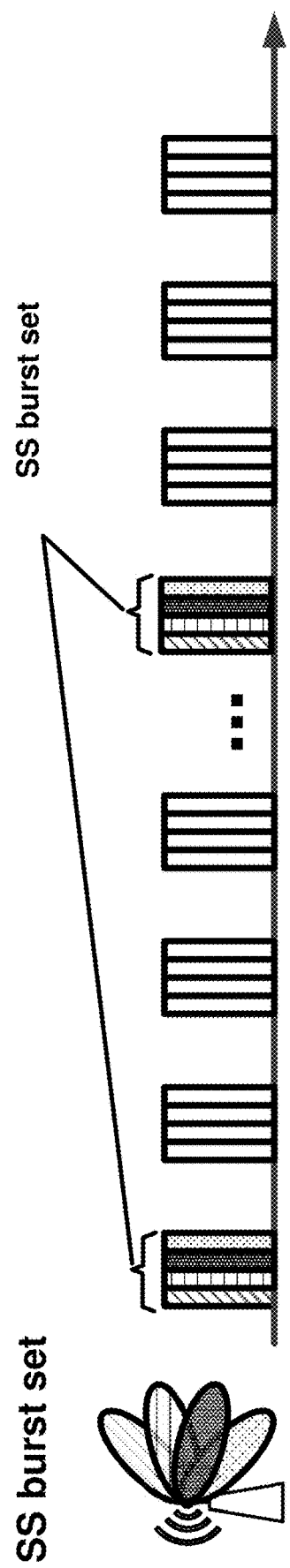
FIG. 15 is an example of configuration of an SS Burst Set as per an aspect of an embodiment of the present disclosure.

In an example, in an RRC_INACTIVE state or RRC_IDLE state, a UE may assume that SS blocks form an SS burst, and an SS burst set. An SS burst set may have a given periodicity. In multi-beam scenarios, SS blocks may be transmitted in multiple beams, together forming an SS burst. One or more SS blocks may be transmitted on one beam. If multiple SS bursts are transmitted with multiple beams, the SS bursts together may form an SS burst set as shown in FIG. 15.

In an example, a UE may detect one or more PSS/SSS/PBCH for cell selection/reselection and/or initial access procedures. PBCH, or a Physical Downlink Shared Channel (PDSCH), indicated by a Physical Downlink Control Channel (PDCCH) in common search space, scheduling a system information, such as System Information Block type 2 (SIB2), may be broadcasted to multiple UEs. In an example, SIB2 may carry one or more Physical Random Access Channel (PRACH) configuration. In an example, a gNB may have one or more Random Access Channel (RACH) configuration which may include PRACH preamble pool, time/frequency radio resources, and other power related parameters. A UE may select a PRACH preamble from a RACH configuration to initiate a contention-based RACH procedure, or a contention-free RACH procedure.

Figure 16B:
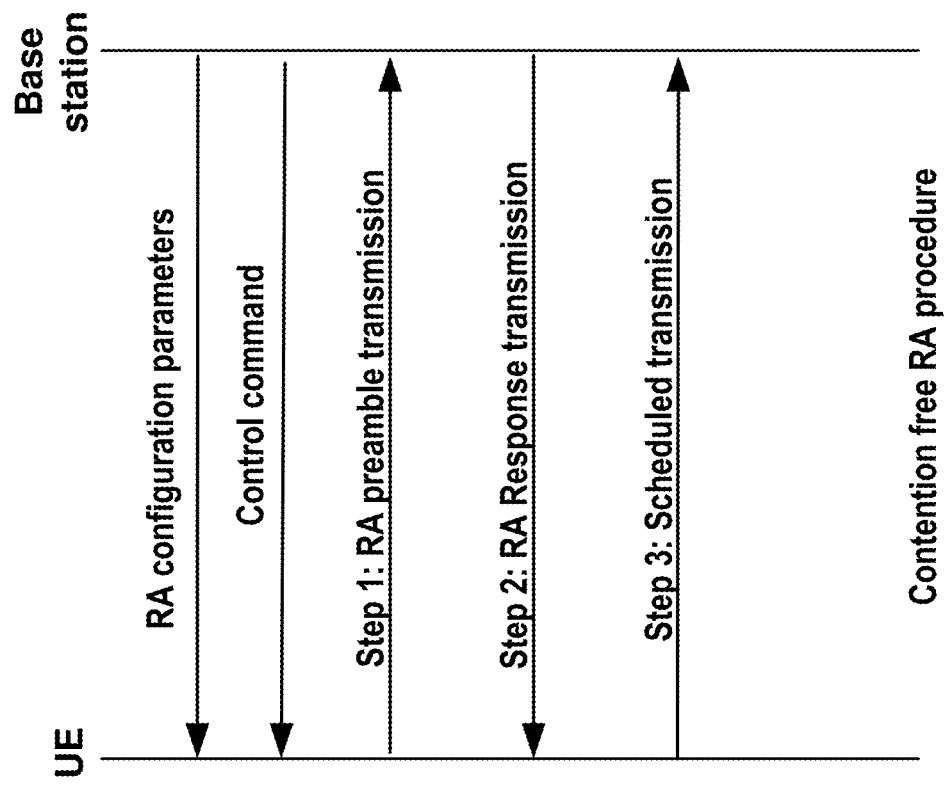
FIG. 16B is an example of contention free RA procedure as per an aspect of an embodiment of the present disclosure.
Figure 16A:
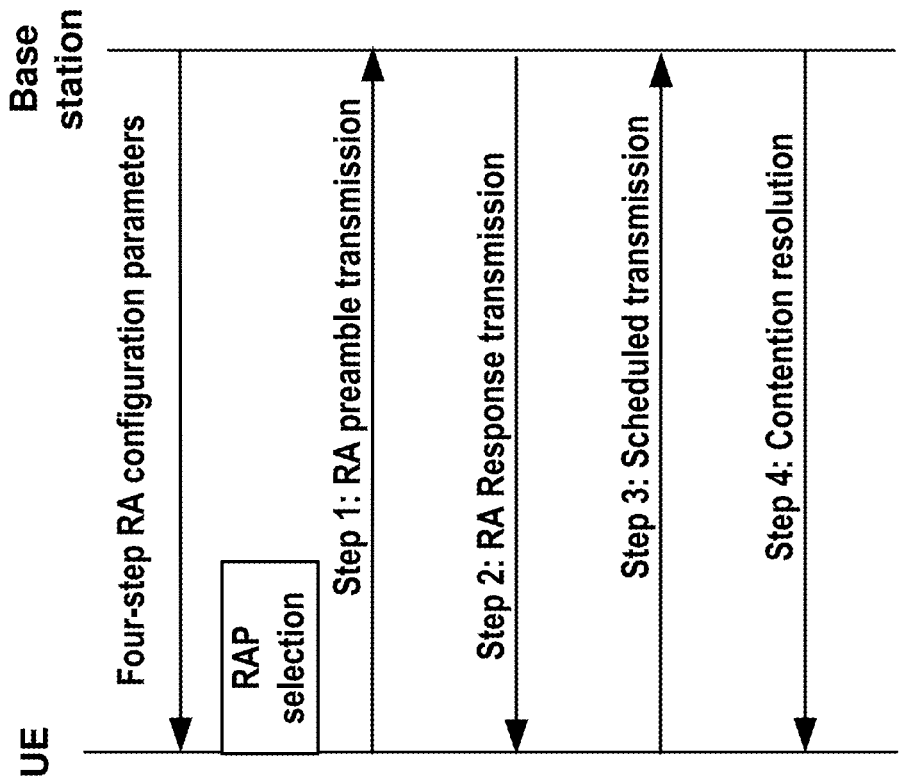
FIG. 16A is an example of contention-based four-step Random Access (RA) procedure as per an aspect of an embodiment of the present disclosure.

In an example, a UE may perform a 4-step RACH procedure, which may be a contention-based or contention-free RACH procedure. A four-step random access (RA) procedure may comprise RA preamble (RAP) transmission in the first step, random access response (RAR) transmission in the second step, scheduled transmission of one or more transport blocks (TBs) in the third step, and contention resolution in the fourth step as shown in FIG. 16A and FIG. 16B. Specifically, FIG. 16A shows a contention-based 4-step RA procedure, and FIG. 16B shows a contention-free RA procedure.

In the first step, a UE may transmit a RAP using a configured RA preamble format with a Tx beam. RA channel (RACH) resource may be defined as a time-frequency resource to transmit a RAP. Broadcast system information may inform whether a UE needs to transmit one or multiple/repeated preamble within a subset of RACH resources.

A base station may configure an association between DL signal/channel, and a subset of RACH resources and/or a subset of RAP indices, for determining the downlink (DL) transmission in the second step. Based on the DL measurement and the corresponding association, a UE may select the subset of RACH resources and/or the subset of RAP indices. In an example, there may be two RAP groups informed by broadcast system information and one may be optional. If a base station configures the two groups in the four-step RA procedure, a UE may determine which group the UE selects a RAP from, based on the pathloss and a size of the message to be transmitted by the UE in the third step. A base station may use a group type to which a RAP belongs as an indication of the message size in the third step and the radio conditions at a UE. A base station may broadcast the RAP grouping information along with one or more thresholds on system information.

In the second step of the four-step RA procedure, a base station may transmit a RA response (RAR) to the UE in response to reception of a RAP that the UE transmits. A UE may monitor the PDCCH carrying a DCI, to detect RAR transmitted on a PDSCH in a RA Response window. The DCI may be CRC-scrambled by the RA-RNTI (Random Access-RadioNetwork Temporary Identifier). RA-RNTI may be used on the PDCCH when Random Access Response messages are transmitted. It may unambiguously identify which time-frequency resource is used by the MAC entity to transmit the Random Access preamble. The RA Response window may start at the subframe that contains the end of a RAP transmission plus three subframes. The RA Response window may have a length indicated by ra-ResponseWindowSize. A UE may compute the RA-RNTI associated with the PRACH in which the UE transmits a RAP as: RA-RNTI=1+t_id+10*f_id, where t_id is the index of the first subframe of the specified PRACH (0≤t_id<10), and f_id is the index of the specified PRACH within that subframe, in ascending order of frequency domain (0≤f_id<6). In an example, different types of UEs, e.g. NB-IoT, BL-UE, or UE-EC may employ different formulas for RA-RNTI calculations.

Figure 17:
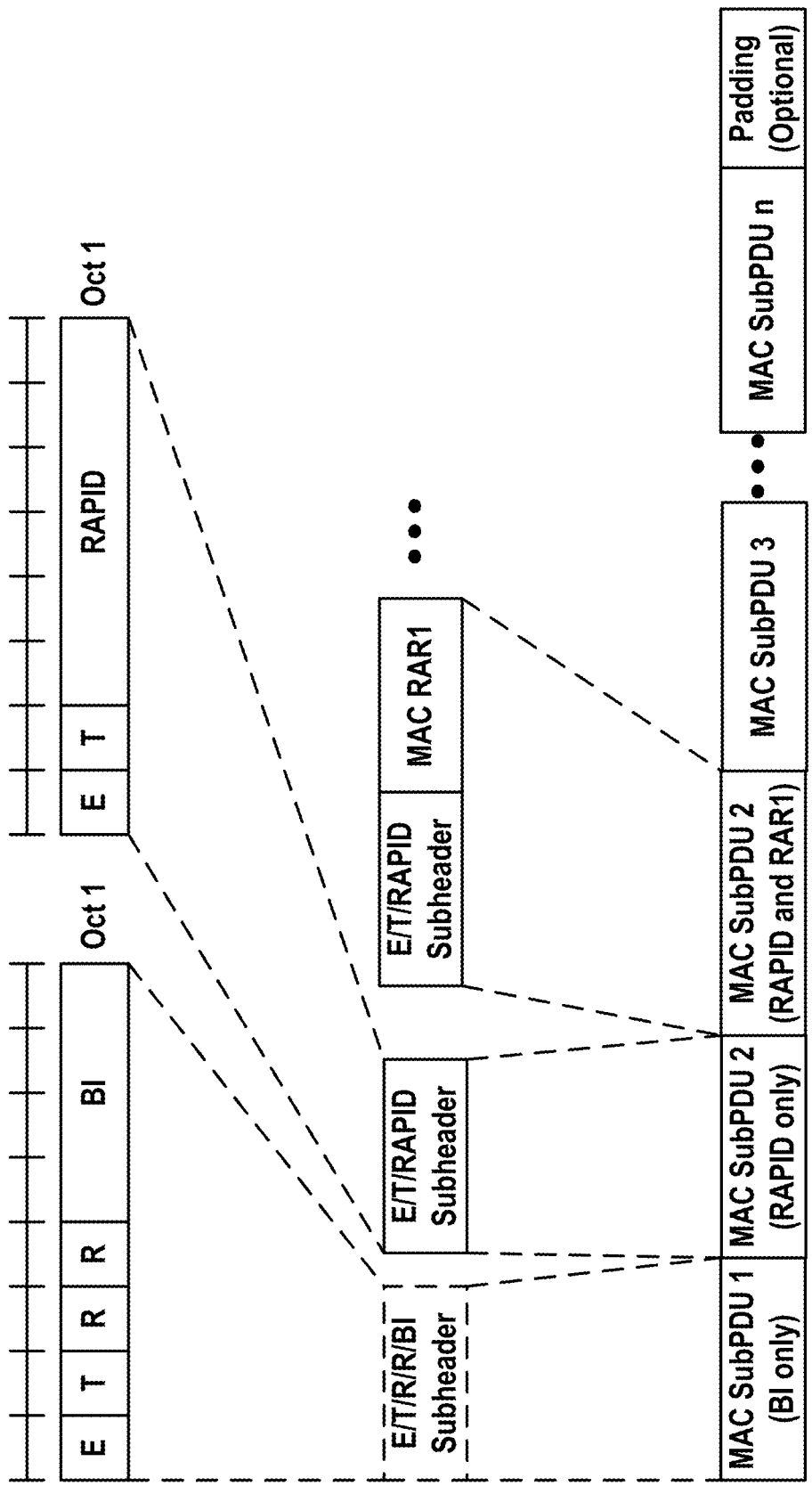
FIG. 17 is an example of MAC PDU comprising a MAC header and MAC RARs as per an aspect of an embodiment of the present disclosure.
Figure 18A:
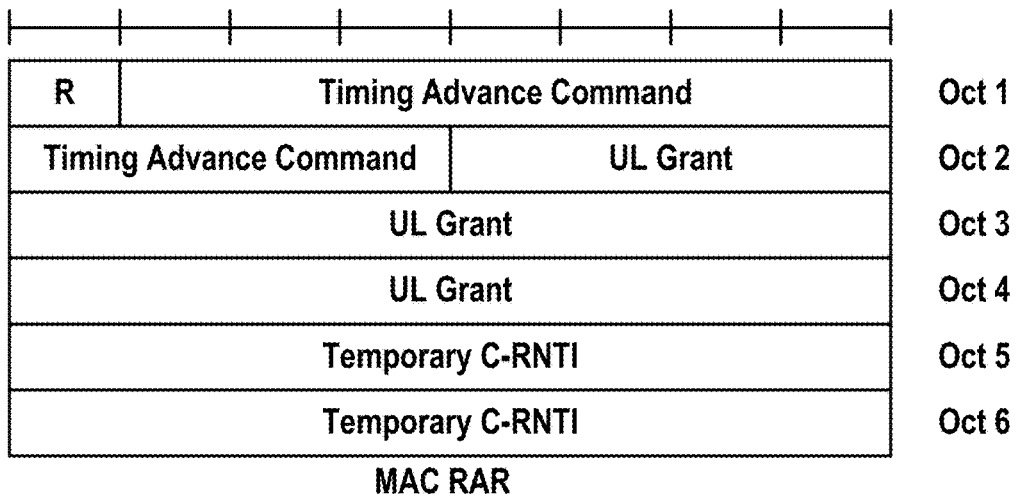
FIG. 18A, FIG. 18B, and FIG. 18C are examples of MAC RARs for different types of UEs as per an aspect of embodiments of the present disclosure.
Figure 18B:
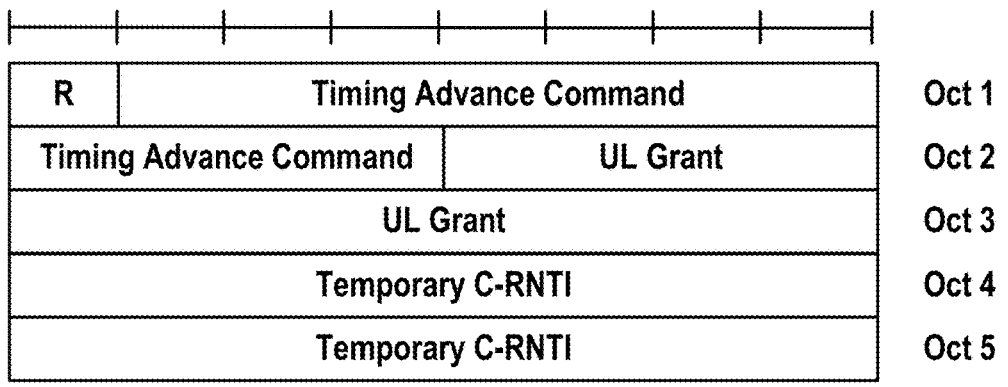
Figure 18C:
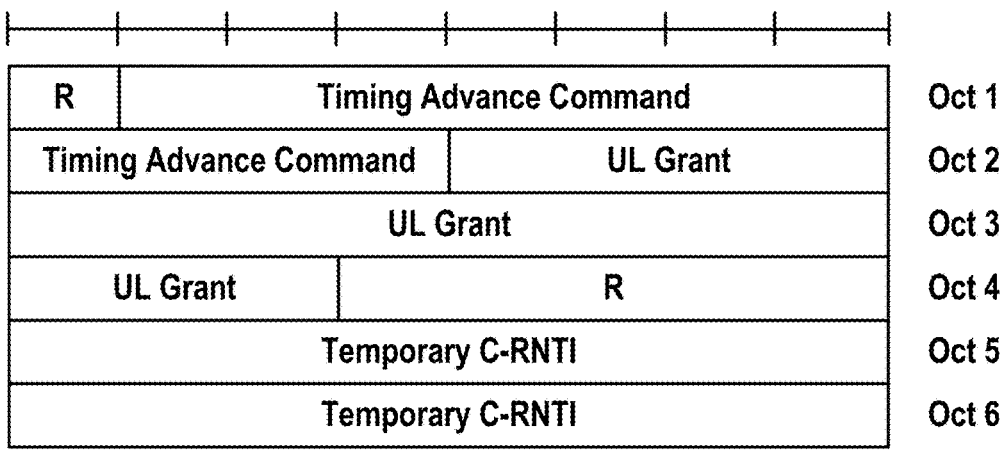

A UE may stop monitoring for RAR(s) after decoding of a MAC packet data unit (PDU) for RAR comprising a RAP identifier (RAPID) that matches the RAP transmitted by the UE. The MAC PDU may comprise one or more MAC RARs and a MAC header that may comprise a subheader having a backoff indicator (BI) and one or more subheader that comprises RAPIDs. FIG. 17 illustrates an example of a MAC PDU comprising a MAC header and MAC RARs for a four-step RA procedure. If a RAR comprises a RAPID corresponding to a RAP that a UE transmits, the UE may process the data, such as a timing advance (TA) command, a UL grant, and a Temporary C-RNTI (TC-RNTI), in the RAR. FIG. 18A, FIG. 18B and FIG. 18C illustrate contents of a MAC RAR. Specifically, FIG. 18A shows the contents of a MAC RAR of a normal UE, FIG. 18B shows the contents of a MAC RAR of a MTC UE, and FIG. 18C shows the contents of MAC RAR of a NB-IOT UE.

In the third step of the four-step RA procedure, a UE may adjust UL time alignment by using the TA value corresponding to the TA command in the received RAR in the second step and may transmit the one or more TBs to a base station using the UL resources assigned in the UL grant in the received RAR. The TBs that a UE transmits in the third step may comprise RRC signaling, such as RRC connection request, RRC connection Re-establishment request, or RRC connection resume request, and a UE identity. The identity transmitted in the third step is used as part of the contention-resolution mechanism in the fourth step.

The fourth step in the four-step RA procedure may comprise a DL message for contention resolution. In an example, one or more UEs may perform simultaneous RA attempts selecting the same RAP in the first step, and receive the same RAR with the same TC-RNTI in the second step. The contention resolution in the fourth step may be to ensure that a UE does not incorrectly use another UE Identity. The contention resolution mechanism may be based on either C-RNTI on PDCCH or UE Contention Resolution Identity on DL-SCH, depending on whether a UE has a C-RNTI or not. If a UE has C-RNTI, upon detection of C-RNTI on the PDCCH, the UE may determine the success of RA procedure. If a UE does not have C-RNTI pre-assigned, the UE may monitor DL-SCH associated with TC-RNTI that a base station transmits in a RAR of the second step and compare the identity in the data transmitted by the base station on DL-SCH in the fourth step with the identity that the UE transmits in the third step. If the two identities are identical, the UE may determine the success of RA procedure and promote the TC-RNTI to the C-RNTI.

The forth step in the four-step RA procedure may allow HARQ retransmission. A UE may start mac-ContentionResolutionTimer when the UE transmits one or more TBs to a base station in the third step and may restart mac-ContentionResolutionTimer at each HARQ retransmission. When a UE receives data on the DL resources identified by C-RNTI or TC-RNTI in the fourth step, the UE may stop the mac-ContentionResolutionTimer. If the UE does not detect the contention resolution identity that matches to the identity transmitted by the UE in the third step, the UE may determine the failure of RA procedure and discard the TC-RNTI. If mac-ContentionResolutionTimer expires, the UE may determine the failure of RA procedure and discard the TC-RNTI. If the contention resolution is failed, a UE may flush the HARQ buffer used for transmission of the MAC PDU and may restart the four-step RA procedure from the first step. The UE may delay the subsequent RAP transmission by the backoff time randomly selected according to a uniform distribution between 0 and the backoff parameter value corresponding the BI in the MAC PDU for RAR.

In a four-step RA procedure, the usage of the first two steps may be to obtain UL time alignment for a UE and obtain an uplink grant. The third and fourth steps may be used to setup RRC connections, and/or resolve contention from different UEs.

Figure 19:
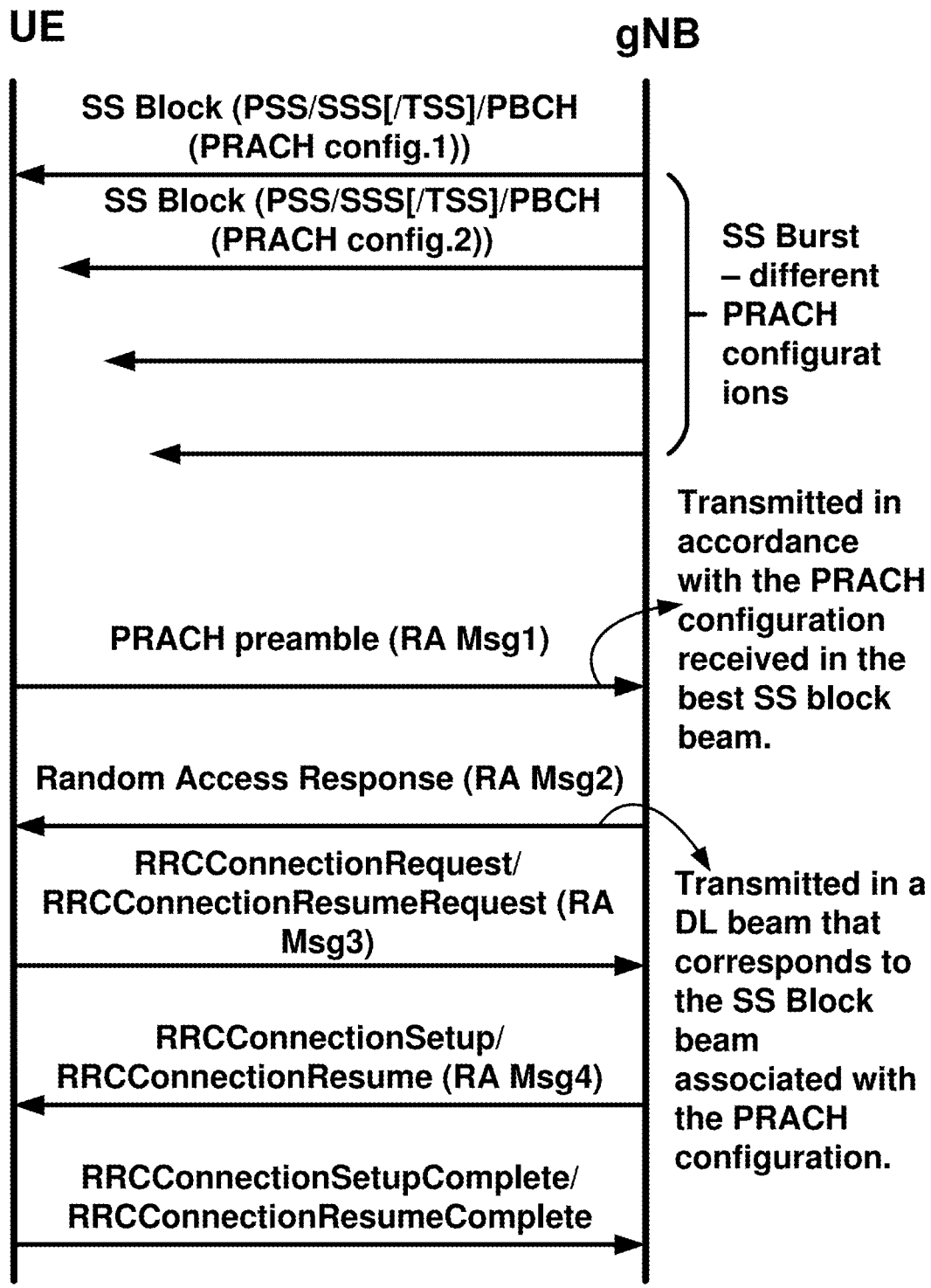
FIG. 19 is an example of RA procedure in a multiple-beam system as per an aspect of an embodiment of the present disclosure.

In a multi-beam scenario, for a cell, PSS/SSS/PBCH may be repeated to support cell selection/reselection and initial access procedures. In an example, a RACH process is shown in FIG. 19. For an SS burst, the associated PBCH, or a PDSCH, indicated by a PPDCCH in common search space, scheduling a system information, such as SIB2, may be broadcasted to multiple UEs. In an example, SIB2 may carry a PRACH configuration for a beam. For a beam, a gNB may have a RACH configuration which may include PRACH preamble pool, time/frequency radio resources, and other power related parameters.

In an example, a UE may use a PRACH preamble selected from a RACH configuration to initiate a contention-based RACH procedure, or a contention-free RACH procedure. A UE may perform a 4-step RACH procedure, which may be a contention-based or contention-free RACH procedure. The UE may select a beam associated with an SS block having the best receiving signal quality. When the UE successfully detects the cell ID and decodes system information with RACH configuration, the UE may use one PRACH preamble and select one PRACH resource from the RACH resources indicated by the system information associated with the selected beam.

In an example, a PRACH resource may comprise at least one of: a PRACH index indicating a PRACH preamble; a PRACH format; a PRACH numerology; time or frequency radio resource allocation; power setting of PRACH transmission; and/or other radio resource parameters.

For a contention-free RACH procedure, the PRACH preamble and resource may be indicated in a Downlink Control Information (DCI) or high layer signaling.

Example Channel State Information-Reference Signal (CSI-RS) and Downlink Beam Management and Beam Failure Recovery Mechanism A UE may use CSI-RS in a multi-beam system for estimating the beam quality of the links between the UE and a gNB. For example, a UE may, based on measurement of CSI-RS, report Channel State Information (CSI) for downlink channel adaption. A CSI parameter may comprise at least one of: a Precoding Matrix Index (PMI); a Channel Quality Index (CQI) value; and/or a Rank Indicator (RI). A UE may, based on a Reference Signal Received Power (RSRP) measurement on CSI-RS, report a beam index, as indicated in a CSI Resource Indication (CRI) for downlink beam selection, and associated with the RSRP value of the beam.

A CSI-RS may be transmitted on a CSI-RS resource including one or more antenna ports, one or more time or frequency radio resources. A beam may be associated with a CSI-RS. A CSI-RS resource may be configured in a cell-specific way by common RRC signaling, or in a UE-specific way by dedicated RRC signaling, and/or L1/L2 signaling. Multiple UEs covered by a cell may measure a cell-specific CSI-RS resource. A dedicated subset of UEs covered by a cell may measure a UE-specific CSI-RS resource.

A CSI-RS resource may be transmitted periodically, or using aperiodic transmission, or using a multi-shot or semi-persistent transmission. In a periodic transmission, the configured CSI-RS resource may be transmitted using a configured periodicity in time domain. In an aperiodic transmission, the configured CSI-RS resource may be transmitted in a dedicated time slot. In a multi-shot or semi-persistent transmission, the configured CSI-RS resource may be transmitted within a configured period.

A gNB may configure different CSI-RS resources in terms of cell-specific or UE-specific, periodic or aperiodic or multi-shot, for different purposes (for example, beam management, CQI reporting, etc.). FIG. 20 shows that CSI-RSs may be periodically transmitted for a beam. A beam may be transmitted in a predefined order in time domain. Beams used for CSI-RS transmission may have different beam width with the ones used for SS-blocks transmission.

A gNB may transmit one or more Radio Resource Control (RRC) messages comprising CSI-RS resource configuration for one or more CSI-RS. For example, the following parameters may be configured by higher layer signaling for each CSI-RS resource configuration: CSI-RS resource configuration identity, number of CSI-RS ports, CSI RS configuration (symbol and RE locations in a subframe), CSI RS subframe configuration (subframe location, offset and periodicity in radio frame), CSI-RS power parameter, CSI-RS sequence parameter, CDM type parameter, frequency density, transmission comb, QCL parameters (e.g., QCL-scramblingidentity, crs-portscount, mbsfn-subframeconfiglist, csi-rs-configZPid, qcl-csi-rs-configNZPid).

CSI-RS may be configured using common parameters, when a plurality of UEs receive the same CSI-RS signal. CSI-RS may be configured using UE dedicated parameters, when a CSI-RS is configured for a specific UE. Depending on different MIMO beamforming types (e.g., CLASS A or CLASS B), a UE may be configured with one or more CSI-RS resource configurations per CSI process using at least one or more RRC signaling.

For some type of MIMO beamforming, CSI-RS resources may be activated or deactivated by a MAC signaling, over the CSI-RS resources configured by a RRC signaling. The network may activate and deactivate the configured CSI-RS resources of a serving cell by sending the Activation/Deactivation of CSI-RS resources MAC control element. The configured CSI-RS resources are initially deactivated upon configuration and after a handover.

Figure 21A:
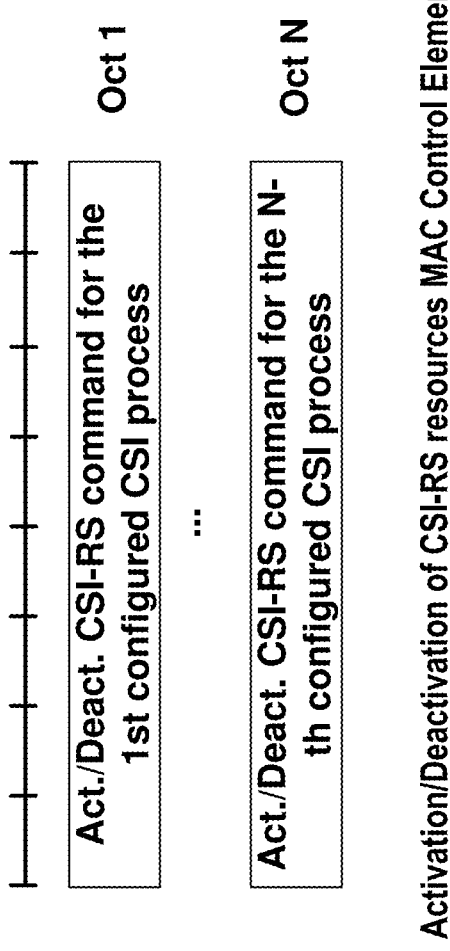
FIG. 21A is an example of activation/Deactivation of CSI-RS resources MAC Control Element as per an aspect of an embodiment of the present disclosure.
Figure 21B:
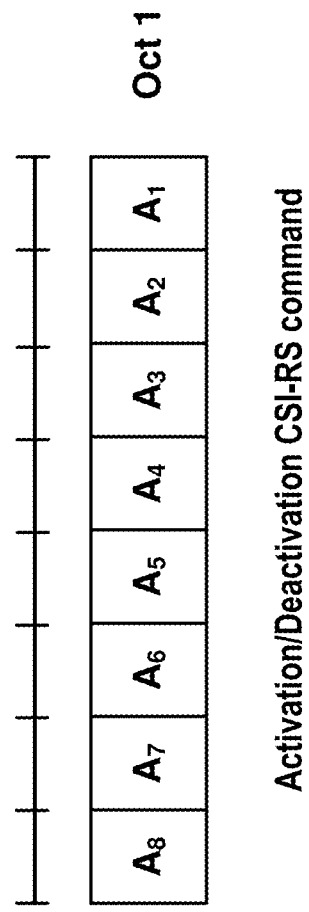
FIG. 21B is an example of activation/deactivation CSI-RS command as per an aspect of an embodiment of the present disclosure.

The Activation/Deactivation of CSI-RS resources MAC control element is identified by a MAC PDU subheader with LCID. It has variable size as the number of CSI process configured with csi-RS-NZP-Activation by RRC (N) and the N number of octets with A fields are included in ascending order of CSI process ID, i.e., CSI-ProcessId as shown in FIG. 21A. Activation/Deactivation CSI-RS command is defined in FIG. 21B. The Activation/Deactivation CSI-RS command may activate or deactivate CSI-RS resources for a CSI process. For a UE configured with transmission mode 9, N equals 1.

Activation/Deactivation of CSI-RS resources MAC control element applies to the serving cell on which the UE receives the Activation/Deactivation of CSI-RS resources MAC control element.

The Activation/Deactivation of CSI-RS resources MAC control elements are defined, where, "Ai" is this field indicates the activation/deactivation status of the CSI-RS resources configured by upper layers for the CSI process. In an example, A1 corresponds to the 1st entry in the list of CSI-RS specified by csi-RS-ConfigNZP-ApList as configured by upper layers, A2 corresponds to the 2nd entry in this list and so on. The Ai field is set to "1" to indicate that ith entry in the list of CSI-RS specified by csi-RS-ConfigNZP-ApList shall be activated. The Ai field is set to "0" to indicate that ith entry in the list shall be deactivated. For each CSI process, the number of Ai fields (i=1, 2, . . . , 8) which are set to "1" shall be equal to the value of the higher-layer parameter activatedResources.

Example Channel State Information-Reference Signal (CSI-RS) and Downlink Beam Management and Beam Failure Recovery Mechanism A UE may use CSI-RS in a multi-beam system for estimating the beam quality of the links between the UE and a gNB. For example, a UE may, based on measurement of CSI-RS, report Channel State Information (CSI) for downlink channel adaption. A CSI parameter may comprise at least one of: a Precoding Matrix Index (PMI), a Channel Quality Index (CQI) value, and/or a Rank Indicator (RI). A UE may, based on a Reference Signal Received Power (RSRP) measurement on CSI-RS, report a beam index, as indicated in a CSI Resource Indication (CRI) for downlink beam selection, and associated with the RSRP value of the beam.

A CSI-RS may be transmitted on a CSI-RS resource including one or more antenna ports, one or more time or frequency radio resources. A beam may be associated with a CSI-RS. A CSI-RS resource may be configured in a cell-specific way by common RRC signaling, or in a UE-specific way by dedicated RRC signaling, and/or L1/L2 signaling. Multiple UEs covered by a cell may measure a cell-specific CSI-RS resource. A dedicated subset of UEs covered by a cell may measure a UE-specific CSI-RS resource.

A CSI-RS resource may be transmitted periodically, or using aperiodic transmission, or using a multi-shot or semi-persistent transmission. In a periodic transmission, the configured CSI-RS resource may be transmitted using a configured periodicity in time domain. In an aperiodic transmission, the configured CSI-RS resource may be transmitted in a dedicated time slot. In a multi-shot or semi-persistent transmission, the configured CSI-RS resource may be transmitted within a configured period.

Figure 23:
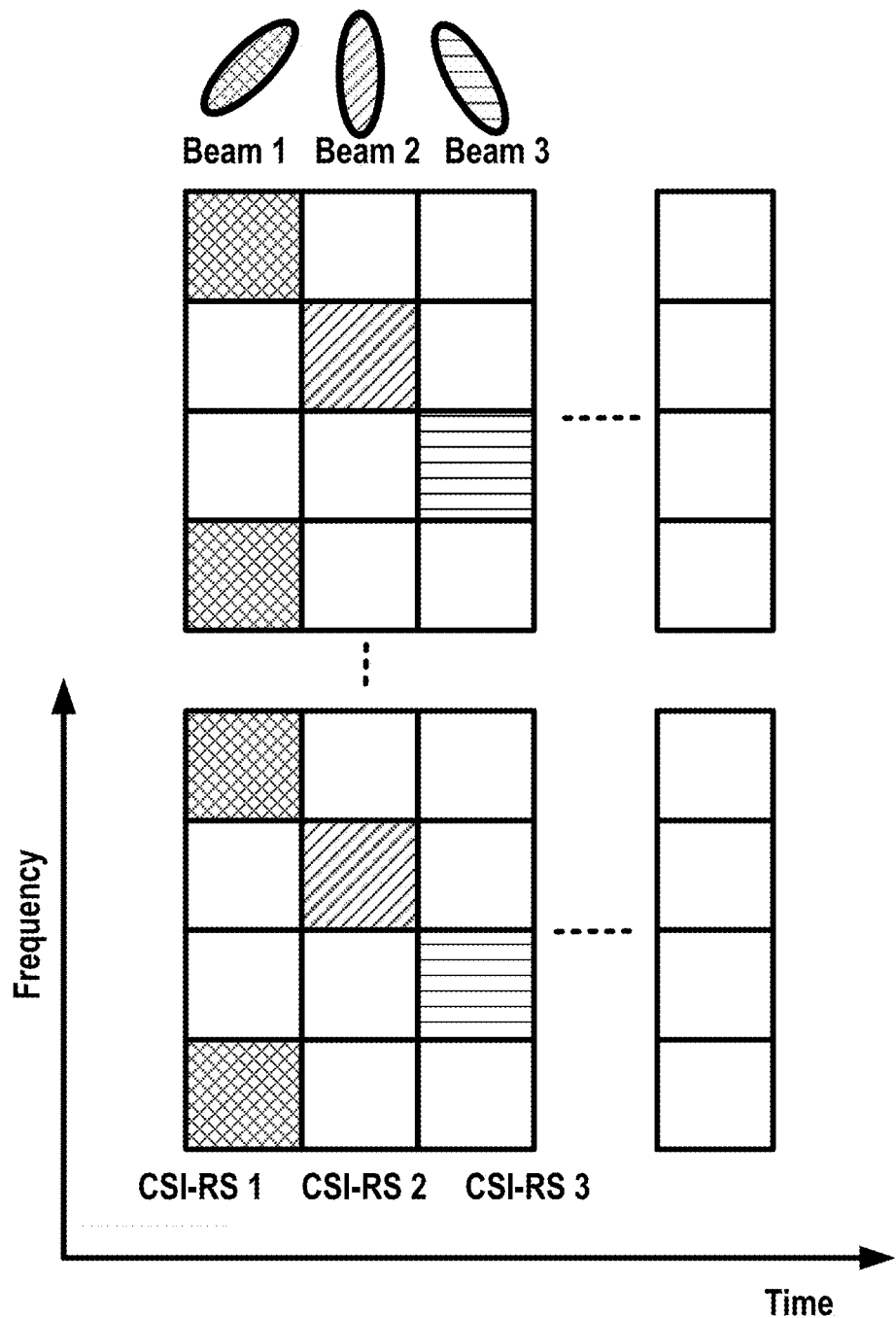
FIG. 23 is an example of CSI-RS mapping in time and frequency domain as per an aspect of an embodiment of the present disclosure.

A gNB may configure different CSI-RS resources in terms of cell-specific or UE-specific, periodic or aperiodic or multi-shot, for different purposes (for example, beam management, CQI reporting, etc.). FIG. 23 shows that CSI-RSs may be periodically transmitted for a beam. A beam may be transmitted in a predefined order in time domain. Beams used for CSI-RS transmission may have different beam width with the ones used for SS-blocks transmission.

A gNB may transmit one or more Radio Resource Control (RRC) messages comprising CSI-RS resource configuration for one or more CSI-RS. For example, the following parameters may be configured by higher layer signaling for each CSI-RS resource configuration: CSI-RS resource configuration identity, number of CSI-RS ports, CSI RS configuration (symbol and RE locations in a subframe), CSI RS subframe configuration (subframe location, offset and periodicity in radio frame), CSI-RS power parameter, CSI-RS sequence parameter, CDM type parameter, frequency density, transmission comb, QCL parameters (e.g., QCL-scramblingidentity, crs-portscount, mbsfn-subframeconfiglist, csi-rs-configZPid, qcl-csi-rs-configNZPid).

CSI-RS may be configured using common parameters, when a plurality of UEs receive the same CSI-RS signal. CSI-RS may be configured using UE dedicated parameters, when a CSI-RS is configured for a specific UE. Depending on different MIMO beamforming types (e.g., CLASS A or CLASS B), a UE may be configured with one or more CSI-RS resource configurations per CSI process using at least one or more RRC signaling.

For some type of MIMO beamforming, CSI-RS resources may be activated or deactivated by a MAC signaling, over the CSI-RS resources configured by a RRC signaling. The network may activate and deactivate the configured CSI-RS resources of a serving cell by sending the Activation/Deactivation of CSI-RS resources MAC control element. The configured CSI-RS resources are initially deactivated upon configuration and after a handover.

The Activation/Deactivation of CSI-RS resources MAC control element is identified by a MAC PDU subheader with LCID. It has variable size as the number of CSI process configured with csi-RS-NZP-Activation by RRC (N) and the N number of octets with A fields are included in ascending order of CSI process ID, i.e., CSI-ProcessId as shown in FIG. 21A. Activation/Deactivation CSI-RS command is defined in FIG. 21B. The Activation/Deactivation CSI-RS command may activate or deactivate CSI-RS resources for a CSI process. For a UE configured with transmission mode 9, N equals 1. Activation/Deactivation of CSI-RS resources MAC control element applies to the serving cell on which the UE receives the Activation/Deactivation of CSI-RS resources MAC control element.

The Activation/Deactivation of CSI-RS resources MAC control elements are defined, where, "Ai" is this field indicates the activation/deactivation status of the CSI-RS resources configured by upper layers for the CSI process. In an example, A1 corresponds to the 1st entry in the list of CSI-RS specified by csi-RS-ConfigNZP-ApList as configured by upper layers, A2 corresponds to the 2nd entry in this list and so on. The Ai field is set to "1" to indicate that ith entry in the list of CSI-RS specified by csi-RS-ConfigNZP-ApList shall be activated. The Ai field is set to "0" to indicate that ith entry in the list shall be deactivated. For each CSI process, the number of Ai fields (i=1, 2, . . . , 8) which are set to "1" shall be equal to the value of the higher-layer parameter activatedResources.

After receiving a RRC for CSI-RS configuration and a MAC layer signaling for CSI-RS activation, a UE may be triggered with aperiodic CSI reporting, associated with the CSI-RS resources indicated in a DCI, for example, DCI format OC. A CSI request field in DCI format OC indicates for which CSI process and/or CSI-RS resource the CSI reporting is triggered, as shown in FIG. 22.

In an example shown in FIG. 23, three beams may be configured for a UE, in a UE-specific configuration. Beam 1 may be allocated with CSI-RS 1, transmitted in some subcarriers in a resource block (RB) of a first symbol. Beam 2 may be allocated with CSI-RS 2 in a second symbol, and Beam 3 in a third symbol. Not all subcarriers in a RB are necessarily used for transmitting CSI-RS 1 on beam 1. For example, other subcarriers, not used for Beam 1 for the UE, in the same RB, may be used for other CSI-RS transmissions associated with a beam for other UEs, which is called a Frequency Domain Multiplexing (FDM). In an example, beams used for a UE may be configured employing a time domain multiplexing (TDM), e.g., Beam 1, 2 and 3 for the UE may be transmitted using some symbols different from beams of other UEs.

A UE may perform downlink beam management using a UE-specific configured CSI-RS. In a beam management procedure, a UE may monitor a channel quality of a beam pair link. The beam pair link may comprise a transmitting beam from a gNB and a receiving beam by the UE. When multiple CSI-RSs associated with multiple beams are configured, a UE may monitor multiple beam pair links between the gNB and the UE.

A UE may transmit one or more beam management reports to a gNB. In a beam management report, the UE may indicate some beam pair quality parameters, comprising at least, one or more beam identifications; RSRP; PMI/CQI/RI of a subset of configured beams.

Figure 24:
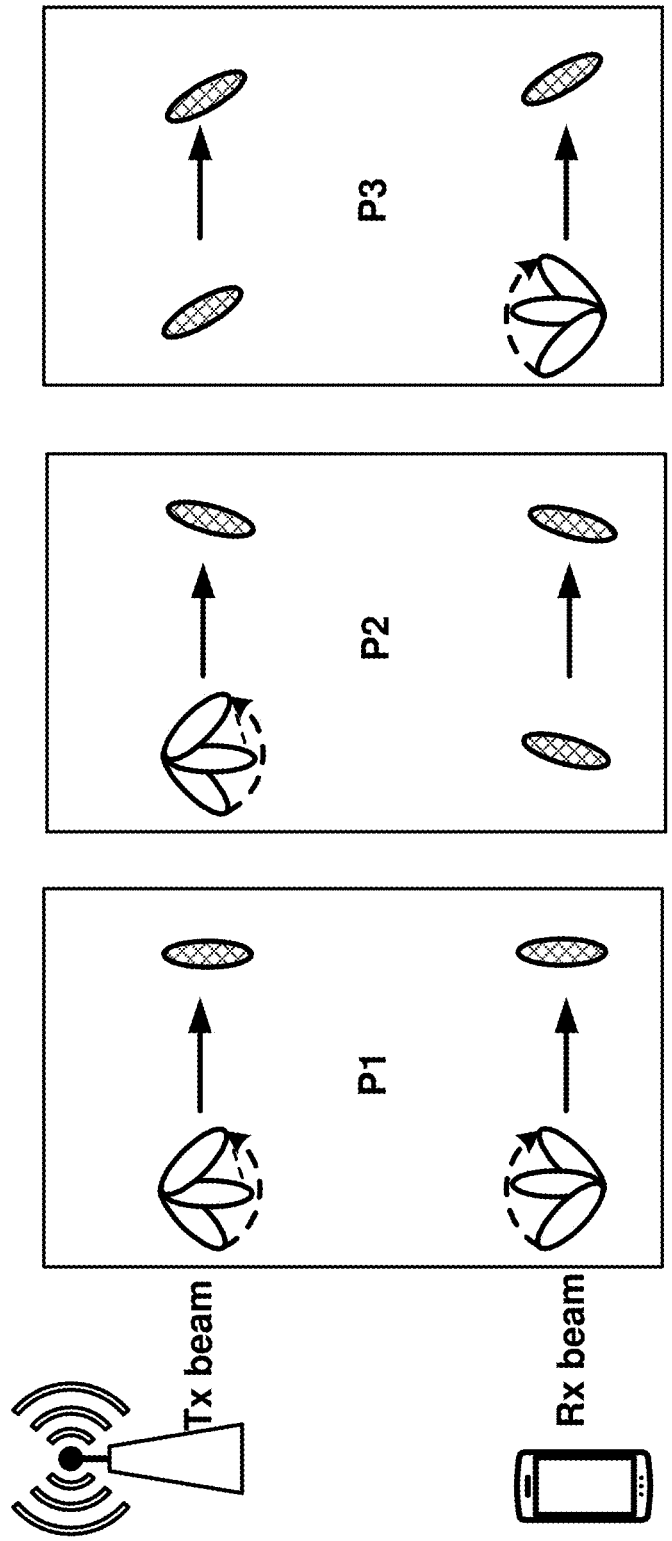
FIG. 24 is an example of downlink beam management procedures as per an aspect of an embodiment of the present disclosure.

A gNB and/or a UE may perform a downlink L1/L2 beam management procedure. One or more of the following downlink L1/L2 beam management procedures may be performed within one or multiple Transmission and Receiving Point (TRPs), as shown in FIG. 24. In an example, a P-1 procedure may be used to enable UE measurement on different TRP Tx beams to support selection of TRP Tx beams/UE Rx beam(s). For beamforming at TRP, it typically includes a intra/inter-TRP Tx beam sweep from a set of different beams. For beamforming at UE, it typically includes a UE Rx beam sweep from a set of different beams. In an example, a P-2 procedure may be used to enable UE measurement on different TRP Tx beams to possibly change inter/intra-TRP Tx beam(s). P-2 may be performed on a possibly smaller set of beams for beam refinement than in P-1. P-2 may be a special case of P-1. In an example, a P-3 procedure may be used to enable UE measurement on the same TRP Tx beam to change UE Rx beam in the case UE uses beamforming.

Based on a UE's beam management report, a gNB may transmit to a UE a signal indicating that one or more beam pair links are the one or more serving beams. The gNB may transmit PDCCH and PDSCH for the UE using the one or more serving beams.

In an example, a UE or a gNB may trigger a beam failure recovery mechanism. A UE may trigger a beam failure recovery (BFR) request transmission (e.g. when a beam failure event occurs) when quality of beam pair link(s) of an associated control channel falls below a threshold (e.g. in comparison with a threshold, and/or time-out of an associated timer).

A UE may measure quality of beam pair link using one or more reference signals (RS). One or more SS blocks, or one or more CSI-RS resources, each associated with a CSI-RS Resource Index (CRI), or one or more DM-RSs of PBCH, may be used as RS for measuring quality of a beam pair link. Quality of beam pair link may be defined as a RSRP value, or a Reference Signal Received Quality (RSRQ) value, and/or a CSI value measured on RS resources. A gNB may indicate whether an RS resource, used for measuring beam pair link quality, is QCLed (Quasi-Co-Located) with DM-RSs (demodulation reference signal) of a control channel. The RS resource and the DM-RSs of the control channel may be called QCLed when the channel characteristics from a transmission on an RS to a UE, and that from a transmission on a control channel to the UE, are similar or same under a configured criterion.

A UE may be configured to monitor PDCCH on M beam pair links simultaneously, where M≥1 and the maximum value of M may depend at least on UE capability. This process may increase robustness against beam pair link blocking. A gNB may transmit one or more messages configured to cause a UE to monitor PDCCH on different beam pair link(s) in different PDCCH OFDM symbols.

A gNB may transmit higher layer signaling or MAC CE comprising parameters related to UE Rx beam setting for monitoring PDCCH on multiple beam pair links. A gNB may transmit indication of spatial QCL assumption between an DL RS antenna port(s) (for example, cell-specific CSI-RS, or UE-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a gNB may indicate spatial QCL parameters between DL RS antenna port(s) and DM-RS antenna port(s) of DL data channel. A gNB may transmit DCI (downlink grants) comprising information indicating the RS antenna port(s). The information may indicate the RS antenna port(s) which is QCL-ed with DM-RS antenna port(s). Different set of DM-RS antenna port(s) for the DL data channel may be indicated as QCL with different set of RS antenna port(s).

When gNB transmits a signal indicating a spatial QCL parameters between CSI-RS and DM-RS for PDCCH, a UE may use CSI-RSs QCLed with DM-RS for PDCCH to monitor beam pair link quality. If beam failure event occurs, the UE may transmit beam failure recovery request by configuration.

When a UE transmits a beam failure recovery request on an uplink physical channel or signal, a gNB may detect that there is a beam failure event for the UE by monitoring the uplink physical channel or signal. The gNB may initiate a beam recovery mechanism to recover the beam pair link for transmitting PDCCH between the gNB and the UE. A beam recovery mechanism may be a L1 scheme, or a higher layer scheme.

A gNB may transmit one or more messages comprising configuration parameters of an uplink physical channel or signal for transmitting beam failure recovery request. The uplink physical channel or signal may be based one of: on a non-contention based PRACH (so called BFR-PRACH), which uses a resource orthogonal to resources of other PRACH transmissions; a PUCCH (so called BFR-PUCCH); and/or a contention-based PRACH resource. Combinations of these candidate signal/channels may be configured by the gNB.

A gNB may respond a confirmation message to a UE after receiving one or multiple BFR request. The confirmation message may include the CRI associated with the candidate beam the UE indicates in the one or multiple BFR request. The confirmation message may be a L1 control information.

LTE-Advanced introduced Carrier Aggregation (CA) in Release-10. In Release-10 CA, the Primary Cell (PCell) is always activated. In addition to the PCell, an eNB may transmit one or more RRC message comprising configuration parameters for one or more secondary cells. In 3GPP LTE/LTE-A specification, there are many RRC messages used for Scell configuration/reconfiguration. For example, the eNB may transmit a RRCconnectionReconfiguration message for parameters configuration of one or more secondary cells for a UE, wherein the parameters may comprise at least: cell ID, antenna configuration, CSI-RS configuration, SRS configuration, PRACH configuration, etc.

The one or more SCells configured in the RRC message can be activated or deactivated by at least one MAC Control Element (MAC CE). The SCell activation/deactivation processes were introduced to achieve battery power savings. When an SCell is deactivated, the UE may stop receiving downlink signals and stop transmission on the SCell. In LTE-A specification, the default state of an SCell is deactivated when the SCell has been configured/added. Additional activation procedure employing MAC CE Activation Command may be needed to activate the SCell. SCells may be deactivated either by an activation/deactivation MAC CE or by the sCellDeactivationTimer. The UE and eNB maintain one sCellDeactivationTimer per SCell with a common value across SCells. eNB maintains the activation/deactivation status of an SCell for a UE. The same initial timer value may apply to each instance of the sCellDeactivationTimer and it is configured by RRC. sCellDeactivationTimer is included in Mac-MainConfig dedicated parameter in an RRC message. The configured SCells may be initially deactivated upon addition and after a handover.

Figure 25A:
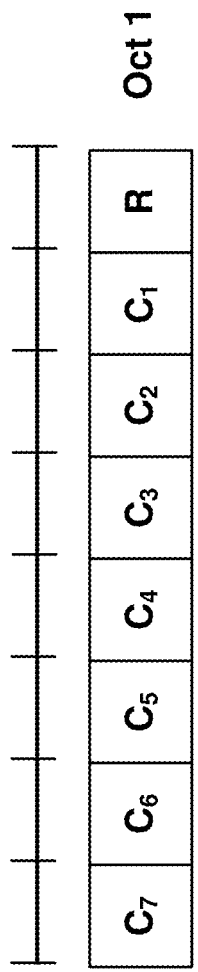
FIG. 25A and FIG. 25B are examples of activation/deactivation MAC control elements as per an aspect of embodiments of the present disclosure.
Figure 25B:
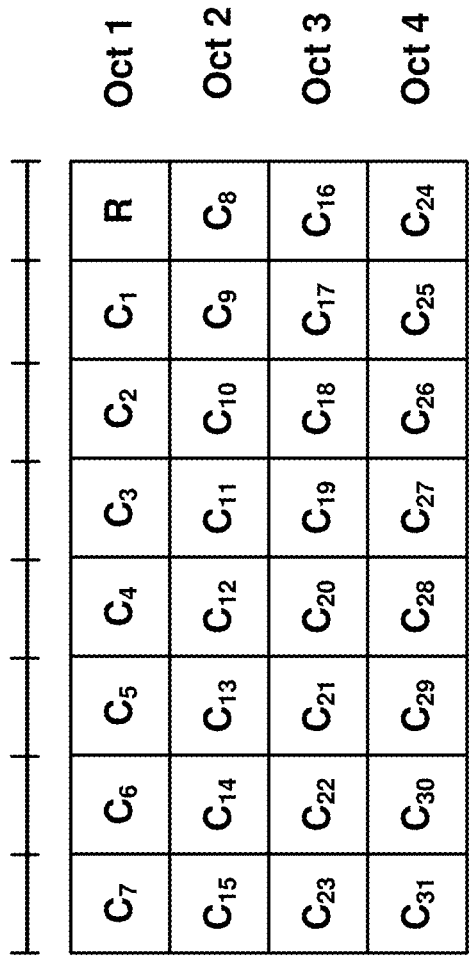

Various implementation of the Activation/Deactivation MAC control element may be possible. In an example embodiment, the Activation/Deactivation MAC control element is identified by a MAC PDU subheader with a pre-assigned LCID. It may have a fixed size and consists of a single octet containing seven C-fields and one R-field as shown in FIG. 25A and FIG. 25B. The Activation/Deactivation MAC control element is defined where, a Ci field indicates the activation/deactivation status of the SCell with SCellIndex i, if there is an SCell configured with SCellIndex i, otherwise the MAC entity may ignore the Ci field. The Ci field is set to "1" to indicate that the SCell with SCellIndex i may be activated. The Ci field is set to "0" to indicate that the SCell with SCellIndex i may be deactivated. And a R bit in the MAC CE is a Reserved bit which may be set to "0".

Other embodiments may be implemented. For example, when UE is configured with more than 5 or 7 carriers, the format may include more than one byte including a longer bitmap as shown in FIG. 25B.

Various deactivation timer management processes may be implemented. In an example embodiment, if PDCCH on the activated SCell indicates an uplink grant or downlink assignment; or if PDCCH on the Serving Cell scheduling the activated SCell indicates an uplink grant or a downlink assignment for the activated SCell: the UE may restart the sCellDeactivationTimer associated with the SCell.

In the current LTE-Advanced transceiver operation, the MAC entity may for each TTI and for each configured SCell perform certain functions related to activation/deactivation of SCell(s). If the MAC entity receives an Activation/Deactivation MAC control element in this TTI activating the SCell, the MAC entity may in the TTI according to the timing defined in LTE_A specification: activate the SCell; start or restart the sCellDeactivationTimer associated with the SCell; and trigger PHR (power headroom). If the MAC entity receives an Activation/Deactivation MAC control element in this TTI deactivating the SCell; or if the sCellDeactivationTimer associated with the activated SCell expires in this TTI: in the TTI according to the timing defined in LTE_A specification: deactivate the SCell; stop the sCellDeactivationTimer associated with the SCell; and/or flush all HARQ buffers associated with the SCell.

In the current LTE-Advanced transceiver operation, when a UE activates the SCell, the UE may apply normal SCell operation including: SRS transmissions on the SCell; CQI/PMI/RI/PTI reporting for the SCell; PDCCH monitoring on the SCell; and/or PDCCH monitoring for the SCell.

If the SCell is deactivated, a UE may perform the following actions: not transmit SRS on the SCell; not report CQI/PMI/RI/PTI for the SCell; not transmit on UL-SCH on the SCell; not transmit on RACH on the SCell; not monitor the PDCCH on the SCell; not monitor the PDCCH for the SCell. When SCell is deactivated, the ongoing Random Access procedure on the SCell, if any, is aborted.

When a UE receives a MAC activation command for a secondary cell in subframe n, the corresponding actions in the MAC layer shall be applied no later than the minimum requirement defined in 3GPP TS 36.133 and no earlier than subframe n+8, except for the following: the actions related to CSI reporting and the actions related to the sCellDeactivationTimer associated with the secondary cell, which shall be applied in subframe n+8. When a UE receives a MAC deactivation command for a secondary cell or the sCellDeactivationTimer associated with the secondary cell expires in subframe n, the corresponding actions in the MAC layer shall apply no later than the minimum requirement defined in 3GPP TS 36.133, except for the actions related to CSI reporting which shall be applied in subframe n+8.

Figure 26A:
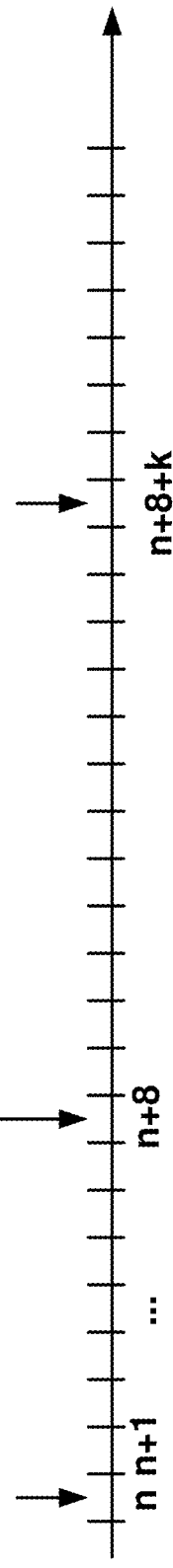
FIG. 26A is an example of sCellDeactivationTimer starting when a SCell activated as per an aspect of an embodiment of the present disclosure.
Figure 26B:
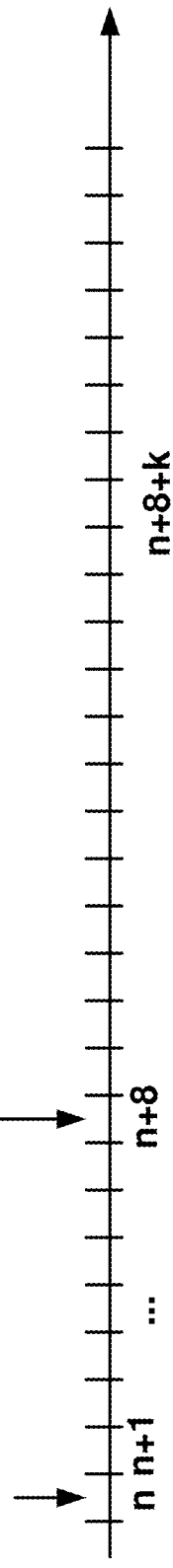
FIG. 26B is an example of sCellDeactivationTimer starting when a SCell activated as per an aspect of an embodiment of the present disclosure.

When a UE receives a MAC activation command for a secondary cell in subframe n, the actions related to CSI reporting and the actions related to the sCellDeactivationTimer associated with the secondary cell, are applied in subframe n+8. When a UE receives a MAC deactivation command for a secondary cell or other deactivation conditions are met (e.g. the sCellDeactivationTimer associated with the secondary cell expires) in subframe n, the actions related to CSI reporting are applied in subframe n+8. FIG. 26 shows the timeline when a UE receives a MAC activation command. The UE starts reporting invalid or valid CSI for the Scell at the $(n+8)^{th}$ subframe, and start or restart the sCellDeactivationTimer when receiving the MAC CE activating the SCell in the $n^{th}$ subframe. For some UE having slow activation as shown in FIG. 26A, it may report an invalid CSI (out-of-range CSI) at the $(n+8)^{th}$ subframe, for some UE having a quick activation as shown in FIG. 26B, it may report a valid CSI at the $(n+8)^{th}$ subframe.

When a UE receives a MAC activation command for an SCell in subframe n, the UE starts reporting CQI/PMI/RI/PTI for the SCell at subframe n+8 and starts or restarts the sCellDeactivationTimer associated with the SCell at subframe n. It is important to define the timing of these actions for both UE and eNB. For example, sCellDeactivationTimer is maintained in both eNB and UE and it is important that both UE and eNB stop, start and/or restart this timer in the same TTI.

In a NR system, when a UE receives a MAC activation commend for an SCell in subframe (or slot) n, the UE may start or restart the sCellDeactivationTimer associated with the SCell in the same subframe (or slot). The UE may start reporting CQI/PMI/RI/PTI for the SCell at subframe n+m, where m is a value configured by a RRC message, or a predefined value.

In an example, a gNB may transmit a DCI via a PDCCH for scheduling decision and power-control commends. More specifically, the DCI may comprise at least one of: downlink scheduling assignments, uplink scheduling grants, power-control commands. The downlink scheduling assignments may comprise at least one of: PDSCH resource indication, transport format, HARQ information, and control information related to multiple antenna schemes, a command for power control of the PUCCH used for transmission of ACK/NACK in response to downlink scheduling assignments. The uplink scheduling grants may comprise at least one of: PUSCH resource indication, transport format, and HARQ related information, a power control command of the PUSCH.

The different types of control information may correspond to different DCI message sizes. For example, supporting spatial multiplexing with noncontiguous allocation of RBs in the frequency domain may require a larger scheduling message in comparison with an uplink grant allowing for frequency-contiguous allocation only. DCI may be categorized into different DCI formats, where a format corresponds to a certain message size and usage.

In an example, a UE may monitor one or more PDCCH to detect one or more DCI with one or more DCI format. The one or more PDCCH may be transmitted in common search space or UE-specific search space. A UE may monitor PDCCH with only a limited set of DCI format, to save power consumption. For example, a normal UE may not be required to detect a DCI with DCI format 6 which is used for an eMTC UE. The more DCI format to be detected, the more power be consumed at the UE.

In an example, the information in the DCI formats used for downlink scheduling can be organized into different groups, with the field present varying between the DCI formats, including at least one of: resource information, consisting of: carrier indicator (0 or 3 bits), RB allocation; HARQ process number; MCS, NDI, and RV (for the first TB); MCS, NDI and RV (for the second TB); MIMO related information, comprising at least one of: PMI, precoding information, transport block swap flag, power offset between PDSCH and reference signal, reference-signal scrambling sequence, number of layers, and/or antenna ports for the transmission; PDSCH resource-element mapping and QCI; Downlink assignment index (DAI); TPC for PUCCH; SRS request (1 bit), triggering one-shot SRS transmission; ACK/NACK offset; DCI format 0/1A indication, used to differentiate between DCI format 1A and 0, as the two formats have the same message size; and padding if necessary.

In an example, the information in the DCI formats used for uplink scheduling can be organized into different groups, with the field present varying between the DCI formats, including at least one of: resource information, consisting of: carrier indicator, resource allocation type, RB allocation; MCS, NDI (for the first TB); MCS, NDI (for the second TB); Phase rotation of the uplink DMRS; precoding information; CSI request, requesting an aperiodic CSI report; SRS request (2 bit), used to trigger aperiodic SRS transmission using one of up to three preconfigured settings; Uplink index/DAI; TPC for PUSCH; DCI format 0/1A indication; and padding if necessary.

In a NR system, in order to support wide bandwidth operation, a gNB may transmit one or more PDCCH in different control resource sets. A gNB may transmit one or more RRC message comprising configuration parameters of one or more control resource sets. At least one of the one or more control resource sets may comprise at least one of: a first OFDM symbol (e.g., CORESET_StartSymbol); a number of consecutive OFDM symbols (e.g., CORESET_NumSymbol); a set of resource blocks (e.g., CORESET_RBSet); a CCE-to-REG mapping (e.g., CORESET_mapping); and a REG bundle size, in case of interleaved CCE-to-REG mapping (e.g., CORESET_REG_bundle).

With configured control resource sets, a UE may monitor PDCCH for detecting DCI on a subset of control resource sets, to reduce the power consumption.

Figure 27:
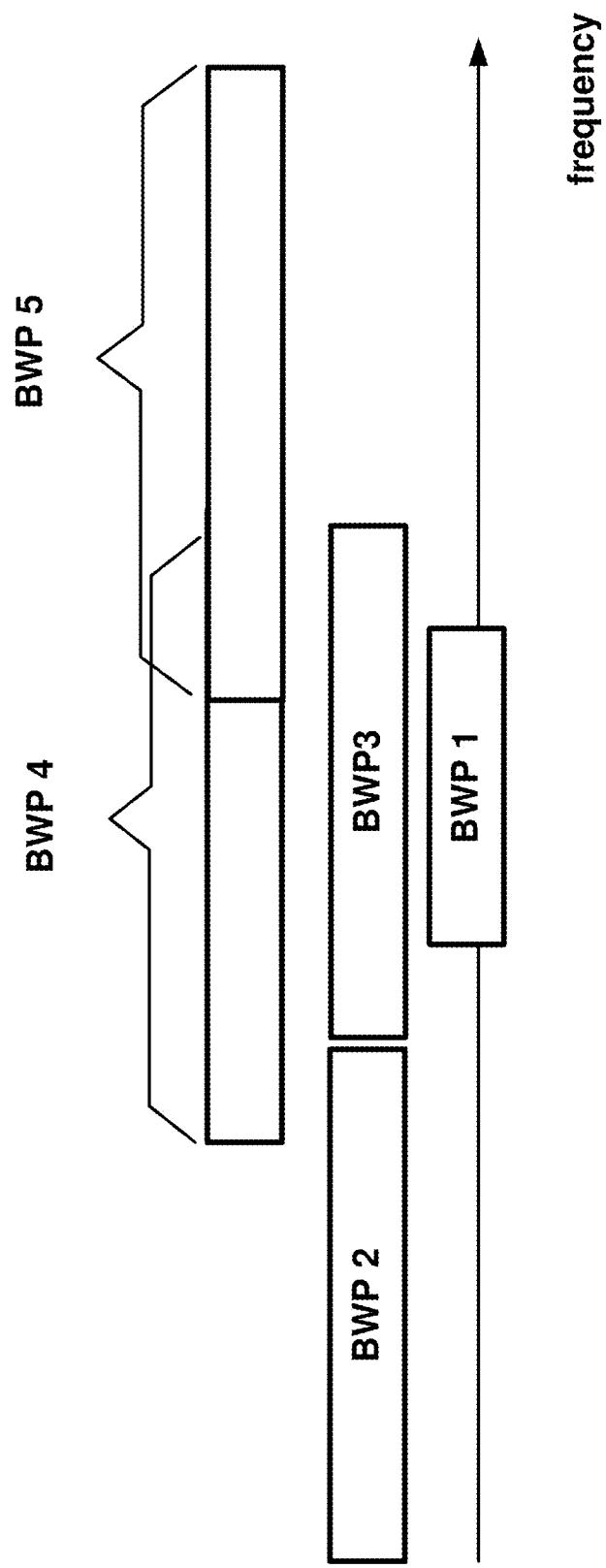
FIG. 27 is an example of multiple Bandwidth Parts (BWPs) configuration in frequency domain as per an aspect of an embodiment of the present disclosure.

In an example, a gNB may transmit one or more message comprising configuration parameters of one or more active bandwidth parts (BWP). The one or more active BWPs may have different numerologies. A gNB may transmit one or more control information for cross-BWP scheduling to a UE. FIG. 27 shows example of multiple BWP configuration. One BWP may overlap with another BWP in frequency domain.

A gNB may transmit one or more messages comprising configuration parameters of one or more DL and/or UL BWPs for a cell, with at least one BWP as the active DL or UL BWP, and zero or one BWP as the default DL or UL BWP.

For a PCell, the active DL BWP may be the DL BWP on which the UE may monitor one or more PDCCH, and/or receive PDSCH. The active UL BWP is the UL BWP on which the UE may transmit uplink signal.

For a SCell, the active DL BWP may be the DL BWP on which the UE may monitor one or more PDCCH and receive PDSCH when the SCell is activated by receiving a MAC activation/deactivation CE. The active UL BWP is the UL BWP on which the UE may transmit PUCCH (if configured) and/or PUSCH when the SCell is activated by receiving a MAC activation/deactivation CE.

Configuration of multiple BWPs may be used to save UE's power consumption. When configured with an active BWP and a default BWP, a UE may switch to the default BWP if there is no activity on the active BWP. For example, a default BWP may be configured with narrow bandwidth, an active BWP may be configured with wide bandwidth. If there is no signal transmitting on or receiving from an active BWP, the UE may switch the BWP to the default BWP, which may reduce power consumption.

Switching BWP may be triggered by a DCI or a timer. When a UE receives a DCI indicating DL BWP switching from an active BWP to a new BWP, the UE may monitor PDCCH and/or receive PDSCH on the new BWP. When the UE receives a DCI indicating UL BWP switching from an active BWP to a new BWP, the UE may transmit PUCCH (if configured) and/or PUSCH on the new BWP.

A gNB may transmit one or more messages comprising a BWP inactive timer to a UE. The UE may start the timer when it switches its active DL BWP to a DL BWP other than the default DL BWP. The UE may restart the timer to the initial value when it successfully decodes a DCI to schedule PDSCH(s) in its active DL BWP. The UE may switch its active DL BWP to the default DL BWP when the BWP timer expires.

Figure 28:
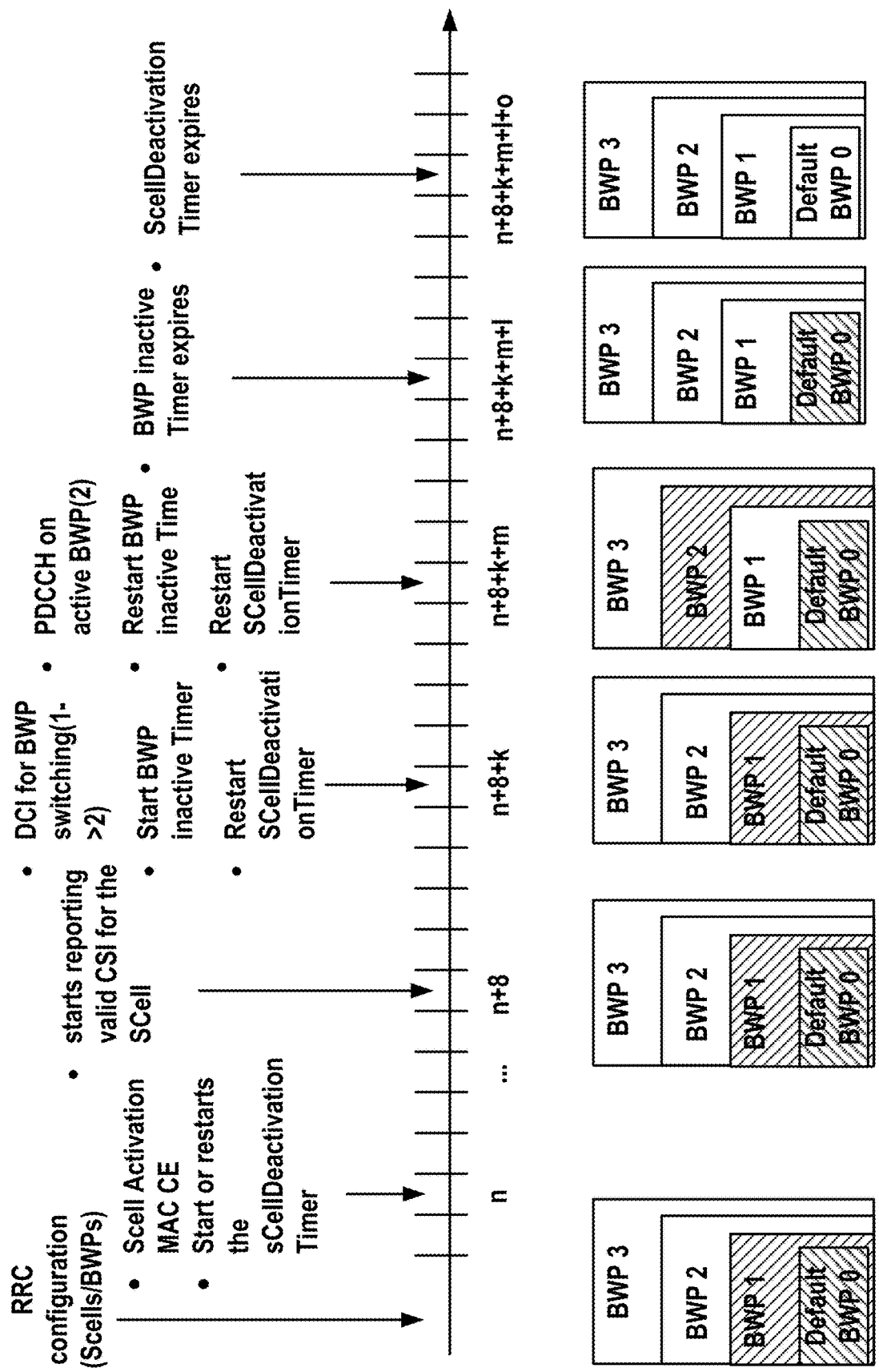
FIG. 28 is an example of BWP inactive timer and sCellDeactivationTimer relation when a SCell activated as per an aspect of an embodiment of the present disclosure.

FIG. 28 shows example of BWP switching associated with BWP inactive timer. A UE may receive RRC message comprising parameters of a secondary cell (SCell) and one or more BWP configuration associated with the SCell. Among the one or more BWPs, at least one BWP may be configured as the first active BWP (e.g., BWP 1 in the figure), one BWP as the default BWP (e.g., BWP 0 in the figure). The UE may receive a MAC CE to activate the Scell at the $n^{th}$ subframe. The UE may start the sCellDeactivationTimer at the $n^{th}$ subframe, and start reporting CSI for the SCell, or for the initial active BWP of the SCell at the $(n+8)^{th}$ subframe. The UE may start the BWP inactive timer and restart the sCellDeactivationTimer when receiving a DCI indicating switching BWP from BWP 1 to BWP 2, at the $(n+8+k)^{th}$ subframe. When receiving a PDCCH indicating DL scheduling on BWP 2, for example, at the $(n+8+k+m)^{th}$ subframe, the UE may restart the BWP inactive timer and sCellDeactivationTimer. The UE may switch back to the default BWP (0) when the BWP inactive timer expires, at the $(n+8+k+m+l)^{th}$ subframe. The UE may deactivate the SCell when the sCellDeactivationTimer expires at the $(n+8+k+m+l+o)^{th}$ subframe.

In an example, BWP inactive timer may be used to reduce UE's power consumption when configured with multiple cells with each cell having wide bandwidth. The UE may transmit on or receive from a narrow-bandwidth BWP on the PCell or SCell when there is no activity on an active BWP. The UE may deactivate the SCell triggered by sCellDeactivationTimer expiring when there is no activity on the SCell.

In an example, a gNB may transmit one or more RRC message comprising one or more CSI configuration parameters comprising at least: one or more CSI-RS resource settings; one or more CSI reporting settings, and one CSI measurement setting.

In an example, a CSI-RS resource setting may comprise one or more CSI-RS resource sets. In an example, there may be one CSI-RS resource set for periodic CSI-RS, or SP CSI-RS.

In an example, a CSI-RS resource set may comprise at least one of: one CSI-RS type (e.g., periodic, aperiodic, semi-persistent); one or more CSI-RS resources comprising at least one of: CSI-RS resource configuration identity; number of CSI-RS ports; CSI RS configuration (symbol and RE locations in a subframe); CSI RS subframe configuration (subframe location, offset and periodicity in radio frame); CSI-RS power parameter; CSI-RS sequence parameter; CDM type parameter; frequency density; transmission comb; and/or QCL parameters.

In an example, one or more CSI-RS resources may be transmitted periodically, or using aperiodic transmission, or using a semi-persistent transmission.

In a periodic transmission, the configured CSI-RS resource may be transmitted using a configured periodicity in time domain.

In an aperiodic transmission, the configured CSI-RS resource may be transmitted in a dedicated time slot or subframe.

In a semi-persistent transmission, one or more configured CSI-RS resources may be transmitted when triggered by a CSI activation MAC CE or DCI. The transmission of the one or more configured CSI-RS resources may be stopped when triggered by a CSI deactivation MAC CE or DCI. The transmission of the one or more configured CSI-RS resources may be stopped when the transmission duration (if configured) expires.

In an example, a CSI reporting setting may comprise at least one of: one report configuration identifier; one report type; one or more reported CSI parameter(s); one or more CSI Type (I or II); one or more codebook configuration parameters; a report quantity indicator indicating CSI-related or L1-RSRP-related quantities to report; one or more parameters indicating time-domain behavior; frequency granularity for CQI and PMI; and/or measurement restriction configurations. The report type may indicate a time domain behavior of the report (aperiodic, semi-persistent, or periodic). The one of the one or more CSI reporting settings may further comprise at least one of: one periodicity parameter; one duration parameter; and/or one offset (e.g., in unit of slots), if the report type is a periodic or semi-persistent report. The periodicity parameter may indicate the periodicity of a CSI report. The duration parameter may indicate the duration of CSI report transmission. The offset parameter may indicate value of timing offset of CSI report from a reference time.

In an example, a CSI measurement setting may comprise one or more links comprising one or more link parameters. The one or more link parameters may comprise at least one of: one CSI reporting setting indication; CSI-RS resource setting indication; and/or one or more measurement parameters.

In an example, a gNB may trigger a CSI reporting by transmitting a RRC message, or a MAC CE, or a DCI. In an example, a UE may transmit one or more SP CSI report on a PUCCH, with a transmission periodicity, triggered by receiving a MAC CE activating a SP CSI reporting. In an example, a UE may transmit one or more SP CSI report on a PUSCH, triggered by receiving a DCI activating a SP CSI reporting.

Figure 29:
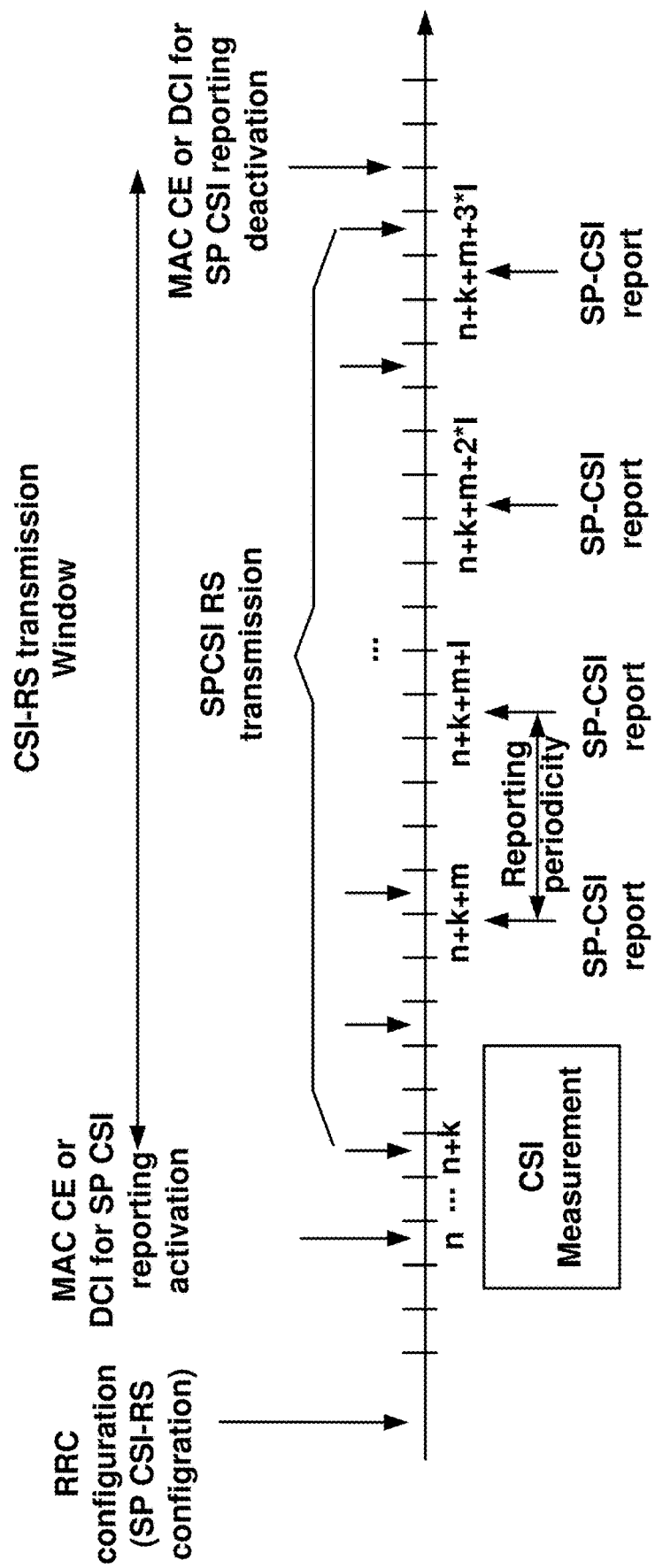
FIG. 29 is an example of SP CSI configuration with a CSI activation MAC CE or DCI and a CSI deactivation MAC CE or DCI as per an aspect of an embodiment of the present disclosure.

FIG. 29 shows an example of the embodiment. In response to transmitting a MAC CE or DCI for triggering a SP CSI reporting at subframe n, a gNB may start transmitting one or more SP CSI-RS at subframe n+k. The value "k" may be zero, or an integer greater than zero, configured by a RRC message. The value "k" may be predefined as a fixed value.

For example, a UE may transmit SP CSI report at subframe n+k+m, n+k+m+l, n+k+m+2*l, n+k+m+3*l, etc., with a periodicity of l subframes. The UE may stop transmitting SP CSI reporting in response to receiving a MAC CE or DCI for deactivating SP CSI reporting.

In an example, the time and frequency resources that may be used by the UE to report CSI are controlled by the gNB. CSI consists of Channel Quality Indicator (CQI), precoding matrix indicator (PMI), CSI-RS resource indicator (CRI), strongest layer indication (SLI), rank indication (RI) and/or and L1-RSRP.

In an example, for CQI, PMI, CRI, SLI, RI, L1-RSRP, a UE is configured by higher layers with N≥1 ReportConfig Reporting Settings, M≥1 ResourceConfig Resource Settings, and a single MeasConfig measurement setting containing L≥1 Links. A MeasConfig contains a list of reporting configurations (ReportConfigList), a list of resource configurations (ResourceConfigList), a list of link configurations (MeasLinkConfigList) and a list of trigger states (ReportTrigger).

In an example, a Reporting Setting ReportConfig is associated with a single downlink BWP (higher layer parameter bandwidthPartId) and contains the reported parameter(s) for one CSI reporting band: CSI Type (I or II) if reported, codebook configuration including codebook subset restriction, time-domain behavior, frequency granularity for CQI and PMI, measurement restriction configurations, the strongest layer indicator (SLI), the reported L1-RSRP parameter(s), CRI, and SSBRI (SSB Resource Indicator). Each ReportConfig contains a ReportConfigID to identify the ReportConfig, a ReportConfigType to specify the time domain behavior of the report (either aperiodic, semi-persistent, or periodic), a ReportQuantity to indicate the CSI-related or L1-RSRP-related quantities to report, a ReportFreqConfiguration to indicate the reporting granularity in the frequency domain. For periodic/semi-persistent reporting, a ReportConfig contains a ReportSlotConfig to specify the periodicity and slot offset. For aperiodic reporting, a ReportConfig contains an AperiodicReportSlotOffset to specify a set of allowed values of the timing offset for aperiodic reporting (a particular value is indicated in DCI). The ReportFreqConfiguration contains parameters to enable configuration of at least subband or wideband PMI and CQI reporting separately. The ReportConfig may also contain MeasRestrictionConfig-time-channel to specify parameters to enable configuration of time domain measurement restriction for channel. The ReportConfig may also contain MeasRestrictionConfig-time-interference to specify parameters to enable separate configuration of time domain measurement restriction for interference. The ReportConfig may also contain CodebookConfig, which contains configuration parameters for Type-I or Type II CSI including codebook subset restriction.

In an example, a Resource Setting ResourceConfig contains a configuration of S≥1 CSI-RS Resource Sets (higher layer parameter ResourceSetConfig), with each Resource Set consisting of CSI-RS resources (higher layer parameters NZP-CSI-RS-ResourceConfigList and CSI-IM-ResourceConfigList) and SS/PBCH Block resources used for L1-RSRP computation (higher layer parameter resource-config-SS-list). Each Resource Setting is located in the BWP identified by the higher layer parameter BWP-info, and all linked Resource Settings of a CSI Report Setting have the same BWP.

In an example for periodic and semi-persistent CSI Resource Settings, S=1. Each set s contains Ks≥1 CSI-RS resources (higher layer parameter CSI-RS-ResourceConfig) each of which includes at least mapping to REs, number of ports and time-domain behavior. The allowable antenna port values and resource mapping patterns are specified in TS 38.211. The time domain behavior of the CSI-RS resources which are part of sets within a CSI-RS Resource Setting are indicated by the higher layer parameter ResourceConfigType and may be aperiodic, periodic, or semi-persistent.

In an example, one or more CSI resource settings for channel and interference measurement may be are configured via higher layer signaling with at least one of: CSI-IM resource for interference measurement; non-zero power CSI-RS resource for interference measurement; and/or non-zero power CSI-RS resource for channel measurement.

In an example, a Link MeasLinkConfig in the higher layer-configured CSI measurement setting contains the CSI Reporting Setting indication, CSI Resource Setting Indication, and MeasQuantity an indication of the quantity to be measured which may be either channel measurement or interference measurement. ReportConfigMax indicates the maximum number of report configurations, ResourceConfigMax indicates the maximum number of resource configurations, MeasLinkConfigMax indicates the maximum number of link configurations, ResourceSetMax indicates the maximum number of resources sets per resource configuration, CSI-RS-ResourcePerSetMax indicates the maximum number of NZP-CSI-RS resources per NZP-CSI-RS resource set, NZP-CSI-RS-ResourceMax indicates the maximum number of NZP-CSI-RS resources, CSI-IM-ResourcePerSetMax indicates the maximum number of CSI-IM resources per CSI-IM resource set, CSI-IM-ResourceMax indicates the maximum number of CSI-IM resources, and AperiodicReportTrigger contains trigger states for dynamically selecting one or more aperiodic reporting configurations.

In an example, the Reporting configuration for CSI may be aperiodic (using PUSCH), periodic (using PUCCH) or semi-persistent (using PUCCH, and DCI activated PUSCH). The CSI-RS Resources may be periodic, semi-persistent, or aperiodic. Different combinations of CSI Reporting configurations and CSI Resource configurations and may be supported and the CSI Reporting may be triggered for each CSI-RS configuration, see for example FIG. 30. Periodic CSI-RS may be configured by higher layers. Semi-persistent CSI-RS may be activated and deactivated. Aperiodic CSI-RS may be configured and selected.

In an example, when the UE is configured with the higher layer configured parameter Number-CQI set to '1', a single CQI is reported for one codeword per CSI report. When '2' is configured, one CQI for each codeword is reported per CSI report. The Number-CQI is contained in ReportConfig.

In an example, when the UE is configured with a CSI-RS resource set and when the higher layer parameter CSI-RS-ResourceRep is set to 'OFF', the UE may determine a CRI from the supported set of CRI values and report the number in each CRI report. When the higher layer parameter CSI-RS-ResourceRep is set to 'ON', CRI is not reported.

For periodic or semi-persistent CSI reporting, the following periodicities (measured in slots) are configured by the higher layer parameter ReportPeriodicity: {5, 10, 20, 40, 80, 160, 320}.

In an example, when the UE is configured with the higher layer parameter ReportQuantity set to 'CRI/RSRP', if the UE is configured with the higher layer parameter group-based-beam-reporting set to 'OFF', the UE may be not required to update measurements for more than 64 [CSI-RS and or SSB] resources, and the UE may report in a single report nrofReportedRS (higher layer configured) different [CRI and SSBRI (SSB Resource Indicator)] for each report setting. If the higher layer parameter nrofReportedRS is configured to be one, the reported L1-RSRP value may be defined by a 7-bit value in the range [−140, −44] dBm with 1 dB step size. If the higher layer parameter nrofReportedRS is configured to be larger than one, the UE may use largest L1-RSRP and differential L1-RSRP based reporting, where the largest value of L1-RSRP uses a 7-bit value and the differential L1-RSRP uses a 4-bit value. The differential L1-RSRP values are computed with 2 dB step size with a reference to the largest L1-RSRP value which is part of the same L1-RSRP reporting instance. In an example, if the UE is configured with the higher layer parameter group-based-beam-reporting set to 'ON', the UE may report in a single reporting instance up to number-of-beams-reporting L1-RSRP and CSI reports, where up to number-of-beams-reporting [CSI-RS and or SSB] resources may be received simultaneously by the UE either with a single spatial domain receive filter, or with multiple simultaneous spatial domain receive filters.

In an example, for L1-RSRP computation, a UE may be configured with CSI-RS resources, SS/PBCH Block resources or both CSI-RS and SS/PBCH Block resource. The UE may be configured with CSI-RS resource setting up to 16 CSI-RS resource sets having up to 64 resources within each set. The total number of different CSI-RS resources over all resource sets is no more than 128.

In an example, a UE configured with a CSI-RS resource, when configured with the higher layer parameter ReportQuantity set to 'No Report', the UE may not report any information, otherwise the UE may report the information as configured by the ReportQuantity.

In an example the ReportFreqConfiguration contained in a ReportConfig indicates the frequency granularity of the CSI Report. For CSI reporting, a UE may be configured via higher layer signaling with one out of two possible subband sizes, where a subband is defined as $N_{PRB}^{SB}$ contiguous PRBs and depends on the total number of PRBs in the carrier bandwidth part.

In an example, a CSI reporting setting configuration defines a CSI reporting band as a subset of subbands of the bandwidth part, where the ReportFreqConfiguration may indicate the CSI-ReportingB and as a contiguous or non-contiguous subset of subbands in the bandwidth part for which CSI may be reported. The UE may be not expected to be configured with a CSI reporting band which contains subbands where reference signals for channel and interference are not present. The ReportFreqConfiguration may indicate single CQI or multiple CQI reporting, as configured by the higher layer parameter CQI-FormatIndicator. When single CQI reporting is configured, a single CQI is reported for each codeword for the entire CSI reporting band. When multiple CQI reporting is configured, one CQI for each codeword may be reported for each subband in the CSI reporting band. The ReportFreqConfiguration may indicate single PMI or multiple PMI reporting as configured by the higher layer parameter PMI-FormatIndicator. When single PMI reporting is configured, a single PMI is reported for the entire CSI reporting band. When multiple PMI reporting is configured, except with 2 antenna ports, a single wideband indication is reported for the entire CSI reporting band and one subband indication is reported for each subband in the CSI reporting band. When multiple PMIs are configured with 2 antenna ports, a PMI is reported for each subband in the CSI reporting band.

When a UE is configured with higher layer parameter CodebookType set to 'TypeI-SinglePanel' and PMI-FormatIndicator is configured for single PMI reporting, the UE may be configured with CSIReportQuantity to report RI/CRI, and a PMI consisting of a single wideband indication for the entire CSI reporting band. In an example, the UE may be configured with CSIReportQuantity to report RI/CRI, CQI, and a PMI consisting of a single wideband indication for the entire CSI reporting band. The CQI is calculated assuming PDSCH transmission with $N_p \geq 1$ precoders, where the UE assumes that one precoder is randomly selected from the set of $N_p$ precoders for each PRG on PDSCH, where the PRG size for CQI calculation is configured by the higher layer parameter PUSCH-bundle-size-for-CSI In an example, if a UE is configured with semi-persistent CSI reporting, the UE may report CSI when both CSI-IM and non-zero power CSI-RS resources are configured as periodic or semi-persistent. If a UE is configured with aperiodic CSI reporting, the UE may report CSI when both CSI-IM and non-zero power CSI-RS resources are configured as periodic, semi-persistent or aperiodic.

In an example a trigger state configured using the higher layer parameter ReportTrigger is associated one or multiple ReportConfig where each ReportConfig is linked to periodic, or semi-persistent, or aperiodic resource setting(s). When one resource setting is configured, the resource setting is for channel measurement for L1-RSRP computation. When two resource settings are configured, the first one resource setting is for channel measurement and the second one is for interference measurement performed on CSI-IM or on non-zero power CSI-RS.

When three resource settings are configured, the first one resource setting is for channel measurement, the second one is for CSI-IM based interference measurement and the third one is for non-zero power CSI-RS based interference measurement.

In an example, for CSI measurement(s), a UE may assume each non-zero power CSI-RS port configured for interference measurement corresponds to an interference transmission layer. In an example, the UE may assume all interference transmission layers on non-zero power CSI-RS ports for interference measurement, considering the associated EPRE ratios; and other interference signal on REs of non-zero power CSI-RS resource for channel measurement, non-zero power CSI-RS resource for interference measurement, or CSI-IM resource for interference measurement.

In an example if a UE is configured with the higher layer parameter ReportQuantity set to 'CRI/RI/CQI', the UE is configured with higher layer parameter Non-PMI-PortIndication contained in a ReportConfig, where r ports are indicated in the order of layer ordering for rank r and each CSI-RS resource in the CSI resource setting linked to the ReportConfig in a MeasLinkConfig, based on the order of the associated NZP-CSI-RS-ResourceConfigID in the linked CSI resource setting linked for channel measurement.

When calculating the CQI for a rank, the UE may use the ports indicated for that rank for the selected CSI-RS resource. The precoder for the indicated ports may be assumed to be the identity matrix.

In an example, for Resource Sets configured with the higher layer parameter ResourceConfigType set to 'aperiodic', trigger states for Reporting Setting(s) and/or Resource Set(s) for channel and/or interference measurement on one or more component carriers are configured using the higher layer parameter AperiodicReportTrigger. For aperiodic CSI report triggering, a single set of CSI triggering states are higher layer configured, wherein the CSI triggering states may be associated with either candidate DL BWP. A UE is not expected to be triggered with a CSI report for a non-active DL BWP. A trigger state is initiated using the DCI CSI request field. When the value of the DCI CSI request field is zero, no CSI is requested. When the number of configured CSI triggering states in AperiodicReportTrigger is greater than $2^{N_{TS}}-1$, where $N_{TS}$ is the number of bits in the DCI CSI request field, the UE receives a selection command used to map up to $2^{N_{TS}}-1$ trigger states to the codepoints of the DCI CSI request field. $N_{TS}$ is configured by the higher layer parameter ReportTriggerSize and $N_{TS} \in \{0,1,2,3,4,5,6\}$. When the number of CSI triggering states in AperiodicReportTrigger is less than or equal to $2^{N_{TS}}-1$, the DCI CSI request field directly indicates the triggering state and the UE's quasi-colocation assumption. For each aperiodic CSI-RS resource associated with each CSI triggering state, the UE is indicated the quasi co-location configuration of quasi co-location RS source(s) and quasi co-location type(s) through higher layer signaling of QCL-Info-aPerodicReportimeTrigger which contains a list of references to TCI-RS-SetConfig's for the aperiodic CSI-RS resources associated with the CSI triggering state. If a TCI-RS-SetConfig in the list is configured with a reference to an RS associated with QCL-TypeD, that RS may be an SS/PBCH block or a CSI-RS resource configured as periodic or semi-persistent.

In an example, for a UE configured with the higher layer parameter AperiodicReportTrigger, if a resource setting linked to a ReportConfig has multiple aperiodic resource sets and only a subset of the aperiodic resource sets is associated with the trigger state, a higher layer configured bitmap ResourceSetBitmap is configured per trigger state per resource setting to select the CSI-IM/NZP CSI-RS resource set(s) from the resource setting.

In an example, when aperiodic CSI-RS is used with aperiodic reporting, the CSI-RS offset is configured per resource set in the higher layer parameter AperiodicNZP-CSI-RS-TriggeringOffset. The CSI-RS triggering offset X is measured in slots.

In an example, for semi-persistent reporting on PUSCH, a set of semi-persistent CSI report settings are higher layer configured by Semi-persistent-on-PUSCHReportTrigger and the CSI request field in DCI scrambled with SP-CSI C-RNTI activates one of the semi-persistent CSI reports.

In an example, for semi-persistent reporting on PUCCH, a set of semi-persistent CSI report settings are higher layer configured by reportConfigType with the PUCCH resource used for transmitting the CSI report. Semi-persistent reporting on PUCCH is activated by an activation command, which selects one of the semi-persistent CSI Report settings for use by the UE on the PUCCH. If the field reportConfigType is not present, the UE may report the CSI on PUSCH.

In an example, for a UE configured with the higher layer parameter ResourceConfigType set to 'semi-persistent'. When a UE receives an activation command for CSI-RS resource(s) for channel measurement and CSI-IM/NZP CSI-RS resource(s) for interference measurement associated with configured CSI resource setting(s) in slot n, the corresponding actions and the UE assumptions (including quasi-co-location assumptions provided by a reference to a TCI-RS-SetConfig) on CSI-RS/CSI-IM transmission corresponding to the configured CSI-RS/CSI-IM resource configuration(s) may be applied no later than the minimum requirement. When a UE receives a deactivation command for activated CSI-RS/CSI-IM resource(s) associated with configured CSI resource setting(s) in slot n, the corresponding actions and UE assumption on cessation of CSI-RS/CSI-IM transmission corresponding to the deactivated CSI-RS/CSI-IM resource(s) may apply no later than the minimum requirement. The UE may assume that the CSI-RS resource(s) for channel measurement and the CSI-IM/NZP CSI-RS resource(s) for interference measurement are spatially quasi co-located.

In an example, the CSI reference resource for a serving cell is defined by the group of downlink physical resource blocks corresponding to the band to which the derived CQI value relates, in the frequency domain. In an example, in the time domain, for a UE configured with a single CSI resource set for the serving cell, the CSI reference resource is defined by a single downlink slot n-nCQI_ref, where for periodic and semi-persistent CSI reporting nCQI_ref is the smallest value greater than or equal to a first value, such that it corresponds to a valid downlink slot. In an example, where for aperiodic CSI reporting, if the UE is indicated by the DCI to report CSI in the same slot as the CSI request, nCQI_ref is such that the reference resource is in the same valid downlink slot as the corresponding CSI request, otherwise nCQI_ref is the smallest value greater than or equal to a second value, such that slot n-nCQI_ref corresponds to a valid downlink slot.

In an example, a slot in a serving cell may be considered to be a valid downlink slot if it is configured as a downlink slot for that UE, and it does not fall within a configured measurement gap for that UE, and the active DL BWP in the slot is the same as the DL BWP for which the CSI reporting is performed.

In an example, if there is no valid downlink slot for the CSI reference resource in a serving cell, CSI reporting may be omitted for the serving cell in uplink slot n.

In an example, when deriving CSI feedback, the UE is not expected that a non-zero power CSI-RS resource for channel measurement overlaps with CSI-IM resource for interference measurement or non-zero power CSI-RS resource for interference measurement.

In an example, for the purpose of deriving the CQI index, and if also configured, PMI and RI, with regard to the CSI reference resource, the UE may assume at least one of: the first 2 OFDM symbols are occupied by control signaling; the number of PDSCH symbols is equal to 12; the bandwidth part subcarrier spacing configured for the PDSCH reception; the bandwidth as configured for the PDSCH reception; the reference resource uses the CP length and subcarrier spacing configured for PDSCH reception; no resource elements used by primary or secondary synchronization signals or PBCH; Redundancy Version 0; the ratio of PDSCH EPRE to CSI-RS EPRE; no REs allocated for CSI-RS and zero-power CSI-RS; the same number of front loaded DM-RS symbols as the maximum front-loaded symbols configured by the higher layer parameter DL-DMRS-max-len; the same number of additional DM-RS symbols as the additional symbols configured by the higher layer parameter DL-DMRS-add-pos; the PDSCH symbols are not containing DM-RS; the PDSCH transmission scheme where the UE may assume that the gNB transmission on the PDSCH would be performed with up to 8 transmission layers on antenna ports [1000-1011].

In an example, a UE may perform aperiodic CSI reporting using PUSCH in slot n+Y on serving cell c upon successful decoding in slot n of an uplink DCI format for serving cell c, where Y is indicated in the decoded uplink DCI. The higher layer parameter AperiodicReportSlotOffset contains the allowed values of Y for a given Reporting Setting.

An aperiodic CSI report carried on the PUSCH supports wideband, partial band, and sub-band frequency granularities. An aperiodic CSI report carried on the PUSCH supports Type I and Type II CSI.

A UE may perform semi-persistent CSI reporting on the PUSCH upon successful decoding an uplink DCI format. The uplink DCI format will contain one or more CSI Reporting Setting Indications where the associated CSI Measurement Links and CSI Resource Settings are higher layer configured. Semi-persistent CSI reporting on the PUSCH supports Type I and Type II CSI with wideband, partial band, and sub-band frequency granularities. The PUSCH resources and MCS may be allocated semi-persistently by an uplink DCI.

In an example, CSI reporting on PUSCH may be multiplexed with uplink data on PUSCH. CSI reporting on PUSCH may also be performed without any multiplexing with uplink data from the UE.

In an example, Type I CSI feedback is supported for CSI Reporting on PUSCH. Type I subband CSI is supported for CSI Reporting on the PUSCH. Type II CSI is supported for CSI Reporting on the PUSCH.

In an example, for Type I CSI feedback on PUSCH, a CSI report comprises up to two parts. Part 1 contains RI/CRI, CQI for the first codeword. Part 2 contains PMI and contains the CQI for the second codeword when RI>4.

In an example, for Type II CSI feedback on PUSCH, a CSI report comprises up to two parts. Part 1 is used to identify the number of information bits in Part 2. Part 1 may be transmitted in its entirety before Part 2 and may be used to identify the number of information bits in Part 2. Part 1 has a fixed payload size and contains RI, CQI, and an indication of the number of non-zero wideband amplitude coefficients per layer for the Type II. The fields of Part 1—RI, CQI, and the indication of the number of non-zero wideband amplitude coefficients for each layer—are separately encoded. Part 2 contains the PMI of the Type II CSI. Part 1 and 2 are separately encoded. A Type II CSI report that is carried on the PUSCH may be computed independently from any Type II CSI report that is carried on the Long PUCCH.

In an example, when the higher layer parameter ReportQuantity is configured with one of the values 'CRI/RSRP' or 'SSBRI/RSRP', the CSI feedback consists of a single part.

In an example, when CSI reporting on PUSCH comprises two parts, the UE may omit a portion of the Part 2 CSI. Omission of Part 2 CSI is according to the priority order, where $N_{Rep}$ is the number of CSI reports in one slot. Priority 0 is the highest priority and priority $2N_{Rep}$ is the lowest priority and the CSI report numbers correspond to the order of the associated ReportConfigID. When omitting Part 2 CSI information for a particular priority level, the UE may omit all of the information at that priority level.

In an example, when CSI is multiplexed with UL-SCH on PUSCH, Part 2 CSI is omitted only when the UCI code rate for transmitting all of Part 2 would be greater than a threshold code rate $c_T$, where $$c_T = \frac{c_{MCS}}{\beta_{offset}^{CSI-2}},$$

$c_{MCS}$ is the target PUSCH code rate. $\beta_{offset}^{CSI-2}$ is the CSI offset value. Part 2 CSI is omitted level by level beginning with the lowest priority level until the lowest priority level is reached which causes the UCI code rate to be less than or equal to $c_T$.

In an example, a UE is semi-statically configured by higher layers to perform periodic CSI Reporting on the PUCCH. A UE may be configured by higher layers for multiple periodic CSI Reports corresponding to one or more higher layer configured CSI Reporting Setting Indications, where the associated CSI Measurement Links and CSI Resource Settings are higher layer configured. Periodic CSI reporting on the short and the long PUCCH supports wideband and partial band frequency granularities. Periodic CSI reporting on the PUCCH supports Type I CSI.

In an example, a UE may perform semi-persistent CSI reporting on the PUCCH upon successfully decoding a selection command. The selection command will contain one or more CSI Reporting Setting Indications where the associated CSI Measurement Links and CSI Resource Settings are configured. Semi-persistent CSI reporting on the PUCCH supports Type I CSI. Semi-persistent CSI reporting on the Short PUCCH supports Type I CSI with wideband and partial band frequency granularities. Semi-persistent CSI reporting on the Long PUCCH supports Type I Subband CSI and Type I CSI with wideband and partial band frequency granularities.

In an example, periodic CSI reporting on the short and long PUCCH supports wideband and partial band frequency granularities. Periodic CSI reporting on the PUCCH supports Type I CSI. When the short and long PUCCH carry Type I CSI with wideband and partial band frequency granularity, the CSI payload carried by the short PUCCH and long PUCCH are identical and the same irrespective of RI/CRI. For type I CSI sub-band reporting on long PUCCH, the payload is split into two parts. The first part contains RI/CRI, CQI for the first codeword. The second part contains PMI and contains the CQI for the second codeword when RI>4.

In an example, a periodic and/or semi-persistent report carried on the Long PUCCH supports Type II CSI feedback, but only Part 1 of Type II CSI feedback. Supporting Type II CSI reporting on the Long PUCCH is a UE capability. A Type II CSI report (Part 1 only) carried on the Long PUCCH may be calculated independently of any Type II CSI reports carried on the PUSCH.

In an example, two CSI reports are said to collide if the time occupancy of the physical channels scheduled to carry the CSI reports overlap in at least one OFDM symbol and are transmitted on the same carrier. When a UE is configured to transmit two colliding CSI reports, the following rules apply (for CSI reports transmitted on PUSCH, for CSI reports transmitted on PUCCH): if an aperiodic CSI report containing Type I CSI collides with either a periodic CSI report containing Type I CSI or a semi-persistent CSI report containing Type I CSI, then the aperiodic Type I CSI report has priority and the periodic or semi-persistent Type I CSI report may not be sent by the UE; or if a semi-persistent CSI report containing Type II CSI collides with an aperiodic CSI report also containing Type II CSI, then the aperiodic Type II CSI report has priority and the semi-persistent Type II CSI report may not be sent by the UE; or if a semi-persistent CSI report collides with a periodic CSI report for Type I colliding with Type I and Type II colliding with Type II; or if a Type I CSI report to be carried on the PUSCH collides with a Type I CSI report to be carried on the PUCCH, then the Type I CSI report to be carried on the PUSCH has priority, and the Type I CSI report to be carried on the PUCCH may not be sent by the UE; or if a Type II CSI report to be carried on the PUSCH collides with a Type II CSI report to be carried on the PUCCH, then the Type II CSI report to be carried on the PUSCH has priority, and the Type II CSI report to be carried on the PUCCH may not be sent by the UE; or if an aperiodic Type I CSI report intended for the PUSCH collides with a semi-persistent Type I CSI report also intended for the PUSCH, then the aperiodic Type I CSI report has priority and the semi-persistent Type I CSI report may not be sent by the UE; or if an aperiodic Type II CSI report intended for the PUSCH collides with a semi-persistent Type II CSI report also intended for the PUSCH, then the aperiodic Type II CSI report has priority and the semi-persistent Type II CSI report may not be sent by the UE; or if an aperiodic Type I CSI report intended for the PUCCH collides with a Type I CSI report intended for the PUSCH, then the aperiodic Type I CSI report intended for the PUCCH has lower priority and may not be sent by the UE; and/or if an aperiodic Type II CSI report intended for the PUCCH collides with a Type II CSI report intended for the PUSCH, then the aperiodic Type II CSI report intended for the PUCCH has lower priority and may not be sent by the UE.

In an example, a gNB may transmit a DCI via a PDCCH for scheduling decision and power-control commends. More specifically, the DCI may comprise at least one of: downlink scheduling assignments; uplink scheduling grants; power-control commands. The downlink scheduling assignments may comprise at least one of: PDSCH resource indication; transport format; HARQ information; control information related to multiple antenna schemes; a command for power control of the PUCCH used for transmission of ACK/NACK, in response to downlink scheduling assignments. The uplink scheduling grants may comprise at least one of: PUSCH resource indication; transport format; and HARQ related information; and/or a power control command of the PUSCH.

The different types of control information may correspond to different DCI message sizes. For example, supporting spatial multiplexing with noncontiguous allocation of RBs in the frequency domain may require a larger scheduling message in comparison with an uplink grant allowing for frequency-contiguous allocation only. DCI may be categorized into different DCI formats, where a format corresponds to a certain message size and usage.

In an example, a UE may monitor one or more PDCCH to detect one or more DCI with one or more DCI format. The one or more PDCCH may be transmitted in common search space or UE-specific search space. A UE may monitor PDCCH with only a limited set of DCI format, to save power consumption. For example, a normal UE may not be required to detect a DCI with DCI format 6 which is used for an eMTC UE. The more DCI format to be detected, the more power be consumed at the UE.

In an example, the information in the DCI formats used for downlink scheduling can be organized into different groups, with the field present varying between the DCI formats, including at least one of: resource information consisting of: carrier indicator (0 or 3 bits); RB allocation; HARQ process number; one or more MCS; one or more NDI; one or more RV; MIMO related information comprising at least one of: PMI; precoding information; transport block swap flag; power offset between PDSCH and reference signal; reference-signal scrambling sequence; number of layers; and/or antenna ports for the transmission; PDSCH resource-element mapping and QCI; Downlink assignment index (DAI); TPC for PUCCH; SRS request (1 bit); triggering one-shot SRS transmission; ACK/NACK offset; DCI format 0/1A indication used to differentiate between DCI format 1A and 0; and padding if necessary.

In an example, the information in the DCI formats used for uplink scheduling can be organized into different groups, with the field present varying between the DCI formats, comprising at least one of: resource information comprising at least one of: carrier indicator, resource allocation type, RB allocation; MCS; NDI; Phase rotation of the uplink DMRS; precoding information; CSI request; requesting an aperiodic CSI report; SRS request (2 bit); Uplink index/DAI; TPC for PUSCH; DCI format 0/1A indication; and padding if necessary.

In a NR system, in order to support wide bandwidth operation, a gNB may transmit one or more PDCCH in different control resource sets. A gNB may transmit one or more RRC message comprising configuration parameters of one or more control resource sets. At least one of the one or more control resource sets may comprise at least one of: a first OFDM symbol (e.g., CORESET_StartSymbol); a number of consecutive OFDM symbols (e.g., CORESET_Num-Symbol); a set of resource blocks (e.g., CORESET_RBSet); a CCE-to-REG mapping (e.g., CORESET_mapping); and a REG bundle size, in case of interleaved CCE-to-REG mapping (e.g., CORESET_REG_bundle).

With configured control resource sets, a UE may monitor PDCCH for detecting DCI on a subset of control resource sets, to reduce the power consumption.

In an example, a UE may be semi-statically configured by higher layers to perform periodic CSI Reporting on the PUCCH. In an example, a UE may be configured by higher layers for multiple periodic CSI Reports corresponding to one or more higher layer configured CSI Reporting Setting Indications, where the associated CSI Measurement Links and CSI Resource Settings may be higher layer configured. In an example, periodic CSI reporting on the short and the long PUCCH may support wideband and partial band frequency granularities. In an example, periodic CSI reporting on the PUCCH may support Type I CSI.

In an example, a UE may perform semi-persistent CSI reporting on the PUCCH upon successfully decoding a selection command. The selection command may contain one or more CSI Reporting Setting Indications where the associated CSI Measurement Links and CSI Resource Settings are configured. In an example, semi-persistent CSI reporting on the PUCCH may support Type I CSI. In an example, semi-persistent CSI reporting on the Short PUCCH may support Type I CSI with wideband and partial band frequency granularities. In an example, semi-persistent CSI reporting on the Long PUCCH may support Type I subband CSI and Type I CSI with wideband and partial band frequency granularities.

In an example, periodic CSI reporting on the short and long PUCCH may support wideband and partial band frequency granularities. In an example, periodic CSI reporting on the PUCCH may support Type I CSI. When the short and long PUCCH carry Type I CSI with wideband and partial band frequency granularity, the CSI payload carried by the short PUCCH and long PUCCH may be identical and the same irrespective of RI/CRI. For type I CSI sub-band reporting on long PUCCH, the payload may be split into two parts. The first part may contain RI/CRI, CQI for the first codeword. The second part may contain PMI and contain the CQI for the second codeword when RI>4.

In an example, a periodic and/or SP CSI report carried on the Long PUCCH may support Type II CSI feedback, but only Part 1 of Type II CSI feedback. Supporting Type II CSI reporting on the Long PUCCH may be a UE capability. A Type II CSI report (Part 1 only) carried on the Long PUCCH may be calculated independently of any Type II CSI reports carried on the PUSCH.

In an example, DRX operation may be used by a wireless device (UE) to improve UE battery lifetime. In an example, in DRX, UE may discontinuously monitor downlink control channel, e.g., PDCCH/EPDCCH. In an example, the base station may configure DRX with a set of DRX parameters, e.g., using RRC configuration. The DRX parameters may be selected based on the application type such that power and resource savings are maximized. In an example, in response to DRX being configured/activated, there may be an extended delay in receiving data as, the UE may be in DRX Sleep/Off state at the time of data arrival at the UE and the base station may wait until the UE transitions to the DRX ON state. The base station may select the DRX parameters such that the packet delay is minimized, and power saving is maximized.

In an example, during a DRX mode, the UE may power down most of its circuitry when there are no packets to be received. During this time the UE listens to the downlink (DL) occasionally which is called DRX Active state whereas the time during which UE doesn't listen PDCCH is called DRX Sleep state.

In an example, DRX may be beneficial to the base station. In an example, if DRX is not configured, the wireless device may be transmitting periodic CSI and/or SRS frequently (e.g., based on the configuration). With DRX, during DRX OFF periods, the UE may not transmit periodic CSI and/or SRS. The base station may assign these resources to the other UEs to maximize resource utilization.

In LTE/LTE_A system, the time granularity for DRX timers may be in terms of PDCCH subframes (e.g., indicated as psf in the DRX configurations) in legacy DRX procedures. Example embodiments may enhance the DRX configuration for determining time granularity of DRX timers for example, based on a numerology and/or TTI.

In an example, the MAC entity may be configured by RRC with a DRX functionality that controls the UE's downlink control channel (e.g., PDCCH) monitoring activity for a plurality of RNTIs for the MAC entity, e.g., C-RNTI and/or TPC-PUCCH-RNTI and/or TPC-PUSCH-RNTI and/or Semi-Persistent Scheduling C-RNTI (if configured) and/or eIMTA-RNTI (if configured) and/or SL-RNTI (if configured) and/or SL-V-RNTI (if configured) and/or CC-RNTI (if configured) and/or SP-CSI C-RNTI (if configured) and SRS-TPC-RNTI (if configured). In an example, in response to being in RRC_CONNECTED, if DRX is configured, the MAC entity may monitor the PDCCH discontinuously using the DRX operation; otherwise the MAC entity may monitor the PDCCH continuously. RRC may control DRX operation by configuring a plurality of timers, e.g., drx-onDurationTimer and/or drx-InactivityTimer and/or drx-RetransmissionTimer (e.g., one per DL HARQ process except for the broadcast process) and/or drx-ULRetransmissionTimer (one per asynchronous UL HARQ process) and/or the longDRX-Cycle and/or the value of the drxStartOffset and/or optionally the drxShortCycleTimer and/or shortDRX-Cycle. In an example, a HARQ RTT timer per DL HARQ process (except for the broadcast process) and/or UL HARQ RTT Timer per asynchronous UL HARQ process may be defined.

In an example, in response to a DRX cycle being configured, the Active Time may include includes the time while drx-onDurationTimer or drx-InactivityTimer or drx-Retransmission Timer or drx-ULRetransmissionTimer or mac-ContentionResolutionTimer is running.

In an example, drx-Inactivity-Timer may specify a time duration for which the UE may be Active after successfully decoding a PDCCH indicating a new transmission (UL or DL or SL). In an example, this timer may be restarted upon receiving PDCCH for a new transmission (UL or DL or SL). In an example, the UE may transition to a DRX mode in response to the expiry of this timer.

In an example, shortDRX-Cycle may be a first type of DRX cycle (e.g., if configured) that needs to be followed when UE enters DRX mode. In an example, a DRX-Config IE indicates the length of the short cycle.

In an example, drxShortCycleTimer may be expressed as multiples of shortDRX-Cycle. The timer may indicate the number of initial DRX cycles to follow the short DRX cycle before entering the long DRX cycle.

In an example, longDRX-CycleStartOffset may define long DRX cycle length and/or the DRX offset. DRX offset may be used to calculate the start of DRX cycle.

In an example, drx-onDurationTimer may specify the time duration at the beginning of a DRX Cycle (e.g., DRX ON). In an example, drx-onDurationTimer may indicate the time duration before entering the power saving mode (DRX OFF).

In an example, HARQ RTT Timer may specify a minimum duration from the time new transmission is received and before the UE may expect a retransmission of a same packet. In an example, this timer may be fixed and may not be configured by RRC.

In an example, drx-RetransmissionTimer may indicate a maximum duration for which UE may be monitoring PDCCH when a retransmission from the eNodeB is expected by the UE.

In an example, in response to a DRX cycle being configured, the Active Time may include includes the time while a Scheduling Request is sent on PUCCH and is pending.

In an example, in response to a DRX cycle being configured, the Active Time may include includes the time while an uplink grant for a pending HARQ retransmission can occur and there is data in the corresponding HARQ buffer for synchronous HARQ process.

In an example, in response to a DRX cycle being configured, the Active Time may include the time while a PDCCH indicating a new transmission addressed to the C-RNTI of the MAC entity has not been received after successful reception of a Random Access Response for the preamble not selected by the MAC entity.

In an example, DRX may be configured for a wireless device. The HARQ RTT Timer may expire in a subframe and the data of the corresponding HARQ process may not be successfully decoded. The MAC entity may start the drx-RetransmissionTimer for the corresponding HARQ process.

In an example, DRX may be configured for a wireless device. An UL HARQ RTT Timer may expire in a subframe. The MAC entity may start the drx-ULRetransmissionTimer for the corresponding HARQ process.

In an example, DRX may be configured for a wireless device. A DRX Command MAC control element or a Long DRX Command MAC control element may be received. The MAC entity may stop drx-onDurationTimer and stop drx-InactivityTimer.

In an example, DRX may be configured for a wireless device. In an example, drx-InactivityTimer may expire or a DRX Command MAC control element may be received in a subframe. In an example, in response to Short DRX cycle being configured, the MAC entity may start or restart drxShortCycleTimer and may use Short DRX Cycle. Otherwise, the MAC entity may use the Long DRX cycle.

In an example, DRX may be configured for a wireless device. In an example, drxShortCycleTimer may expire in a subframe. The MAC entity may use the Long DRX cycle.

In an example, DRX may be configured for a wireless device. In an example, a Long DRX Command MAC control element may be received. The MAC entity may stop drxShortCycleTimer and may use the Long DRX cycle.

In an example, DRX may be configured for a wireless device. In an example, if the Short DRX Cycle is used and [(SFN*10)+subframe number] modulo (shortDRX-Cycle)= (drxStartOffset) modulo (shortDRX-Cycle).

In an example, DRX may be configured for a wireless device. In an example, if the Long DRX Cycle is used and [(SFN*10)+subframe number] modulo (longDRX-Cycle)=drxStartOffset. The wireless device may start drx-onDurationTimer.

In an example, DRX may be configured for a wireless device. In an example, during the Active Time, for a PDCCH-subframe, the subframe may not be required for uplink transmission for half-duplex FDD UE operation. In an example, the subframe may not be a half-duplex guard subframe. In an example, the subframe may not be part of a configured measurement gap. In an example, the subframe may not be part of a configured Sidelink Discovery Gap for Reception. In an example, DRX may be configured for a wireless device. In an example, during the Active Time, for a subframe other than a PDCCH-subframe and for a UE capable of simultaneous reception and transmission in the aggregated cells, the subframe may be a downlink subframe indicated by a valid eIMTA L1 signaling for at least one serving cell not configured with schedulingCellId. In an example, the subframe may not be part of a configured measurement gap. In an example, the subframe may not be part of a configured Sidelink Discovery Gap for Reception. In an example, DRX may be configured for a wireless device. In an example, during the Active Time, for a subframe other than a PDCCH-subframe and for a UE not capable of simultaneous reception and transmission in the aggregated cells, the subframe may be a downlink subframe indicated by a valid eIMTA L1 signaling for the SpCell. In an example, the subframe may not be part of a configured measurement gap. In an example, the subframe may not be part of a configured Sidelink Discovery Gap for Reception. The wireless device may monitor the PDCCH. In an example, if the PDCCH indicates a DL transmission or if a DL assignment has been configured for this subframe, the wireless device may start the HARQ RTT Timer for the corresponding HARQ process. The wireless device may stop the drx-RetransmissionTimer for the corresponding HARQ process. In an example, if the PDCCH indicates an UL transmission for an asynchronous HARQ process or if an UL grant has been configured for an asynchronous HARQ process for this subframe, the wireless device may start the UL HARQ RTT Timer for the corresponding HARQ process in the subframe containing the last repetition of the corresponding PUSCH transmission. The wireless device may stop the drx-ULRetransmissionTimer for the corresponding HARQ process. In an example, if the PDCCH indicates a new transmission (DL, UL or SL), the wireless device may start or restart drx-InactivityTimer.

Figure 31:
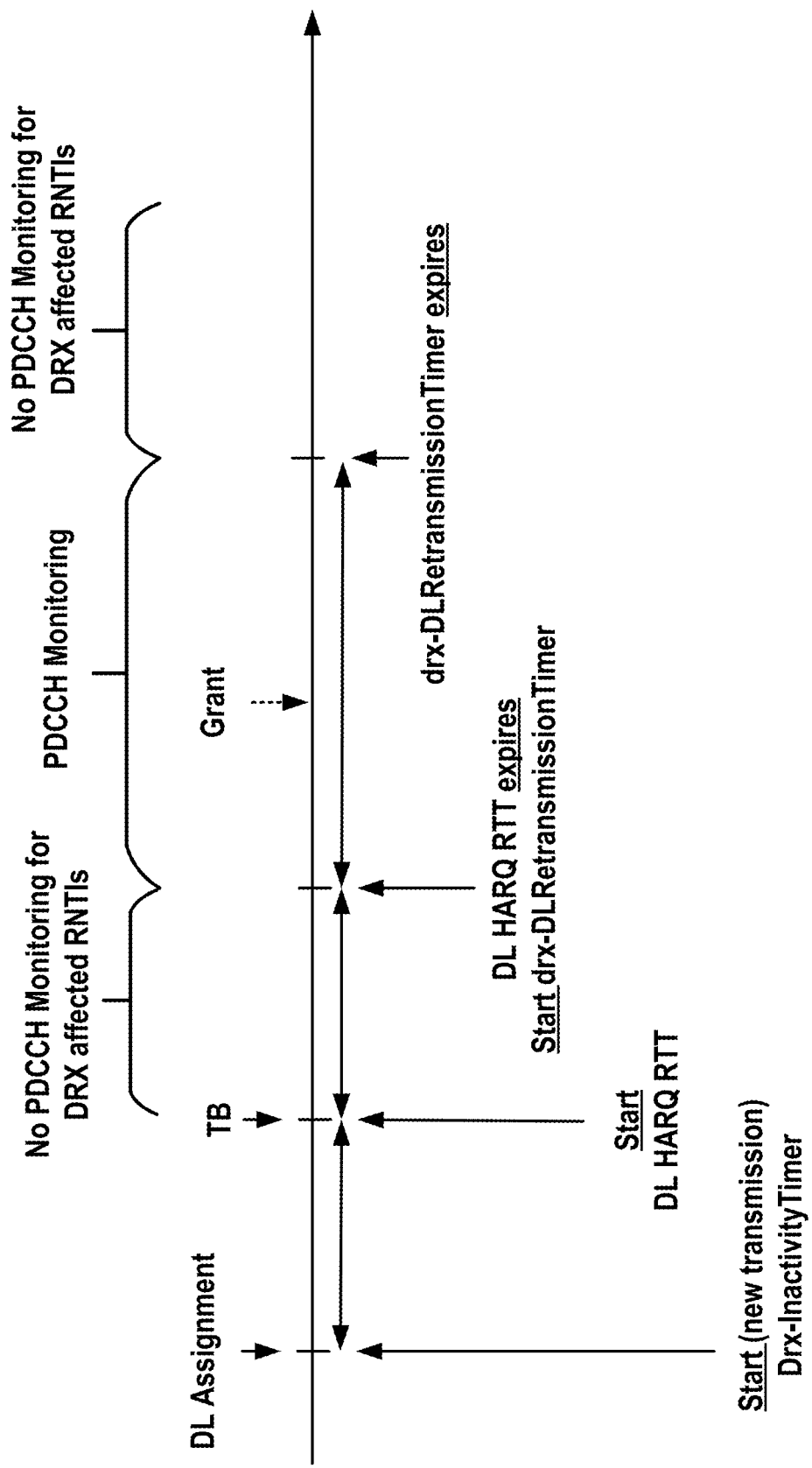
FIG. 31 is an example of DRX operation as per an aspect of an embodiment of the present disclosure.

FIG. 31 shows example of DRX operation in a LTE/LTE_A system. A base station may transmit a RRC message comprising parameter configuration of DRX operation. A base station may transmit a DCI for downlink resource allocation via a PDCCH, to a UE. the UE may start the drx-InactivityTimer during which, the UE may monitor the PDCCH. After receiving a transmission block (TB) when the drx-InactivityTimer is running, the UE may start the HARQ RTT Timer, during which, the UE may stop monitoring the PDCCH. The UE may transmit a NACK to the base station upon unsuccessful receiving the TB. When the HARQ RTT Timer expires, the UE may monitor the PDCCH and start the drx-Retransmission Timer. When the drx-Retransmission Timer is running, the UE may receive a second DCI indicating a DL grant for the retransmission of the TB. If not receiving the second DCI before drx-Retransmission Timer expires, the UE may stop monitoring the PDCCH.

In an example, a UE may receive one or more messages comprising at least one of: configuration parameters for one or more cells comprising a first cell; channel state information (CSI) configuration parameters; or discontinuous reception (DRX) configuration parameters comprising a first information element (IE), the IE value indicating a first value for a first timer. For example, the UE may receive a first downlink control information (DCI) indicating/comprising a request for transmission of CSI on the first cell. In an example, the DCI may not comprise/indicate an uplink grant. In an example, the DCI may not indicate and/or may not be associated with transmission of a packet/transport block. In response to receiving the first DCI, the UE may start the first timer with the first value. The UE may determine that the UE may be in Active Time while/in response to the first timer running. The UE may receive a second DCI indicating an uplink grant for transmission of one or more transport blocks (TBs). The UE may transmit the one or more TBs based on the uplink grant. In an example, the first DCI may indicate/comprise the request for transmission of the CSI on an uplink channel. In an example, the CSI configuration parameters may comprise a plurality of CSI reporting configurations, a CSI reporting configuration in the plurality of CSI reporting configurations being associated with an index. For example, the first DCI may comprise a field indicating the index. In an example, the first timer may be an inactivity timer. In an example, the first DCI may indicate/comprise a request for transmission of aperiodic CSI on the first cell. In an example, the first DCI may indicate/comprise a request for transmission of SP-CSI on the first cell. In an example, the uplink grant may comprise transmission parameters comprising resource allocation parameters, power control parameters, MCS, HARQ parameters, transport block size for the one or more TBs.

In an example, in response to receiving the first DCI, if the UE does not start the first timer (e.g. Inactivity Timer), the UE may not transmit a CSI report on an uplink channel (e.g. PUSCH, short PUCCH, long PUCCH, etc.). When a gNB may not receive the CSI report from the UE, the gNB may not have an accurate CSI information associated with the UE. In an example, when the gNB may not receive the CSI report, the gNB may not schedule the UE for UL and/or DL transmission.

Figure 32:
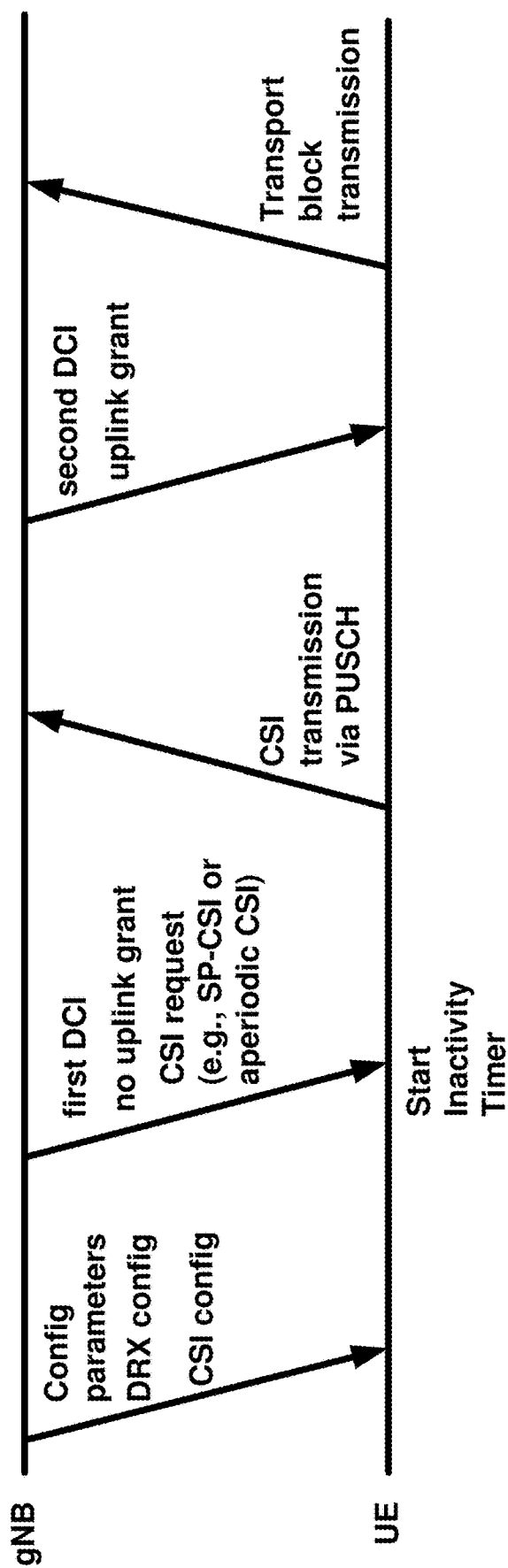
FIG. 32 is an example DRX operation with CSI request as per an aspect of an embodiment of the present disclosure.

FIG. 32 is an example embodiment of CSI transmission via PUSCH. A UE may receive the one or more messages. For example, the UE may receive a first downlink control information (DCI) indicating/comprising a request for transmission of CSI on the first cell. In an example, the DCI may not comprise/indicate an uplink grant. In an example, the DCI may not indicate and/or may not be associated with transmission of a packet/transport block (TB). In an example, the first DCI may indicate/comprise the request for transmission of the CSI on a physical uplink shared channel (PUSCH). In an example, the PUSCH may accommodate more resources. In response to receiving a report on the PUSCH, the gNB may obtain an accurate CSI information. For example, the first DCI may indicate/comprise a request for transmission of aperiodic CSI on the first cell. In an example, the first DCI may indicate/comprise a request for transmission of SP-CSI on the first cell. In response to receiving the first DCI, the UE may start the first timer with the first value. The UE may determine that the UE may be in Active Time while/in response to the first timer running. In an example, the UE may transmit SP-CSI and/or aperiodic CSI on the first cell via PUSCH, e.g., in FIG. 32. In an example, the UE may receive a second DCI indicating an uplink grant for transmission of one or more TBs. The UE may transmit the one or more TBs based on the uplink grant.

Figure 33:
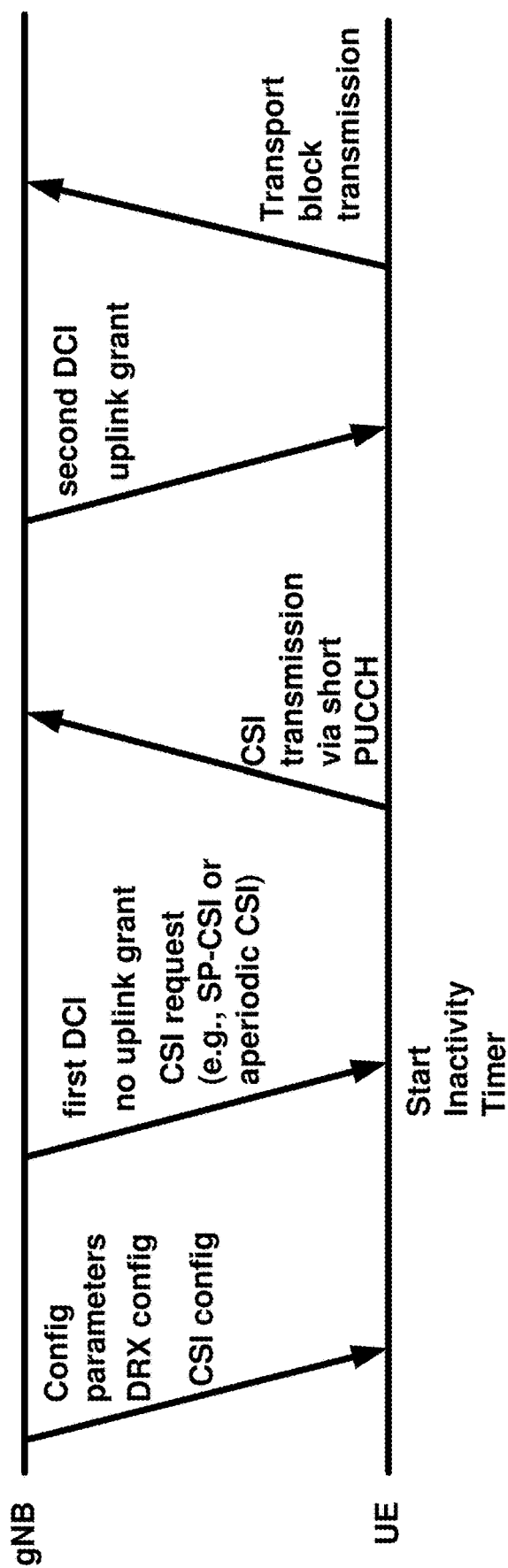
FIG. 33 is an example DRX operation with CSI request as per an aspect of an embodiment of the present disclosure.

FIG. 33 is an example embodiment of CSI transmission via short PUCCH. A UE may receive the one or more messages. For example, the UE may receive a first downlink control information (DCI) indicating/comprising a request for transmission of CSI on the first cell. In an example, the DCI may not comprise/indicate an uplink grant. In an example, the DCI may not indicate and/or may not be associated with transmission of a packet/transport block (TB). In an example, the first DCI may indicate/comprise the request for transmission of the CSI on a physical uplink shared channel (PUCCH). In response to receiving a CSI report on the PUCCH resources, the gNB may obtain the CSI information quickly. For example, the PUCCH may be short PUCCH. The gNB may schedule short PUCCH transmission depending on system configuration, and/or subframe structure, and/or scenarios or and/UE capability (e.g. payload, multiplexing capability, etc.). For example, the first DCI may indicate/comprise a request for transmission of aperiodic CSI on the first cell. In an example, the first DCI may indicate/comprise a request for transmission of SP-CSI on the first cell. In response to receiving the first DCI, the UE may start the first timer with the first value. The UE may determine that the UE may be in Active Time while/in response to the first timer running. In an example, the UE may transmit SP-CSI and/or aperiodic CSI on the first cell via short PUCCH, e.g., in FIG. 33. In an example, the UE may receive a second DCI indicating an uplink grant for transmission of one or more TBs. The UE may transmit the one or more TBs based on the uplink grant.

Figure 34:
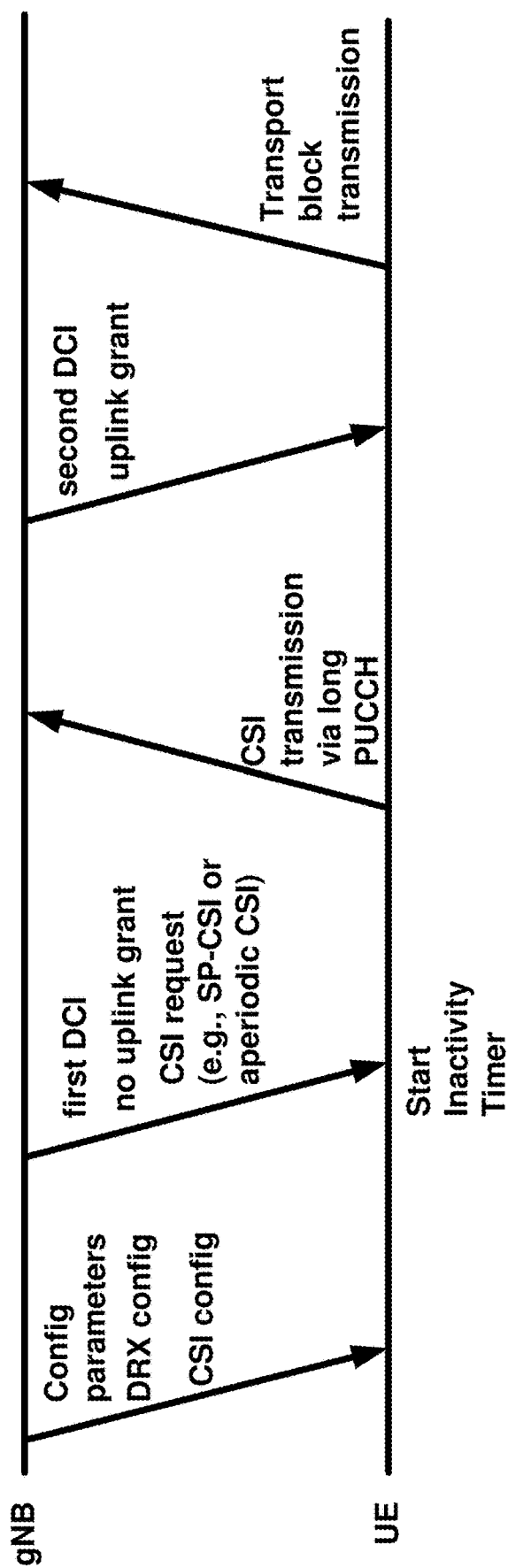
FIG. 34 is an example DRX operation with CSI request as per an aspect of an embodiment of the present disclosure.

FIG. 34 is an example embodiment of CSI transmission via long PUCCH. A UE may receive the one or more messages. For example, the UE may receive a first downlink control information (DCI) indicating/comprising a request for transmission of CSI on the first cell. In an example, the DCI may not comprise/indicate an uplink grant. In an example, the DCI may not indicate and/or may not be associated with transmission of a packet/transport block (TB). In an example, the first DCI may indicate/comprise the request for transmission of the CSI on a physical uplink shared channel (PUCCH). For example, the PUCCH may be long PUCCH. In response to receiving a CSI report on the PUCCH resources, the gNB may obtain the CSI information quickly. The gNB may schedule long PUCCH transmission depending on the system configuration and/or scenarios or and/UE capability (e.g. payload, multiplexing capability, etc.). For example, the first DCI may indicate/comprise a request for transmission of aperiodic CSI on the first cell. In an example, the first DCI may indicate/comprise a request for transmission of SP-CSI on the first cell. In response to receiving the first DCI, the UE may start the first timer with the first value. The UE may determine that the UE may be in Active Time while/in response to the first timer running. In an example, the UE may transmit SP-CSI and/or aperiodic CSI on the first cell via long PUCCH, e.g., in FIG. 34. In an example, the UE may receive a second DCI indicating an uplink grant for transmission of one or more TBs. The UE may transmit the one or more TBs based on the uplink grant.

Figure 35:
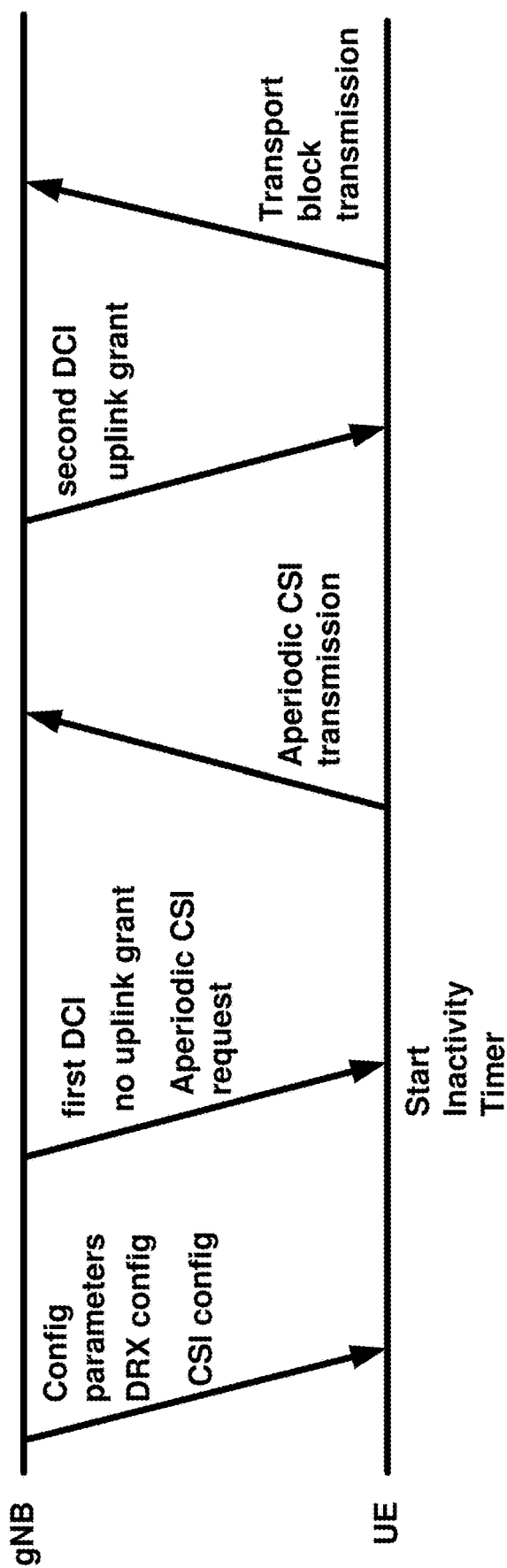
FIG. 35 is an example DRX operation with CSI request as per an aspect of an embodiment of the present disclosure.

FIG. 35 is an example embodiment of aperiodic CSI transmission. A UE may receive the one or more messages. For example, the UE may receive a first downlink control information (DCI) indicating/comprising a request for transmission of aperiodic CSI on the first cell. In an example, the aperiodic CSI report may be used to provide detailed CSI reporting in one or more reporting instances. In an example, the DCI may not comprise/indicate an uplink grant. In an example, the DCI may not indicate and/or may not be associated with transmission of a packet/transport block (TB). In an example, the first DCI may indicate/comprise the request for transmission of the aperiodic CSI on a physical uplink shared channel (PUSCH). In an example, the first DCI may indicate/comprise the request for transmission of the aperiodic CSI on a physical uplink control channel (PUCCH). In an example, the PUCCH may be short PUCCH. In an example, the PUCCH may be long PUCCH. In response to receiving the first DCI, the UE may start the first timer with the first value. The UE may determine that the UE may be in Active Time while/in response to the first timer running. In an example, the UE may transmit the aperiodic CSI on the first cell via PUSCH or PUCCH (short PUCCH or long PUCCH). In an example, the UE may receive a second DCI indicating an uplink grant for transmission of one or more TBs. The UE may transmit the one or more TBs based on the uplink grant.

Figure 36:
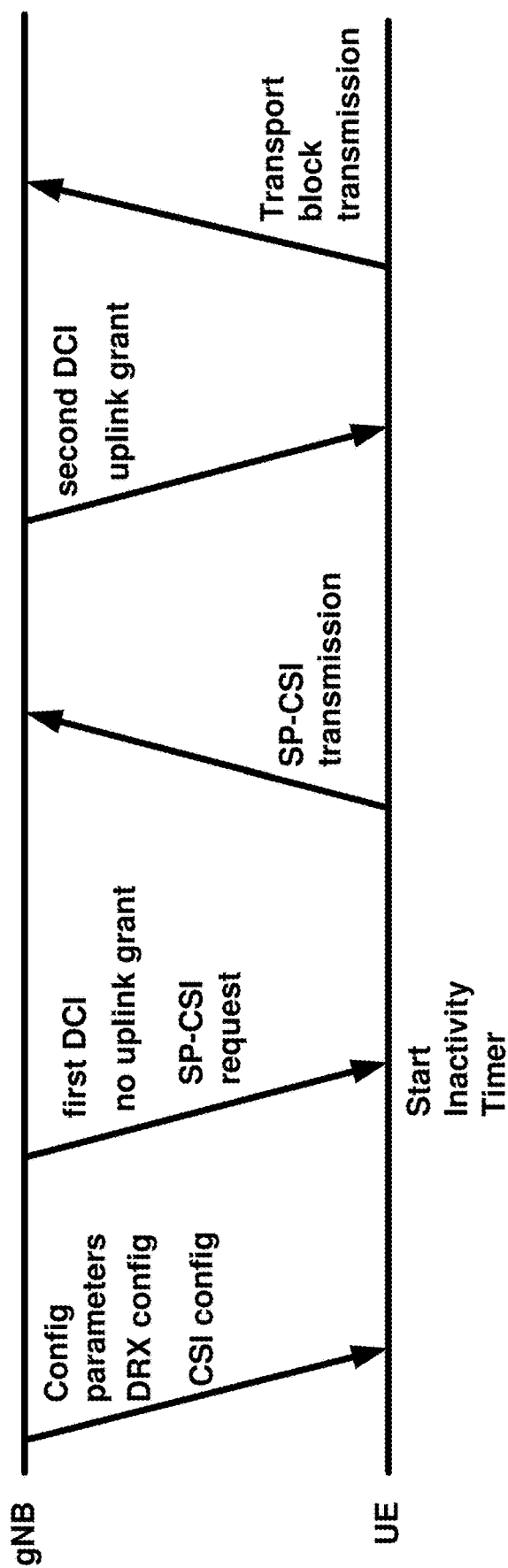
FIG. 36 is an example DRX operation with CSI request as per an aspect of an embodiment of the present disclosure.

FIG. 36 is an example embodiment of SP-CSI transmission. A UE may receive the one or more messages. For example, the UE may receive a first downlink control information (DCI) indicating/comprising a request for transmission of SP-CSI on the first cell. In an example, a gNB may require a periodic CSI feedback from the UE. The gNB may transmit the first DCI indicating the request for transmission of SP-CSI for the periodic CSI feedback from the UE. In an example, the DCI may not comprise/indicate an uplink grant. In an example, the DCI may not indicate and/or may not be associated with transmission of a packet/transport block (TB). In an example, the first DCI may indicate/comprise the request for transmission of the SP-CSI on a physical uplink shared channel (PUSCH). In an example, the first DCI may indicate/comprise the request for transmission of the SP-CSI on a physical uplink control channel (PUCCH). In an example, the PUCCH may be short PUCCH. In an example, the PUCCH may be long PUCCH. In response to receiving the first DCI, the UE may start the first timer with the first value. The UE may determine that the UE may be in Active Time while/in response to the first timer running. In an example, the UE may transmit the SP-CSI on the first cell via PUSCH or PUCCH (short PUCCH or long PUCCH). In an example, the UE may receive a second DCI indicating an uplink grant for transmission of one or more TBs. The UE may transmit the one or more TBs based on the uplink grant.

A wireless device may, based on legacy DRX processes, start a DRX inactivity timer in response to receiving a DCI indicating a new data transmission in UL or DL. The legacy processes may lead to a wireless device transitioning to a DRX not-Active time and hence not monitoring the control channels when the DCI requests CSI without requesting uplink data. This may lead to inefficient network performance, e.g., degraded throughput and increased delay. Example embodiments enhance the legacy DRX processes.

Figure 37:
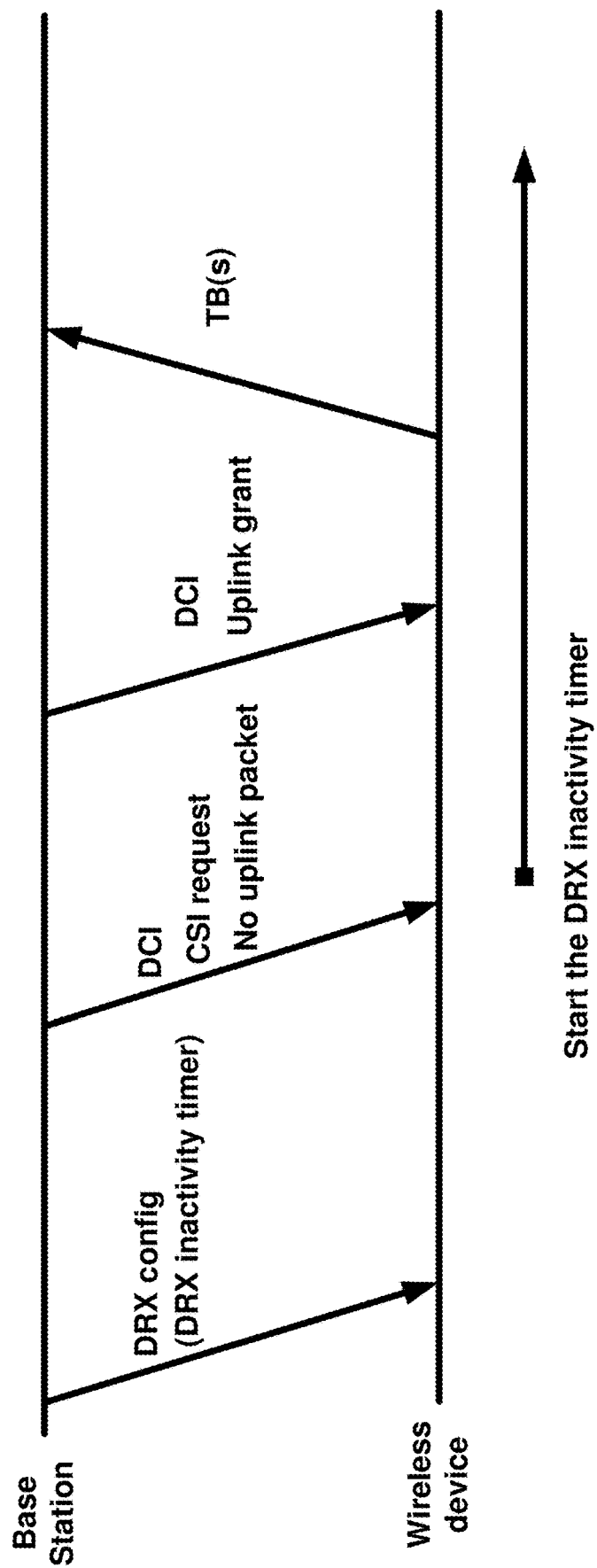
FIG. 37 is an example DRX operation with CSI request as per an aspect of an embodiment of the present disclosure.

In an example embodiment and as shown in FIG. 37, a wireless device may receive one or more messages comprising configuration parameters. The one or more messages may comprise one or more RRC messages. The one or more messages may comprise discontinuous reception configuration parameters. The discontinuous reception configuration parameters may be employed to determine whether a wireless device is in an Active Time or not in an Active time. In response to the wireless device being in an Active Time, the wireless device may monitor one or more control channels. In response to the wireless device not being in an Active Timer, the wireless device may not monitor the one or more control channels. The discontinuous reception configuration parameters may comprise configuration parameters of one or more timers. In an example, the discontinuous reception configuration parameters may comprise configuration parameters of a discontinuous reception inactivity timer. In an example, the configuration parameters of the discontinuous reception inactivity timer may comprise a value for the discontinuous reception inactivity timer. In an example, in response to the discontinuous reception inactivity timer running, the wireless device may be in an Active Time and may monitor the one or more control channels.

In an example, the wireless device may receive a first downlink control information indicating a channel state information request an no uplink packet transmission. In an example a CSI request field may indicate a request for the channel state information. In an example, the request for the channel state information may be a request for aperiodic channel state information (e.g., via physical uplink shared channel PUSCH)). In an example, the request for the channel state information may be a request for semi-persistent channel state information. In an example, the request for the channel state information may be a request for periodic channel state information. In an example, the first downlink control information may indicate radio resources for transmission of the channel state information. In an example, the CSI request field may indicate one of a plurality of CSI report settings. The plurality of report settings may be configured by RRC. In an example, the one or more messages may comprise a plurality of channel state information trigger states. The plurality of channel state information trigger states may indicate a plurality of channel state information reporting configurations. The CSI request field may indicate a CSI reporting configuration in the plurality of CSI reporting configurations. The CSI configuration parameters may indicate the CSI reference symbols for measuring CSI by the wireless device. The wireless device may measure, based on channel state information configuration parameters and to determine channel state information, channel state information reference signals in response to the receiving the first downlink control information.

In an example, a first field (e.g., an UL-SCH indicator field) of the first downlink control information may indicate that no uplink packet (e.g., UL-SCH) to be transmitted. In an example, a first value (e.g., '1') of the first field may indicate that uplink packet (e.g., UL-SCH) is to be transmitted via the resources indicated by the DCI. In an example, a second value (e.g., '0') of the first field may indicate that no uplink packet (e.g., UL-SCH) is to be transmitted via the resources indicated by the DCI. In an example, a wireless device may not be expected to receive a DCI (e.g., DCI format 0_1) indicating no uplink packet (e.g., a value of '0' for the first field (e.g., UL-SCH indicator)) and a CSI request field indicating no SCI request. The wireless device may transmit the channel state information via the resources indicated by the DCI without transmitting an uplink packet in response to the first DCI indicating CSI request and no uplink packet (e.g., UL-SCH).

In an example, the wireless device may start the discontinuous reception inactivity timer in response to the first downlink control information indicating the channel state information request and no uplink packet transmission. In an example, the wireless device may start the discontinuous reception inactivity timer with the first value (e.g., the first value configured by RRC). In an example, the wireless device may start the discontinuous reception inactivity timer in response to the CSI request field of the first downlink control information indicating a request for CSI transmission and the first field (e.g., the UL-SCH indicator field) of the first downlink control information indicating no uplink packet (e.g., UL-SCH) transmission. In an example, the wireless device may start the discontinuous reception inactivity timer in response to the CSI request field of the first downlink control information indicating a request for CSI transmission and irrespective of whether the first field (e.g., the UL-SCH indicator field) of the first downlink control information indicating uplink packet (e.g., UL-SCH) transmission or no uplink packet (e.g., UL-SCH) transmission.

In an example, in response to the discontinuous reception inactivity timer running, the wireless device may be in a discontinuous reception Active Time and the wireless device may monitor one or more control channels. The wireless device may receive (e.g., in response to the monitoring the one or more control channels) a second downlink control information. The wireless device may receive the second downlink control information while the discontinuous reception inactivity timer is running. The second downlink control information may comprise transmission parameters of one or more transport blocks. The transmission parameters may indicate radio resource for transmission of the one or more transport blocks, the HARQ parameters, power control parameters, etc. The wireless device may transmit the one or more transport block based on the transmission parameters.

Figure 38:
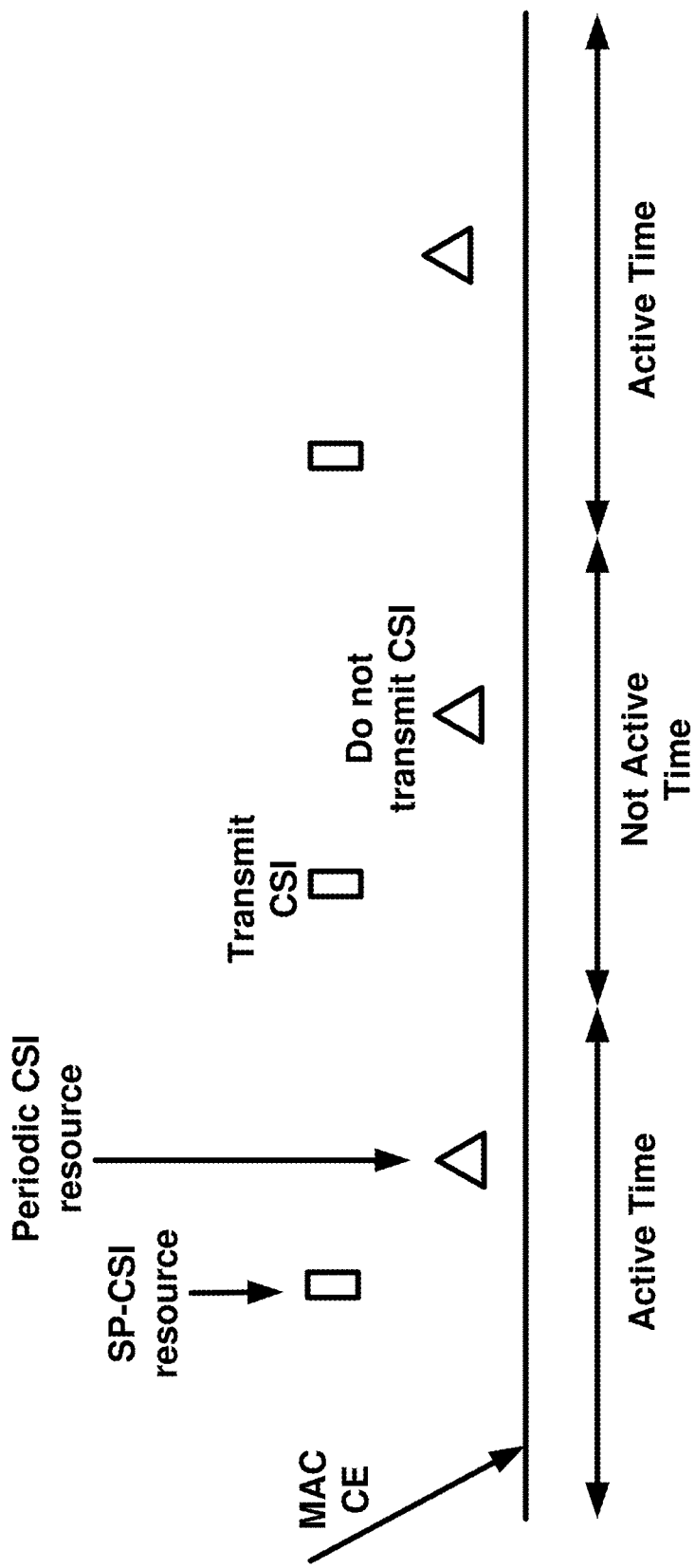
FIG. 38 is an example CSI transmission with DRX configuration as per an aspect of an embodiment of the present disclosure.

FIG. 38 shows example of DRX operation in a LTE/LTE_A system. A base station may transmit a RRC message comprising parameter configuration of DRX operation. A base station may transmit a DCI for downlink resource allocation via a PDCCH, to a UE. the UE may start the drx-InactivityTimer during which, the UE may monitor the PDCCH. After receiving a transmission block (TB) when the drx-InactivityTimer is running, the UE may start the HARQ RTT Timer, during which, the UE may stop monitoring the PDCCH. The UE may transmit a NACK to the base station upon unsuccessful receiving the TB. When the HARQ RTT Timer expires, the UE may monitor the PDCCH and start the drx-Retransmission Timer. When the drx-Retransmission Timer is running, the UE may receive a second DCI indicating a DL grant for the retransmission of the TB. If not receiving the second DCI before drx-Retransmission Timer expires, the UE may stop monitoring the PDCCH.

In an example, a gNB may transmit one or more RRC message comprising a parameter (e.g., cqi-mask) indicating limitation of CSI report in DRX operation. In an example, in response to receiving the one or more RRC message, a UE may not report CQI/PMI/RI/PTI/CRI, in subframe n, if onDurationTimer would not be running considering grants/assignments/DRX Command MAC control elements/Long DRX Command MAC control elements received and Scheduling Request sent until and including subframe n−5 when evaluating all DRX Active Time conditions accordingly.

In an example, a gNB may not transmit one or more RRC message comprising a parameter (e.g., cqi-mask) indicating limitation of CSI report in DRX operation. In an example, in response to not receiving the one or more RRC message, a UE may not report CQI/PMI/RI/PTI/CRI, in subframe n, if the MAC entity would not be in Active Time considering grants/assignments/DRX Command MAC control elements/Long DRX Command MAC control elements received and Scheduling Request sent until and including subframe n−5 when evaluating all DRX Active Time conditions as specified in this subclause, accordingly.

In an example, when a UE is in Active Time, the UE may monitor the PDCCH. The UE may start the drx-HARQ-RTT-TimerDL for the corresponding HARQ process immediately after the corresponding PDSCH transmission, if the PDCCH indicates a DL transmission, or a DL assignment has been configured. The UE may stop the drx-RetransmissionTimerDL for the corresponding HARQ process.

In an example, when a UE is in Active Time, the UE may monitor the PDCCH. The UE may start the drx-HARQ-RTT-TimerUL for the corresponding HARQ process immediately after the corresponding PUSCH transmission, if the PDCCH indicates a DL transmission, or a DL assignment has been configured. The UE may stop the drx-RetransmissionTimerUL for the corresponding HARQ process.

In an example, when a UE is in Active Time, the UE may monitor the PDCCH. The UE may start or restart drx-InactivityTimer, if the PDCCH indicates a new transmission (e.g., DL or UL).

In an example, when a UE is not at least part of the Active Time, the UE may not report CQI/PMI/RI on PUCCH.

In an example, a SP-CSI report is more urgent or useful than a periodic CSI report, since a SP-CSI report may carry more CSI information than a periodic CSI report. In an example, it's better to transmit the SP-CSI report when the UE is not in Active Time, or a first timer is running.

FIG. 38 shows an example of the embodiment where a SP CSI report is triggered by a MAC CE. In the example, a UE may receive one or more messages comprising: first configuration parameters for one or more SP CSI configuration; second configuration parameters for transmitting a plurality of a periodic CSI signals comprising a second periodic CSI signal in a second TTI; and/or DRX configuration parameters. The UE may receive a MAC CE indicating activation of a first plurality of SP CSI reporting comprising a first SP-CSI resource in a first TTI. The UE may determine at least based on the DRX parameters, whether the UE is in Active Time in the first TTI or not. The UE may transmit a SP-CSI signal in the first TTI regardless of the UE being in Active Time or not. The UE may determine at least based on the DRX parameters, whether the UE is in Active Time in the second TTI or not. The UE may transmit a periodic CSI signal in the second TTI, in response to the wireless device being in Active Time, otherwise, the UE may not transmit the periodic CSI. In an example, the timer may be one of drx-onDurationTimer or drx-InactivityTimer or drx-RetransmissionTimerDL or drx-RetransmissionTimerUL or ra-ContentionResolutionTimer. In an example, the wireless device may be in Active Time at least in response to: the timer running; a Scheduling Request being transmitted via PUCCH and being pending; or when a PDCCH indicating a new transmission addressed to the C-RNTI of the MAC entity has not been received after successful reception of a Random Access Response for a preamble not selected by the MAC entity. In the embodiment, even the UE is not in Active Time, a gNB may receive a SP-CSI report, which may be used for downlink scheduling.

Figure 39:
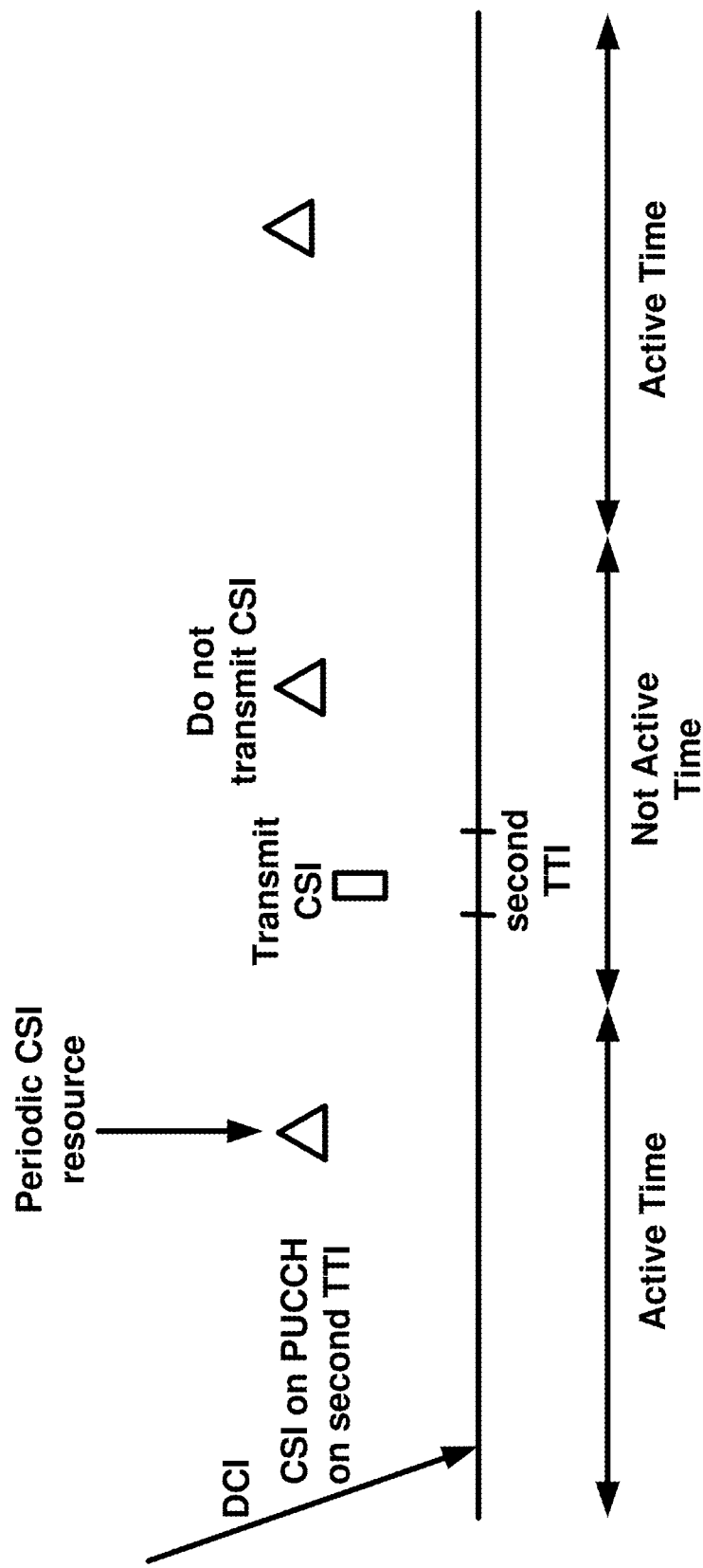
FIG. 39 is an example CSI transmission with DRX configuration as per an aspect of an embodiment of the present disclosure.

FIG. 39 shows an example of the embodiment where a SP CSI report is triggered by a DCI. In the example, a UE may receive one or more messages comprising: first configuration parameters for transmitting a plurality of periodic CSI signals comprising a first periodic CSI signal in a first TTI; and/or discontinuous reception (DRX) configuration parameters. The UE may receive a DCI indicating transmission of a second CSI signal via physical uplink control channel (PUCCH) in a second TTI. The UE may determine, at least based on the DRX parameters, whether the UE is in Active Time in the second TTI or not. The UE may transmit the second CSI signal in the second TTI regardless of the UE being in Active Time or not. The UE may determine, at least based on the DRX parameters, whether the UE is in Active Time in the first TTI or not. The UE may transmit a periodic CSI signal in the first TTI, in response to the UE being in Active Time, otherwise not transmitting the periodic CSI. In the embodiment, even the UE is not in Active Time, a gNB may receive a SP-CSI report, which may be used for downlink scheduling.

Figure 40:
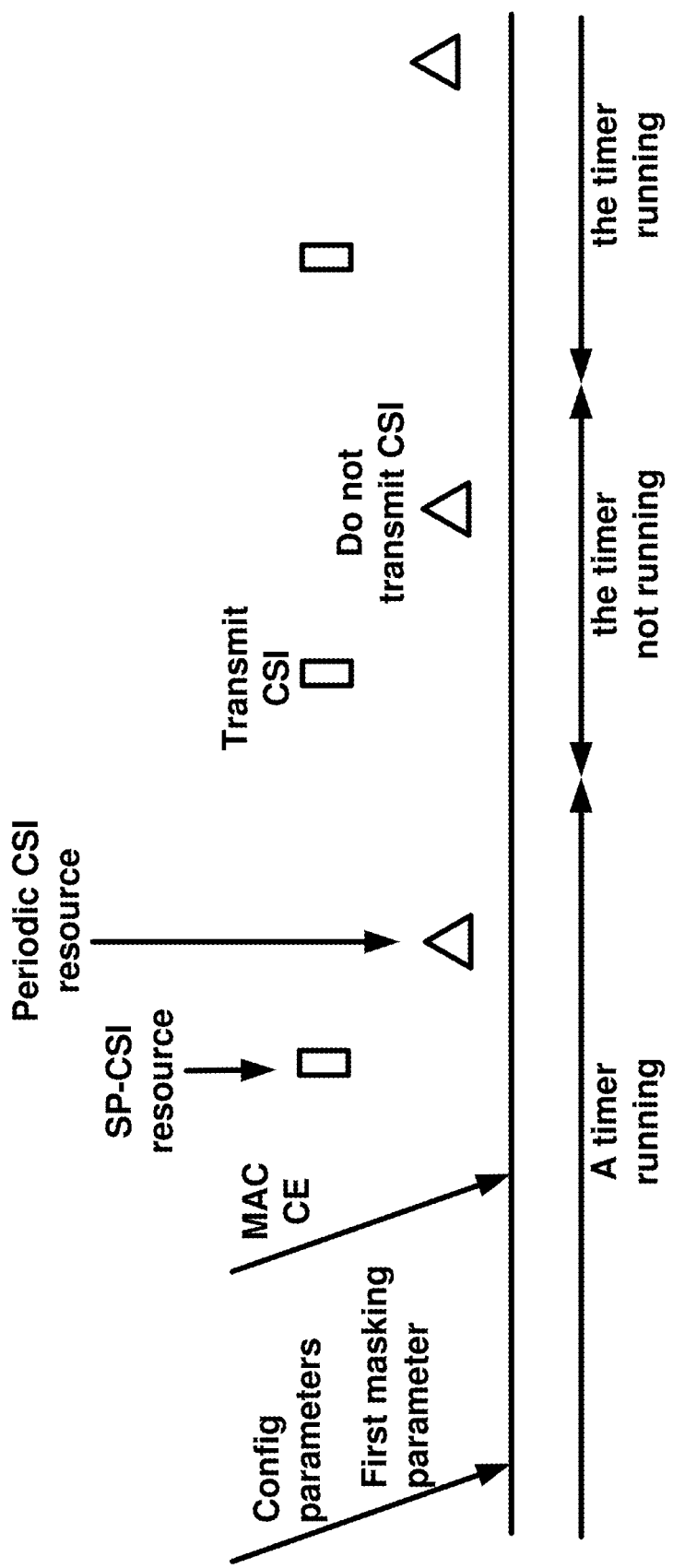
FIG. 40 is an example CSI transmission with DRX configuration as per an aspect of an embodiment of the present disclosure.

FIG. 40 shows an example of the embodiment, where a CSI masking parameter may be indicated, and a SP CSI report is triggered by a MAC CE. In the example, a UE may receive one or more messages comprising: first configuration parameters for one or more semi-persistent channel state information (SP-CSI) configurations; second configuration parameters for transmitting a plurality of periodic CSI signals comprising a second periodic CSI signal in a second TTI; a first masking parameter (configured as setup); and/or discontinuous reception (DRX) configuration parameters comprising a timer. The UE may receive a MAC CE indicating activation of a first plurality of SP-CSI resources comprising a first SP-CSI resource in a first TTI. The UE may determine, at least based on the DRX parameters, whether the timer is running in the first TTI or not. The UE may transmit a SP-CSI signal in the first TTI regardless of the timer running or not. The UE may determine, at least based on the DRX parameters, whether the timer is running in the second TTI or not. The UE may transmit a periodic CSI signal in the second TTI, in response to the first timer running, otherwise not transmitting the periodic CSI. In an example, the timer may be one of drx-onDurationTimer or drx-InactivityTimer or drx-RetransmissionTimerDL or drx-RetransmissionTimerUL or ra-ContentionResolutionTimer.

Figure 41:
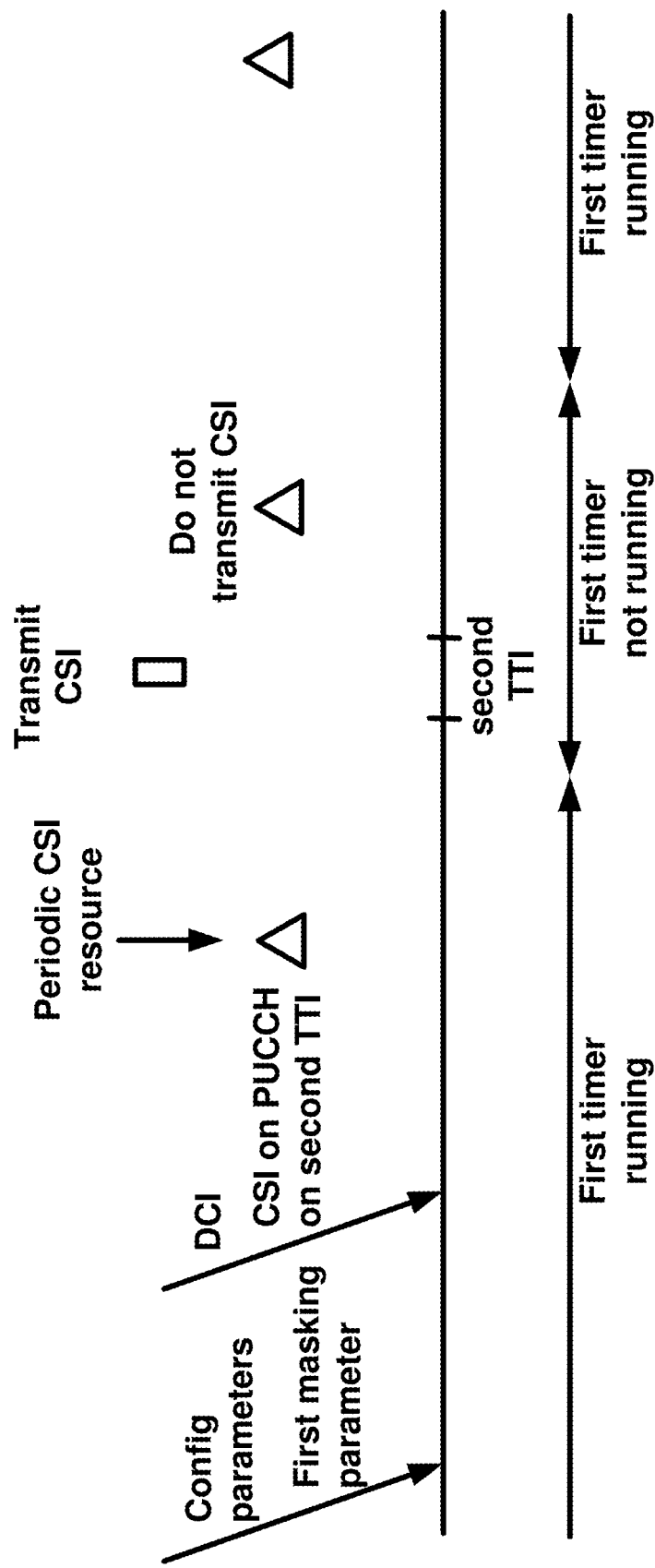
FIG. 41 is an example CSI transmission with DRX configuration as per an aspect of an embodiment of the present disclosure.

FIG. 41 shows an example of the embodiment, where a CSI masking parameter may be indicated, and a SP CSI reporting is triggered by a DCI. In the example, a UE may receive one or more messages comprising: first configuration parameters for transmitting a plurality of periodic CSI signals comprising a first periodic CSI signal in a first TTI; a first masking parameter (configured as setup); and/or discontinuous reception (DRX) configuration parameters comprising a timer. The UE may receive a DCI indicating transmission of a second CSI signal via PUCCH in a second TTI. The UE may determine, at least based on the DRX parameters, whether the timer is running in the second TTI or not. The UE may transmit the second CSI signal in the second TTI regardless of the timer running or not. The UE may determine, at least based on the DRX parameters, whether the timer is running in the first TTI or not. The UE may transmit a periodic CSI signal in the first TTI, in response to the timer running, otherwise not transmitting the periodic CSI. In an example, the DCI may comprise a field, the value of the field indicating a request for transmission of the second CSI via PUCCH in the second TTI. In an example, the timer may be one of drx-onDurationTimer or drx-InactivityTimer or drx-RetransmissionTimerDL or drx-RetransmissionTimerUL or ra-ContentionResolutionTimer.

In an example, a wireless device may receive one or more messages comprising: first configuration parameters for one or more SP CSI configuration; second configuration parameters for transmitting a plurality of a periodic CSI signals comprising a second periodic CSI signal in a second TTI; and/or DRX configuration parameters. In an example, the wireless device may receive a MAC CE indicating activation of a first plurality of SP CSI reporting comprising a first SP-CSI resource in a first TTI. The wireless device may determine at least based on the DRX parameters, whether the wireless device is in Active Time in the first TTI or not. The wireless device may transmit a SP-CSI signal in the first TTI regardless of the wireless device being in Active Time or not. The wireless device may determine at least based on the DRX parameters, whether the wireless device is in Active Time in the second TTI or not. The wireless device may transmit a periodic CSI signal in the second TTI, in response to the wireless device being in Active Time, otherwise, the wireless device may not transmit the periodic CSI. In an example, the first configuration parameters may indicate periodicity and/or time domain and/or frequency domain of SP-CSI resources. The second configuration parameters indicate a periodicity of periodic CSI signals. In an example, the MAC CE may indicate one or more reporting indexes corresponding to one or more SP-CSI configurations.

In an example, a wireless device may receive one or more messages comprising: first configuration parameters for transmitting a plurality of periodic CSI signals comprising a first periodic CSI signal in a first TTI; and/or discontinuous reception (DRX) configuration parameters. The wireless device may receive a DCI indicating transmission of a second CSI signal via PUCCH in a second TTI. The wireless device may determine, at least based on the DRX parameters, whether the wireless device is in Active Time in the second TTI or not. The wireless device may transmit the second CSI signal in the second TTI regardless of the wireless device being in Active Time or not. The wireless device may determine, at least based on the DRX parameters, whether the wireless device is in Active Time in the first TTI or not. The wireless device may transmit a periodic CSI signal in the first TTI, in response to the wireless device being in Active Time, otherwise not transmitting the periodic CSI. In an example, the first configuration parameters may indicate a periodicity of periodic CSI signals. In an example, the DCI may comprise a field, the value of the field indicating a request for transmission of the second CSI via PUCCH in the second TTI.

In an example, a wireless device may receive one or more messages comprising: first configuration parameters for one or more semi-persistent channel state information (SP-CSI) configurations; second configuration parameters for transmitting a plurality of periodic CSI signals comprising a second periodic CSI signal in a second TTI; a first masking parameter (configured as setup); and/or discontinuous reception (DRX) configuration parameters comprising a timer. The wireless device may receive a MAC CE indicating activation of a first plurality of SP-CSI resources comprising a first SP-CSI resource in a first TTI. The wireless device may determine, at least based on the DRX parameters, whether the timer is running in the first TTI or not. The wireless device may transmit a SP-CSI signal in the first TTI regardless of the timer running or not. The wireless device may determine, at least based on the DRX parameters, whether the timer is running in the second TTI or not. The wireless device may transmit a periodic CSI signal in the second TTI, in response to the timer running, otherwise not transmitting the periodic CSI. In an example, the first configuration parameters may indicate periodicity and/or time domain and/or frequency domain of SP-CSI resources. The second configuration parameters indicate a periodicity of periodic CSI signals. In an example, the MAC CE may indicate one or more reporting indexes corresponding to one or more SP-CSI configurations.

In an example, a wireless device may receive one or more messages comprising: first configuration parameters for transmitting a plurality of periodic CSI signals comprising a first periodic CSI signal in a first TTI; a first masking parameter (configured as setup); and/or discontinuous reception (DRX) configuration parameters comprising a timer. The wireless device may receive a DCI indicating transmission of a second CSI signal via physical uplink control channel (PUCCH) in a second TTI. The wireless device may determine, at least based on the DRX parameters, whether the timer is running in the second TTI or not. The wireless device may transmit the second CSI signal in the second TTI regardless of the timer running or not. The wireless device may determine, at least based on the DRX parameters, whether the timer is running in the first TTI or not. The wireless device may transmit a periodic CSI signal in the first TTI, in response to the timer running, otherwise not transmitting the periodic CSI. In an example, the DCI may comprise a field, the value of the field indicating a request for transmission of the second CSI via PUCCH in the second TTI.

In an example, the timer may be one of drx-onDurationTimer or drx-InactivityTimer or drx-RetransmissionTimerDL or drx-RetransmissionTimerUL or ra-ContentionResolutionTimer.

In an example, the wireless device may be in Active Time at least in response to: the timer running; a Scheduling Request being transmitted via PUCCH and being pending; or when a PDCCH indicating a new transmission addressed to the C-RNTI of the MAC entity has not been received after successful reception of a Random Access Response for a preamble not selected by the MAC entity.

The DRX procedures may impact the CSI reporting processes at a wireless device. Base on legacy processes a wireless device may not report a SP-CSI report via an uplink control channel in response to the wireless device not being in an active time. This may lead to inefficient network performance for example inefficient scheduling of the wireless device. There is a need to enhance the legacy CSI reporting process. Example embodiments enhance the SP-CSI reporting process considering the DRX states.

Figure 42:
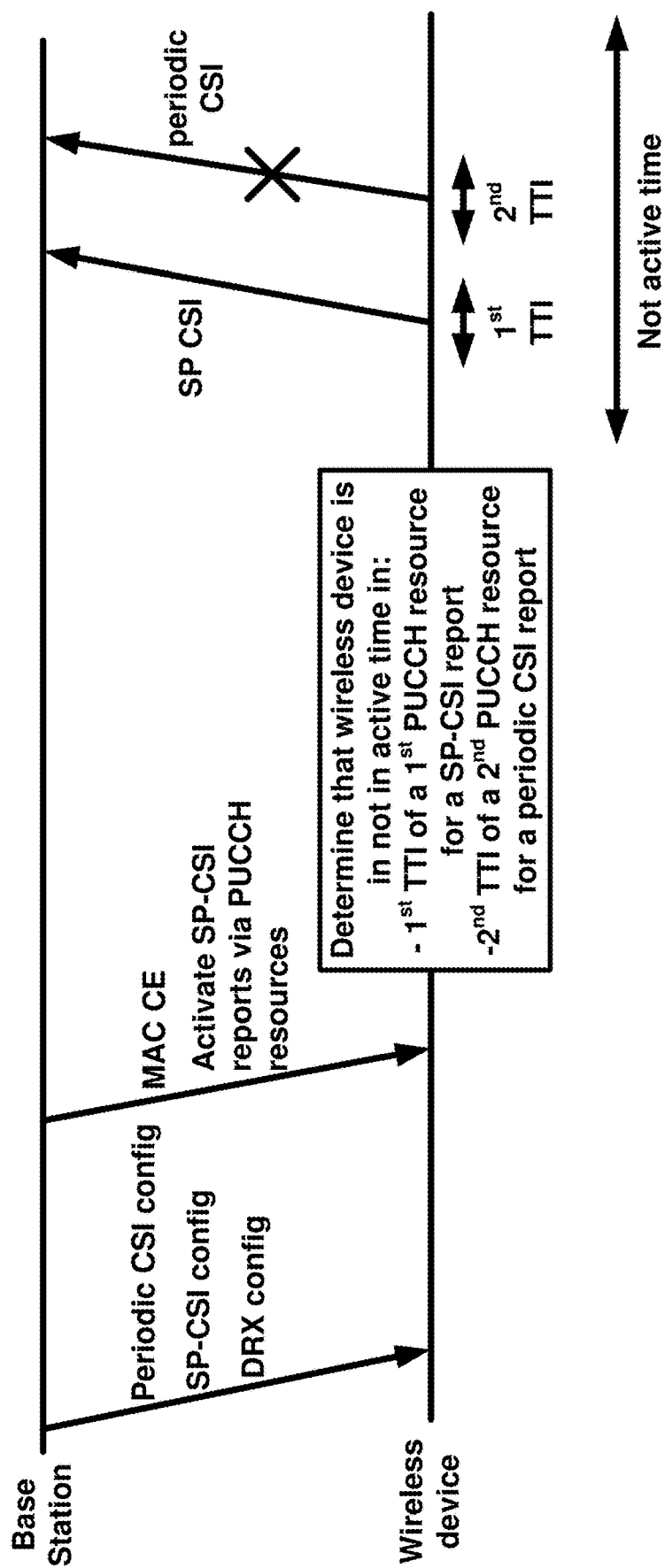
FIG. 42 is an example CSI transmission with DRX configuration as per an aspect of an embodiment of the present disclosure.

In an example embodiment and as shown in FIG. 42, a wireless device may receive one or more messages comprising configuration parameters. The one or more messages may comprise one or more RRC messages. The one or more messages may comprise first configuration parameters of a periodic CSI reporting, second configuration parameters of a semi-persistent CSI reporting, and discontinuous reception configuration parameters. The first configuration parameters of the periodic CSI reporting may a first periodicity and may indicate uplink control channel resources for transmission of CSI. In an example, the periodic CSI reporting may be activated in response to receiving the first configuration parameters and activation of a cell. The second configuration parameters of the semi-persistent CSI reporting may indicate a second periodicity and/or may indicate radio resources of uplink channel for transmission of the semi-persistent CSI reports. The semi-persistent CSI reporting may be activated in response to receiving the receiving the second configuration parameters and an activation DCI indication activation of semi-persistent CSI reporting or a control element indicating activation of the semi-persistent CSI reporting. The discontinuous reception configuration parameters may be employed to determine whether a wireless device is in an Active Time or not in an Active timer. In response to the wireless device being in an Active Time, the wireless device may monitor one or more control channels. In response to the wireless device not being in an Active Time, the wireless device may not monitor the one or more control channels. The discontinuous reception configuration parameters may comprise configuration parameters of one or more timers. The wireless device may be in an Active Time not in an Active Time based on the one or more timers.

In an example, the wireless device may receive a control element (e.g., a MAC control element) indicating activation of a plurality of semi-persistent CSI report via a plurality of resources of an uplink control channel. In an example, the one or more messages may comprise a plurality of semi-persistent CSI configurations. The control element may indicate activation of one or more semi-persistent CSI configurations in the plurality of CSI configurations. In an example, the activation may be based on a report configuration identifier. In an example, the control element may comprise a plurality of fields comprising a cell ID, a BWP ID and one or more fields indicating activation/deactivation status of one or more semi-persistent CSI report configurations. A first value of a field in the one or more fields may indicate that a corresponding semi-persistent CSI report configuration may be activated and a second value of the field in the one or more fields may indicate that a corresponding semi-persistent CSI report configuration may not be activated. The plurality of resources may comprise a first resource.

In an example, the wireless device may determine, based on the discontinuous reception configuration parameters and a DRX procedure, that the wireless device is not in an active time in a first transmission duration (e.g., first TTI) of the first resource. The wireless device may further determine that the wireless device is not in active time in a second transmission duration (e.g., second TTI) of a second resource of the uplink control channel configured for a periodic CSI report. In an example, the determining may be based on one or more timers (e.g., one or more timers associated with the DRX procedure) and/or other processes performed by the wireless device. In an example, the determining may be based on a scheduling request by the wireless device. For example, the wireless device may be in an Active Time in response to the transmitting a scheduling request and the scheduling request pending (e.g., not canceled). In an example, the determining may be based on not receiving a downlink control channel indicating a new transmission after successful reception of a random access response. In an example, in response to the determining, the wireless device may transmit a semi-persistent CSI report via the first resource. The wireless device may not transmit the periodic SI report via the second resource. In an example, the transmitting the semi-persistent CSI report via the first resource may be irrespective of the wireless device being in an active time in the first transmission duration or the wireless device not being in an active time in the first transmission duration.

A method comprising According to various embodiments, a device such as, for example, a wireless device, a base station, base station central unit, a base station distributed unit, a core network entity, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 43:
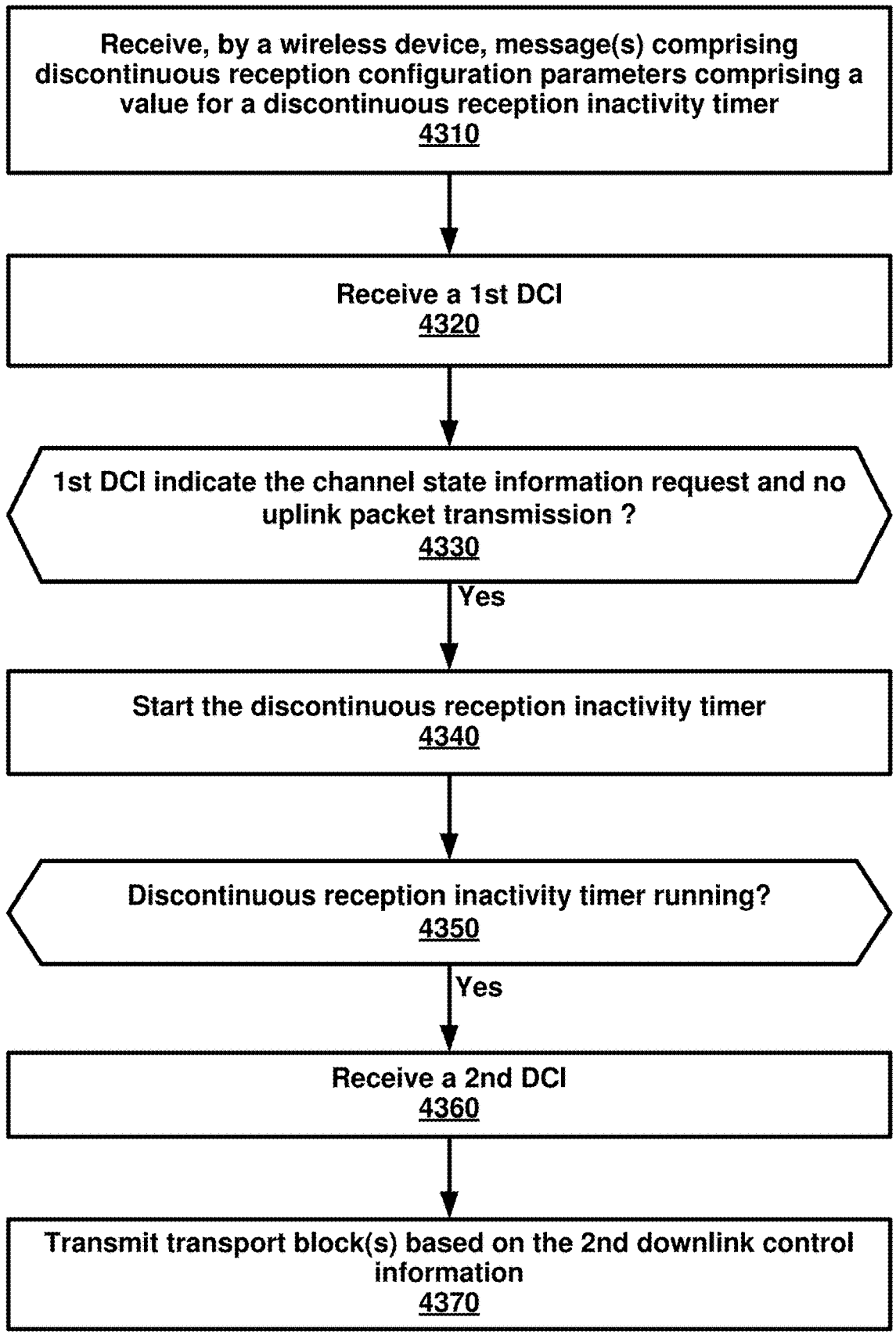
FIG. 43 is an example flow diagram of an aspect of an embodiment of the present disclosure.

FIG. 43 is an example flow diagram as per an aspect of an embodiment of the present disclosure. At 4310, a wireless device may receive one or more messages. The one or more messages may comprise discontinuous reception configuration parameters. The discontinuous reception configuration parameters may comprise a value for a discontinuous reception inactivity timer. At 4320, a first downlink control information may be received. The first downlink control information may indicate a channel state information request. The first downlink control information may indicate no uplink packet transmission. At 4340, the discontinuous reception inactivity timer may be started in response to the first downlink control information indicating the channel state information request and no uplink packet transmission (4330). At 4360, a second downlink control information may be received while the discontinuous reception inactivity timer is running (4350). At 4370, one or more transport blocks may be transmitted based on the second downlink control information.

According to an example embodiment, the one or more messages may comprise a plurality of channel state information trigger states indicating a plurality of channel state information reporting configurations. According to an example embodiment, the channel state information request may indicate a channel state information reporting configuration in the plurality of channel state reporting configurations. According to an example embodiment, channel state information reference signals may be measured, based on the channel state reporting configuration, in response to receiving the first downlink control information. According to an example embodiment, a control channel may be monitored in response to the discontinuous reception inactivity timer running. According to an example embodiment, channel state information may be transmitted without an uplink packet in response the receiving the first downlink control information. According to an example embodiment, the starting of the discontinuous reception inactivity timer maybe with the value. According to an example embodiment, the first downlink control information may indicate activation of semi-persistent channel state information reports. According to an example embodiment, the one or more messages may comprise a plurality of channel state information trigger states indicating a plurality of channel state information reporting configurations. According to an example embodiment, the channel state information request may indicate a channel state information reporting configuration in the plurality of channel state reporting configurations. According to an example embodiment, channel state information reference signals may be measured, based on the channel state reporting configuration, in response to receiving the first downlink control information. According to an example embodiment, the starting of the discontinuous reception inactivity timer may be with the value. According to an example embodiment, the downlink control may indicate resources for transmission of channel state information. According to an example embodiment, the first downlink control information may indicate transmission of channel state information via physical uplink shared channel. According to an example embodiment, the wireless device may be in a discontinuous reception active time in response to discontinuous reception inactivity timer running. According to an example embodiment, a control channel may be monitored in response to the discontinuous reception inactivity timer running. According to an example embodiment, channel state information may be transmitted without uplink packet in response the receiving the first downlink control information. According to an example embodiment, the downlink control may indicate resources for transmission of channel state information. According to an example embodiment, the first downlink control information may indicate transmission of channel state information via physical uplink shared channel. According to an example embodiment, the wireless device may be in discontinuous reception active time in response to discontinuous reception inactivity timer running. According to an example embodiment, a control channel may be monitored in response to the discontinuous reception inactivity timer running. According to an example embodiment, channel state information may be transmitted without uplink packet in response the receiving the first downlink control information.

FIG. 44 is an example flow diagram as per an aspect of an embodiment of the present disclosure. At 4410, a wireless device may receive one or more messages. The one or more messages may comprise first configuration parameters of a periodic channel state information (CSI) reporting. The one or more messages may comprise second configuration parameters of a semi-persistent CSI reporting. The one or more messages may comprise discontinuous reception configuration parameters. At 4420, a control element indicating activation of a plurality of semi-persistent CSI reports, may be received via a plurality of resources comprising a first resource of an uplink control channel. At 4430, a determination, based on the discontinuous reception configuration parameters, may be made that the wireless device is not in active time in a first transmission duration of the first resource. At 4440, a determination, based on the discontinuous reception configuration parameters, may be made that the wireless device is not in active time in a second transmission duration of a second resource of the uplink control channel configured for a periodic CSI report. At 4450, in response to the determining: a semi-persistent CSI report may be transmitted via the first resource; and the periodic CSI report may not be transmitted via the second resource.

According to an example embodiment, the determining may be based on one or more timers associated with a discontinuous reception procedure. According to an example embodiment, the determining may be based on a scheduling request by the wireless device. According to an example embodiment, the determining may be based on not receiving a downlink control channel indicating a new transmission after successful reception of a random access response. According to an example embodiment, the first configuration parameters may indicate a first periodicity parameter. According to an example embodiment, the second configuration parameters may indicate a second periodicity parameter. According to an example embodiment, the one or more messages may comprise a plurality of semi-persistent CSI configurations. According to an example embodiment, the control element may indicate activation of one or more semi-persistent CSI configurations in the plurality of semi-persistent CSI configurations. According to an example embodiment, the activation may be based on a report configuration identifier. According to an example embodiment, the receiving of the one or more messages may indicate activation of the periodic CSI report. According to an example embodiment, the transmission of the semi-persistent CSI report via the first resource may be irrespective of the wireless device being in an active time in the first transmission duration or the wireless device not being in an active time in the first transmission duration.

In this disclosure, "a" and "an" and similar phrases are to be interpreted as "at least one" or "one or more." Similarly, any term that ends with the suffix "(s)" is to be interpreted as "at least one" or "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" is indicative that the phrase following the term "based on" is an example of one of a multitude of suitable possibilities that may, or may not, be employed to one or more of the various embodiments. The phrase "in response to" is indicative that the phrase following the phrase "in response to" is an example of one of a multitude of suitable possibilities that may, or may not, be employed to one or more of the various embodiments. The terms "including" and "comprising" should be interpreted as meaning "including, but not limited to." In this disclosure, the abbreviation "e.g." means "for example" and is followed by one or more examples that illustrate a term receding the abbreviation.

In this disclosure and the claims, differentiating terms like "first," "second," "third," identify separate elements without implying an ordering of the elements or functionality of the elements. Differentiating terms may be replaced with other differentiating terms when describing an embodiment.

In this disclosure, various embodiments are disclosed. Limitations, features, and/or elements from the disclosed example embodiments may be combined to create further embodiments within the scope of the disclosure.

In this disclosure, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:

1. A method by a wireless device, the method comprising:
  receiving, from a base station, a value for a discontinuous reception (DRX) inactivity timer;
  receiving, from the base station, a first downlink control information (DCI) corresponding to a semi-persistent channel state information (SP-CSI) radio network temporary identifier (RNTI), the first DCI including a CSI request and a value indicating
  no uplink packet transmission;
  transmitting, to the base station, an SP-CSI on a physical uplink shared channel (PUSCH) based on the first DCI; and
  receiving, from the base station, a second DCI while the DRX inactivity timer is running based on the first DCI.

2. The method of claim 1, further comprising:
  receiving a plurality of CSI trigger states indicating a plurality of channel state information reporting configurations.

3. The method of claim 2, further comprising:
  measuring CSI reference signals, based on the plurality of CSI reporting configurations, in response to receiving the first DCI.

4. The method of claim 2, further comprising:
  monitoring a control channel in response to the DRX inactivity timer running.

5. The method of claim 1, wherein the first DCI indicates resources for transmission of the SP-CSI.

6. The method of claim 1, wherein the first DCI indicates transmission of the SP-CSI via the PUSCH.

7. The method of claim 1, wherein the wireless device is in DRX active time in response to the DRX inactivity timer running.

8. The method of claim 1, further comprising:
monitoring a control channel in response to the DRX inactivity timer running.

9. The method of claim 1, further comprising:
transmitting, to the base station, a transport block based on the second DCI.

10. A wireless device comprising:
a transceiver; and
a processor, wherein the processor is configured to control to:
receive, from a base station, a value for a discontinuous reception (DRX) inactivity timer,
receive, from the base station, a first downlink control information (DCI) corresponding to a semi-persistent channel state information (SP-CSI) radio network temporary identifier (RNTI), the first DCI including a CSI request and a value indicating no uplink packet transmission,
transmit, to the base station, an SP-CSI on a physical uplink shared channel (PUSCH) based on the first DCI, and
receive, from the base station, a second DCI while the DRX inactivity timer is running based on the first DCI.

11. The wireless device of claim 10, wherein the processor is further configured to control to receive a plurality of CSI trigger states indicating a plurality of CSI reporting configurations.

12. The wireless device of claim 11, wherein the processor is further configured to control to measure CSI reference signals, based on the plurality of CSI reporting configurations, in response to receiving the first DCI.

13. The wireless device of claim 11, wherein the processor is further configured to control to monitor a control channel in response to the DRX inactivity timer running.

14. The wireless device of claim 10, wherein the first DCI indicates resources for transmission of the SP-CSI.

15. The wireless device of claim 10, wherein the first DCI indicates transmission of the SP-CSI via the PUSCH.

16. The wireless device of claim 10, wherein the wireless device is in DRX active time in response to the DRX inactivity timer running.

17. The wireless device of claim 10, wherein the processor is configured to control to:
transmit, to the base station, a transport block based on the second DCI.

18. A method by a base station, the method comprising:
transmitting, to a wireless device, a value for a discontinuous reception (DRX) inactivity timer;
transmitting, to the wireless device, a first downlink control information (DCI) corresponding to a semi-persistent channel state information (SP-CSI) radio network temporary identifier (RNTI), the first DCI including a CSI request and a value indicating no uplink packet transmission;
receiving, from the wireless device, a SP-CSI on a physical uplink shared channel (PUSCH) based on the first DCI; and
transmitting, to the wireless device, a second DCI while the DRX inactivity timer is running based on the first DCI.

19. A base station comprising:
a transceiver; and
a processor, wherein the processor is configured to control to:
transmit, to a wireless device, a value for a discontinuous reception (DRX) inactivity timer,
transmit, to the wireless device, a first downlink control information (DCI) corresponding to a semi-persistent channel state information (SP-CSI) radio network temporary identifier (RNTI), the first DCI including a CSI request and a value indicating no uplink packet transmission,
receive, from the wireless device, a SP-CSI on a physical uplink shared channel (PUSCH) based on the first DCI, and
transmit, to the wireless device, a second DCI while the DRX inactivity timer is running based on the first DCI.

\* \* \* \* \*